United States Patent
Lu et al.

(10) Patent No.: US 12,501,600 B2
(45) Date of Patent: Dec. 16, 2025

(54) SRAM CELL STRUCTURE

(71) Applicant: Invention And Collaboration Laboratory Pte. Ltd., Singapore (SG)

(72) Inventors: Chao-Chun Lu, Hsinchu (TW); Li-Ping Huang, Hsinchu (TW); Juang-Ying Chueh, Hsinchu (TW)

(73) Assignees: INVENTION AND COLLABORATION LABORATORY PTE. LTD., Singapore (SG); ETRON TECHNOLOGY, INC., Hsinchu (TW)

( * ) Notice: Subject to any disclaimer, the term of this patent is extended or adjusted under 35 U.S.C. 154(b) by 503 days.

(21) Appl. No.: 17/588,509

(22) Filed: Jan. 31, 2022

(65) Prior Publication Data
US 2023/0106517 A1    Apr. 6, 2023

Related U.S. Application Data

(60) Provisional application No. 63/251,768, filed on Oct. 4, 2021.

(51) Int. Cl.
  *H10B 10/00*   (2023.01)
  *H01L 23/528*  (2006.01)
  *H10D 8/70*    (2025.01)

(52) U.S. Cl.
  CPC ......... *H10B 10/12* (2023.02); *H01L 23/5286* (2013.01); *H10D 8/70* (2025.01)

(58) Field of Classification Search
  CPC ...... H10B 10/12; H10B 10/125; H10B 10/15; H10B 10/18; H01L 23/5286;
  (Continued)

(56) References Cited

U.S. PATENT DOCUMENTS 5,578,854 A    11/1996  Chen et al.
6,472,700 B2 * 10/2002  Wakao ............. H01L 21/76897
                                                257/E21.507
(Continued)

FOREIGN PATENT DOCUMENTS

EP    2 239 771 A1    10/2010
JP    5-275717 A      10/1993
(Continued)

OTHER PUBLICATIONS

Endo et al., Semiconductor storage device, 2013, machine translation of JP 2013062319 A, pp. 1-14. (Year: 2013).*
(Continued)

*Primary Examiner* — Natalia A Gondarenko
(74) *Attorney, Agent, or Firm* — Birch, Stewart, Kolasch & Birch, LLP

(57) ABSTRACT

A SRAM cell structure includes a plurality of transistors, a set of contacts, a word-line, a bit-line, a VDD contacting line and a VSS contacting line. The plurality of transistors include n transistors, wherein n is a positive integral less than 6. The set of contacts are coupled to the plurality of transistors. The word-line is electrically coupled to the plurality of transistors. The bit-line and a bit line bar are electrically coupled to the plurality of transistors. The VDD contacting line is electrically coupled to the plurality of transistors. The VSS contacting line is electrically coupled to the plurality of transistors. Wherein as a minimum feature size of the SRAM cell structure gradually decreases from 28 nm, an area size of the SRAM cell in terms of square of the minimum feature size ($\lambda$) is the same or substantially the same.

25 Claims, 61 Drawing Sheets
(10 of 61 Drawing Sheet(s) Filed in Color)

(58) Field of Classification Search
CPC ............. H01L 23/5389; H01L 27/0924; H01L 27/1104; H01L 27/226; H01L 29/88; H01L 29/882; H01L 29/94; H01L 43/08; G11C 11/412; G11C 11/1697; G11C 11/1655; G11C 11/1657; Y10S 257/903
USPC ....... 257/369, 401, 774, 421, 349, 347, 350, 257/311, 776, 903, 904
See application file for complete search history.

(56) References Cited

U.S. PATENT DOCUMENTS

| | | | |
|---|---|---|---|
| 9,401,366 B1* | 7/2016 | Lu | ................. H10D 86/011 |
| 2004/0100817 A1 | 5/2004 | Subramanian et al. | |
| 2010/0188891 A1 | 7/2010 | Taniguchi et al. | |
| 2010/0193888 A1* | 8/2010 | Gu | ................. H10B 61/00 |
| | | | 257/E29.323 |
| 2014/0061828 A1* | 3/2014 | Lim | ............... G11C 11/1659 |
| | | | 257/421 |
| 2014/0070844 A1 | 3/2014 | Guillemenet et al. | |
| 2015/0076619 A1* | 3/2015 | Adachi | ................. H01L 23/485 |
| | | | 257/774 |
| 2015/0249203 A1* | 9/2015 | Yoon | ................. G06F 12/08 |
| | | | 257/421 |
| 2016/0240541 A1 | 8/2016 | Liaw | |
| 2016/0372174 A1 | 12/2016 | Ohsawa et al. | |
| 2020/0106441 A1 | 4/2020 | Liaw | |
| 2021/0335797 A1* | 10/2021 | Wang | ................. H10B 61/22 |
| 2022/0223784 A1* | 7/2022 | He | ................. H10N 50/01 |

FOREIGN PATENT DOCUMENTS

| | | |
|---|---|---|
| JP | 9-92932 A | 4/1997 |
| JP | 2003-249578 A | 9/2003 |
| JP | 2013-62319 A | 4/2013 |
| JP | 2013-514667 A | 4/2013 |
| JP | 2015-60863 A | 3/2015 |

OTHER PUBLICATIONS

Japanese Office Action for Japanese Application No. 2022-156157, dated Jan. 16, 2024, with English translation.

Taiwanese Office Action and Search Report for Taiwanese Application No. 111136161, dated Apr. 24, 2023.

Chang et al., "A 5nm 135Mb SRAM in EUV and High-Mobility-Channel FinFET Technology with Metal Coupling and Charge-Sharing Write-Assist Circuitry Schemes for High-Density and Low-VMIN Applications," 2020 IEEE International Solid-State Circuits Conference, 2020, pp. 238-240.

Extended European Search Report for European Application No. 22160758.3, dated Dec. 5, 2022.

Extended European Search Report for European Application No. 22199486.6, dated Jan. 30, 2023.

Salahuddin et al., "SRAM With Buried Power Distribution to Improve Write Margin and Performance in Advanced Technology Nodes," IEEE Electron Device Letters, vol. 40, No. 8, 2019, pp. 1261-1264.

Schor, "VLSI 2018: Samsung's 2nd Gen 7nm, EUV Goes HVM," WikiChip Fuse, Aug. 4, 2018, URL: <https://fuse.wikichip.org/news/1479/visi-2018-samsungs-2nd-gen-7nm-euv-goes-hvm/>, 6 pages total.

European Office Action for European Application No. 22 199 486.6, dated Jun. 10, 2024.

Lu et al., "Comparison of Hexagonal Boron Nitride and MgO Tunnel Barriers in Fe,Co Magnetic Tunnel Junctions," Applied Physics Reviews, vol. 8, No. 3, Aug. 5, 2021, XP012258676, pp. 1-14.

* cited by examiner

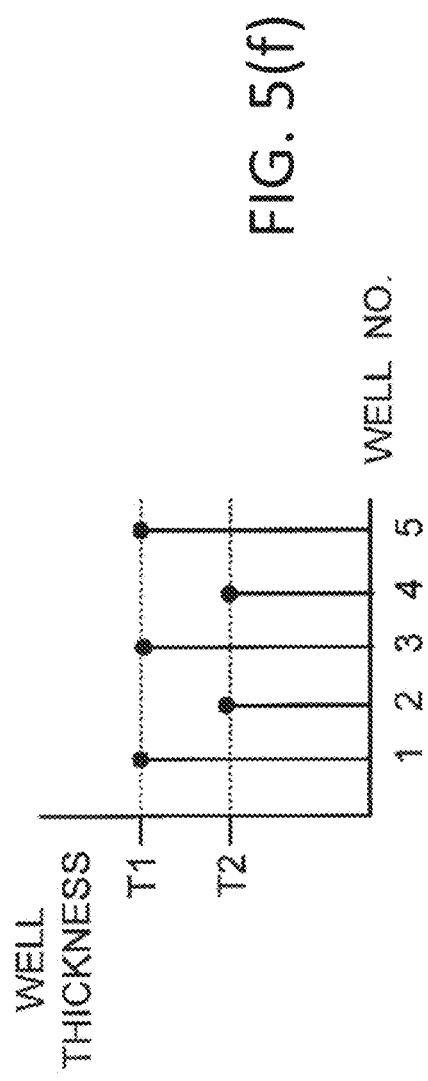

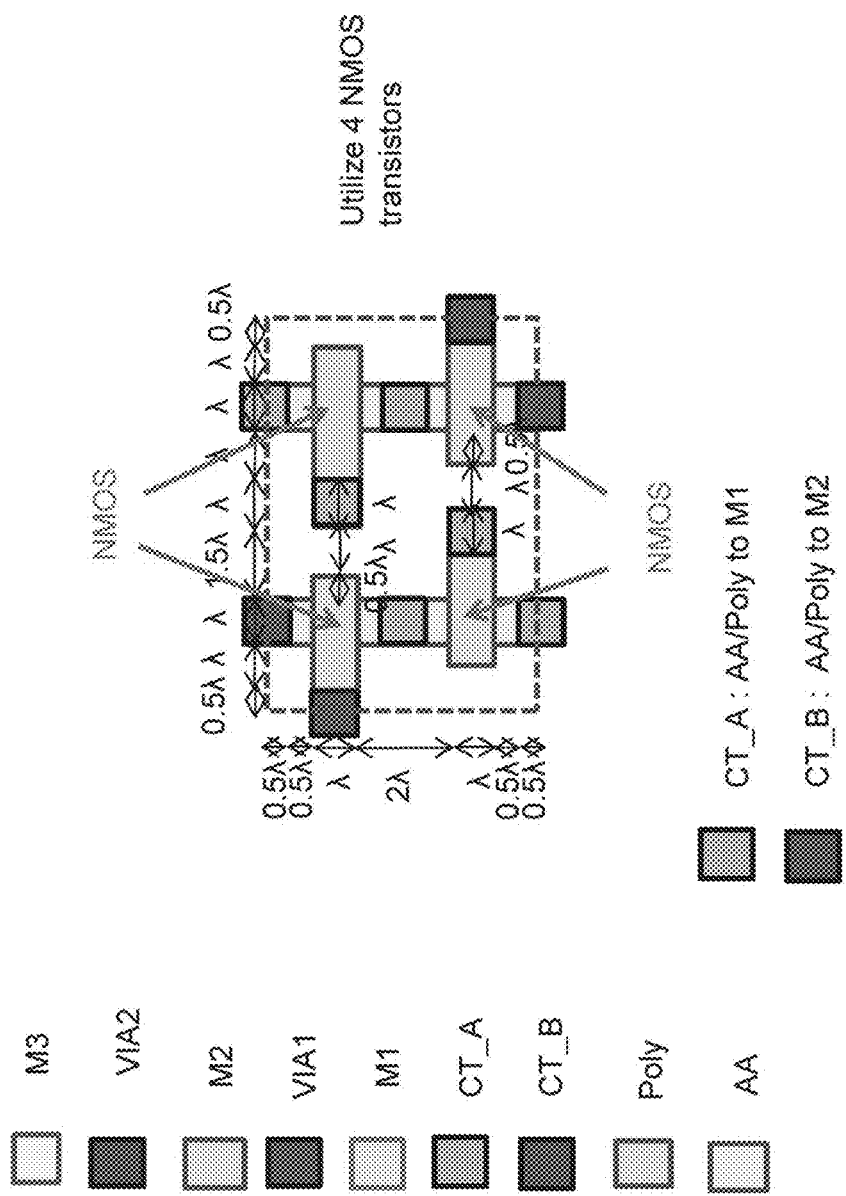

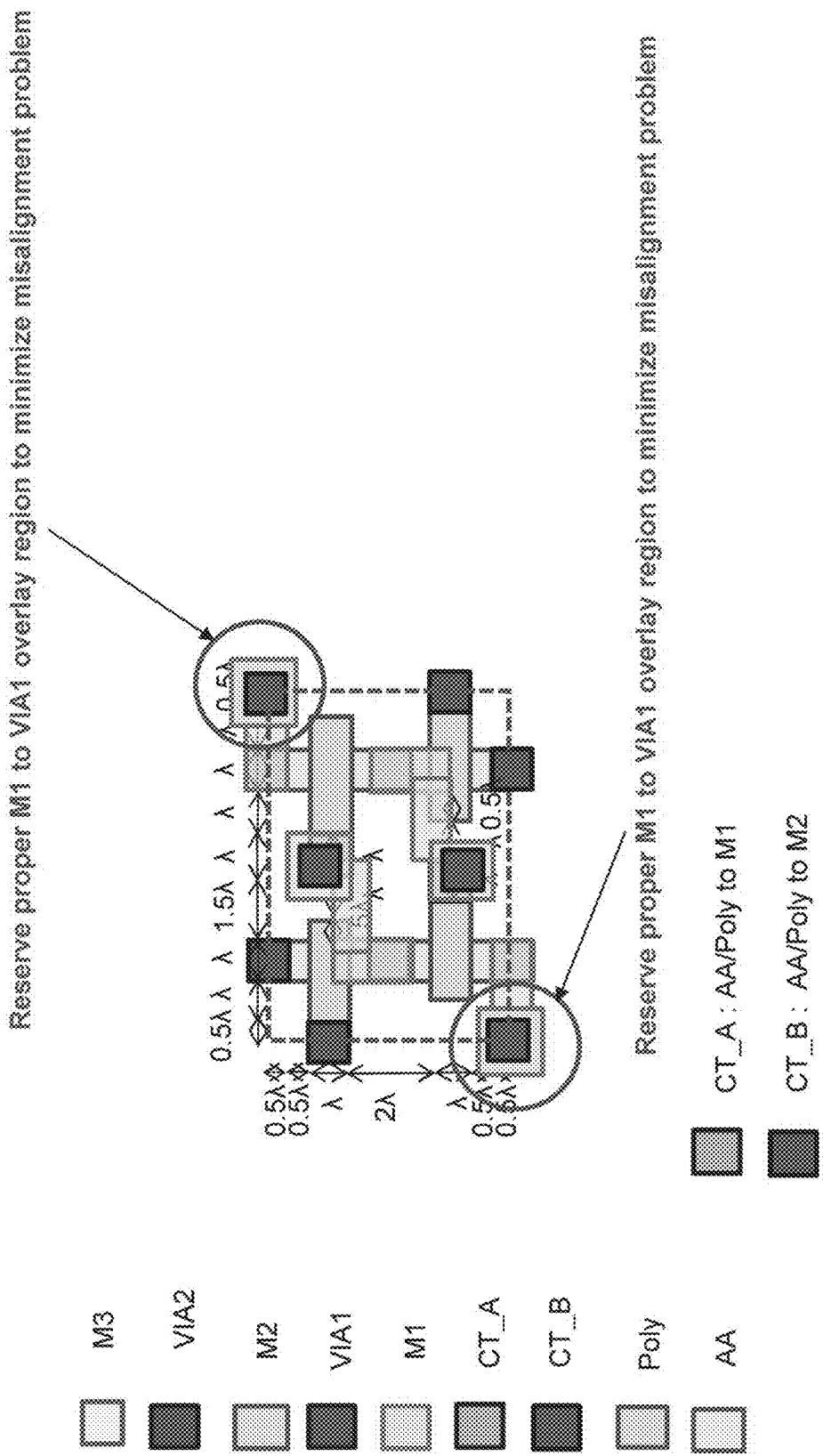

SRAM CELL STRUCTURE

CROSS REFERENCE TO RELATED APPLICATIONS

This application claims the benefit of U.S. provisional application Ser. No. 63/251,768, filed Oct. 4, 2021, the subject matter of which is incorporated herein by reference.

BACKGROUND OF THE INVENTION

1. Field of the Disclosure

The disclosure relates to memory structure, and particularly to a SRAM cell structure which can have precisely controlled dimensions to effectively shrink a size of the SRAM cell structure.

2. Description of the Related Art

Improvement in integrated circuit performance and cost has been achieved largely by process scaling technology according to Moore's Law, but the process variations in transistor performance with miniaturization down to the 28 nm (or lower) manufacture process is a challenge. Especially, SRAM device scaling for increased storage density, reduction in operating voltage (VDD) for lower stand-by power consumption, and enhanced yield necessary to realize larger-capacity SRAM become increasingly difficult to achieve.

SRAM is one of the commonly used memory. SRAM usually comprises SRAM array and peripheral circuits which includes row address decoder, column address decoder, and input/output circuits, etc. The SRAM array includes multiple SRAM cells, each SRAM cell incorporates a static latch with two cross-coupled inverters, so that it does not require DRAM periodic refreshing to retain the stored information, provided that there are adequate power supply voltages for the cell, i.e. a high level voltage VDD and a low level voltage VSS. The same high level voltage VDD and the low level voltage VSS are connected to the SRAM peripheral circuits (decoders, I/O circuits) as well. Furthermore, the high level voltage VDD usually corresponds to logic "1" stored in SRAM and the low level voltage VSS corresponds to logic "0" stored in SRAM.

FIG. 1A shows the SRAM cell architecture, that is the six-transistor (6-T) SRAM cell. It consists of two cross-coupled inverters (PMOS pull-up transistors PU-1 and PU-2 and NMOS pull-down transistors PD-1 and PD-2) and two access transistors (NMOS pass-gate transistors PG-1 and PG-2). The high level voltage VDD is coupled to the PMOS pull-up transistors PU-1 and PU-2, and the low level voltage VSS are coupled to the NMOS pull-down transistors PD-1 and PD-2. When the word-line (WL) is enabled (i.e., a row is selected in an array), the access transistors are turned on, and connect the storage nodes (Node-1/Node-2) to the vertically-running bit-lines (BL and BL Bar).

However, even miniaturization of the manufacture process down to the 28 nm or lower (so called, "minimum feature size", "Lambda ($\lambda$)", or "F"), due to the interference among the size of the contacts, among layouts of the metal wires connecting the word-line (WL), bit-lines (BL and BL Bar), high level voltage VDD, and low level voltage VSS, etc., the total area of the SRAM cell represented by $\lambda^2$ or $F^2$ dramatically increases when the minimum feature size decreases, as shown in FIG. 1B (cited from J. Chang et al., "15.1 A 5 nm 135 Mb SRAM in EUV and High-Mobility-Channel FinFET Technology with Metal Coupling and Charge-Sharing Write-Assist Circuitry Schemes for High-Density and Low-VMIN Applications," 2020 IEEE International Solid-State Circuits Conference—(ISSCC), 2020, pp. 238-240).

Some of the reasons for the dramatically increase of the total area of the SRAM cell represented by $\lambda^2$ or $F^2$ when the minimum feature size decreases could be described as follows. The traditional 6T SRAM has six transistors which are connected by using multiple interconnections, which has its first interconnection layer M1 to connect the gate-level ("Gate") and the diffusion-level of the Source-region and the Drain-region (called generally as "Diffusion") of the transistors. There is a need to increase a second interconnection layer M2 and/or a third interconnection layer M3 for facilitating signal transmission (such as the word-line (WL) and/or bit-lines (BL and BL Bar)) without enlarging the die size by only using M1, then a structure Via-1, which is composed of some types of the conductive materials, is formed for connecting M2 to M1. Thus, there is a vertical structure which is formed from the Diffusion through a Contact (Con) connection to M1, i.e. "Diffusion-Con-M1". Similarly, another structure to connect the Gate through a Contact structure to M1 can be formed as "Gate-Con-M1". Additionally, if a connection structure is needed to be formed from an M1 interconnection through a Via1 to connect to an M2 interconnection, then it is named as "M1-Via1-M2". A more complex interconnection structure from the Gate-level to the M2 interconnection can be described as "Gate-Con-M1-Via1-M2". Furthermore, a stacked interconnection system may have an "M1-Via1-M2-Via2-M3" or "M1-Via1-M2-Via2-M3-Via3-M4" structure, etc. Since the Gate and the Diffusion in two access transistors (NMOS pass-gate transistors PG-1 and PG-2, as shown in FIG. 1A) shall be connected to the word-line (WL) and/or bit-lines (BL and BL Bar) which will be arranged in the second interconnection layer M2 or the third interconnection layer M3, in traditional SRAM such metal connections must go through interconnection layer M1 first. That is, the state-of-the-art interconnection system in SRAM may not allow the Gate or Diffusion directly connect to M2 without bypassing the M1 structure. As results, the necessary space between one M1 interconnection and the other M1 interconnection will increase the die size and in some cases the wiring connections may block some efficient channeling intention of using M2 directly to surpass M1 regions. In addition, there is some difficulty to form a self-alignment structure between Via1 to Contact and at the same time both Via1 and Contact are connected to their own interconnection systems, respectively.

Additionally, in traditional 6T SRAM cell 10, at least there are one NMOS transistor 11 and one PMOS transistor 12 located respectively inside some adjacent regions of p-substrate and n-well which have been formed next to each other within a close neighborhood, a parasitic junction structure called n+/p/n/p+ parasitic bipolar device is formed with its contour starting from the n+ region of the NMOS transistor 11 to the p-well to the neighboring n-well and further up to the p+ region of the PMOS transistor 12, as shown in FIG. 10. There are significant noises occurred on either n+/p junctions or p+/n junctions, an extraordinarily large current may flow through this n+/p/n/p+ junction abnormally which can possibly shut down some operations of CMOS circuits and to cause malfunction of the entire chip. Such an abnormal phenomenon called Latch-up is detrimental for CMOS operations and must be avoided. One way to increase the immunity to Latch-up which is certainly a weakness for CMOS is to increase the distance from n+ region to the p+ region. Thus, the increase of the distance from n+ region to the p+ region to avoid Latch-up issue will also enlarge the size of the SRAM cell.

To avoid the Latch-up issue, 4T SRAM cell has been proposed in which the original two PMOS pull-up transistors PU-1 and PU-2 are replaced by two load resistors (as shown in FIG. 1D) commonly made of polysilicon to skip the requirement of N-well region and avoid the Latch-up issue. However, the resistance of the polysilicon is temperature-dependent and such temperature-dependent property will dramatically impact the signal to noise margin (SNM) of the SRAM.

Therefore, how to redesign the SRAM cell such that the total area of the SRAM cell represented by $\lambda2$ could maintain within an acceptable range when the minimum feature size decreases is a challenge.

SUMMARY OF THE DISCLOSURE

One embodiment of the present disclosure is to provide a SRAM cell structure, wherein the SRAM cell structure includes a plurality of transistors, a set of contacts, a word-line, a bit-line, a VDD contacting line and a VSS contacting line. The plurality of transistors include n transistors, wherein n is a positive integral less than 6. The set of contacts are coupled to the plurality of transistors. The word-line is electrically coupled to the plurality of transistors. The bit-line and a bit line bar are electrically coupled to the plurality of transistors. The VDD contacting line is electrically coupled to the plurality of transistors. The VSS contacting line is electrically coupled to the plurality of transistors. Wherein as a minimum feature size of the SRAM cell structure gradually decreases from 28 nm, an area size of the SRAM cell in terms of square of the minimum feature size ($\lambda$) is the same or substantially the same.

According to another aspect of the present disclosure, when A is decreased from 28 nm to 5 nm, the area size of the SRAM cell is between $51\lambda^2 \sim 102\lambda^2$.

According to yet another aspect of the present disclosure, a length of a first transistor in the plurality of transistors is between $3 \sim 5\lambda$.

According to yet another aspect of the present disclosure, the SRAM cell structure further includes a first dielectric layer disposed between the VDD contacting line and pair of cross-coupled transistors; wherein a thickness of the first dielectric layer is between a thickness of a monolayer and 10 nm.

According to yet another aspect of the present disclosure, the first dielectric layer is between the VDD contacting line and another metal layer to form a MIM structure.

Another embodiment of the present disclosure provides a SRAM cell structure, wherein the SRAM cell structure includes a pair of cross-coupled transistors; a VDD contacting line, a VSS contacting line and a first dielectric layer. The VDD contacting line is electrically coupled to the pair of cross-coupled transistors through the first dielectric layer. The VSS contacting line is electrically coupled to the pair of cross-coupled transistors. The first dielectric layer is disposed between the VDD contacting line and pair of cross-coupled transistors; wherein a thickness of the first dielectric layer is between a thickness of a monolayer and 10 nm.

According to another aspect of the present disclosure, the VDD contacting line is electrically coupled to the pair of cross-coupled transistors through the first dielectric layer based on tunneling effect.

According to yet another aspect of the present disclosure, the first dielectric layer is made of boron nitride, $CaF_2$, $SiO_2$, $HfO_2$ or high-k 2D material (e.g., $Ta_2O_5$, Perylene-3,4,9,10-tetracarboxylic dianhydride (PTCDA) etc.).

According to yet another aspect of the present disclosure, the pair of cross-coupled transistors comprising a first cross-coupled transistor and a second cross-coupled transistor, the first dielectric layer being disposed between the first cross-coupled transistor and the VDD contacting line.

According to yet another aspect of the present disclosure, the VDD contacting line is electrically coupled to the first cross-coupled transistor through the first dielectric layer based on tunneling effect.

According to yet another aspect of the present disclosure, the SRAM cell structure further includes a second dielectric layer disposed between the second cross-coupled transistor and the VDD contacting line, wherein a thickness of the second dielectric layer is between a thickness of a monolayer and 10 nm.

According to yet another aspect of the present disclosure, the second dielectric layer is made of boron nitride, $CaF_2$, $SiO_2$, $HfO_2$, $Ta_2O_5$, or Perylene-3,4,9,10-tetracarboxylic dianhydride (PTCDA).

According to yet another aspect of the present disclosure, the VDD contacting line is electrically coupled to the second cross-coupled transistor through the second dielectric layer based on tunneling effect.

According to yet another aspect of the present disclosure, the SRAM cell structure further includes a first passing transistor, a second passing transistor, a word-line, a bit-line and a bit line bar. The word-line is electrically coupled to the first passing transistors and the second passing transistor. The bit-line and a bit line bar are electrically coupled to the first passing transistors and the second passing transistor, respectively.

Another embodiment of the present disclosure provides a SRAM cell structure, wherein the SRAM cell structure includes a pair of cross-coupled transistors; a VDD contacting line electrically coupled to the pair of cross-coupled transistors; a VSS contacting line electrically coupled to the pair of cross-coupled transistors; and a tunneling structure disposed between the VDD contacting line and pair of cross-coupled transistors; wherein the tunneling structure is a two-terminals device with bilateral current directions.

According to yet another aspect of the present disclosure, the VDD contacting line is electrically coupled to the pair of cross-coupled transistors through the tunneling structure based on tunneling effect.

According to yet another aspect of the present disclosure, the tunneling structure includes a first dielectric layer made of boron nitride, $CaF_2$, $SiO_2$, $HfO_2$, $Ta_2O_5$, or Perylene-3,4,9,10-tetracarboxylic dianhydride (PTCDA), and wherein a thickness of the first dielectric layer is between a thickness of a monolayer and 10 nm.

According to yet another aspect of the present disclosure, the tunneling structure includes a superlattice structure with well layers sandwiched by barrier layers.

According to yet another aspect of the present disclosure, the thickness of the well layers or the barrier layers are modulated or gradually changed from one side of the tunneling structure to the other side of the tunneling structure.

According to yet another aspect of the present disclosure, the thickness of the superlattice structure is less than 20 nm, such as 10-15 nm.

According to yet another aspect of the present disclosure, the material composition of the well layers are modulated or gradually changed from one side of the tunneling structure to the other side of the tunneling structure.

According to yet another aspect of the present disclosure, the doping concentration of the well layers are modulated or gradually changed from one side of the tunneling structure to the other side of the tunneling structure.

Yet another embodiment of the present disclosure provides a SRAM cell structure, wherein the SRAM cell structure includes a plurality of transistors, a plurality of contacts, a set of first metal layers and a set of second metal layers. The plurality of transistors includes n transistors, wherein n is a positive integral less than 6. The plurality of contacts are coupled to the plurality of transistors. The set of first metal layers are disposed above and electrically coupled to the plurality of transistors. The set of second metal layers are disposed above the first metal layer and electrically coupled to the plurality of transistors. Wherein the plurality of contacts include a set of first contacts and a set of second contacts, the set of first contacts are connected to the set of first metal layers, and the set of second contacts are connected to the set of second metal layers but disconnected from the set of first metal layers.

According to another aspect of the present disclosure, a bottom surface of a n+ region of a first transistor in the plurality of transistors is fully isolated by a first insulator.

According to yet another aspect of the present disclosure, the SRAM cell structure further includes a first dielectric layer disposed between the set of second metal layers and the plurality of transistors; wherein a thickness of the first dielectric layer is between a thickness of a monolayer and 10 nm.

Yet another embodiment of the present disclosure provides a SRAM cell structure, wherein the SRAM cell structure includes a plurality of transistors including n transistors, wherein n is a positive integral less than 6. A first transistor of the plurality of transistors includes a gate structure with a length, a channel region, a first conductive region and a first contact hole. The first conductive region is electrically coupled to the channel region. The first contact hole is positioned above the first conductive region. Wherein a periphery of the first contact hole is independent from a photolithography process for forming the SRAM cell structure.

According to another aspect of the present disclosure, the periphery of the first contact hole is surrounded by a circumference of the first conductive region.

According to yet another aspect of the present disclosure, the SRAM cell structure further includes a VDD contacting line and a first dielectric layer. The VDD contacting line is electrically coupled to the pair of cross-coupled transistors. The first dielectric layer is disposed between the VDD contacting line and the plurality of transistors. Wherein a thickness of the first dielectric layer is between a thickness of a mono layer and 10 nm.

Yet another embodiment of the present disclosure provides set of SRAM cells, wherein the SRAM cell structure includes a set of SRAM cells including a first SRAM cell with a first dielectric layer, a second SRAM cell with a second dielectric layer. The first SRAM cell includes a first pair of cross-coupled transistors; a first VDD contacting line and a first VSS contacting line. The first VDD contacting line is electrically coupled to the first pair of cross-coupled transistors. The first VSS contacting line electrically coupled to the first pair of cross-coupled transistors. The first dielectric layer is disposed between the first VDD contacting line and first pair of cross-coupled transistors; wherein a thickness of the first dielectric layer is between a thickness of a monolayer and 10 nm. The second SRAM cell includes a second pair of cross-coupled transistors, a second VDD contacting line and a second VSS contacting line. The second VDD contacting line is electrically coupled to the second pair of cross-coupled transistors. The second VSS contacting line is electrically coupled to the second pair of cross-coupled transistors. The second dielectric layer is disposed between the second VDD contacting line and the second pair of cross-coupled transistors. Wherein a thickness of the second dielectric layer is between a thickness of a monolayer and 10 nm, and the thickness of the first dielectric layer is identical to or different from the thickness of the second dielectric layer.

Yet another embodiment of the present disclosure provides set of SRAM cells, wherein the SRAM cell structure includes a set of SRAM cells including a first SRAM cell with a first tunneling structure, a second SRAM cell with a second tunneling structure. The first SRAM cell includes a first pair of cross-coupled transistors; a first VDD contacting line and a first VSS contacting line. The first VDD contacting line is electrically coupled to the first pair of cross-coupled transistors. The first VSS contacting line electrically coupled to the first pair of cross-coupled transistors. The first tunneling structure is disposed between the first VDD contacting line and first pair of cross-coupled transistors. The second SRAM cell includes a second pair of cross-coupled transistors, a second VDD contacting line and a second VSS contacting line. The second VDD contacting line is electrically coupled to the second pair of cross-coupled transistors. The second VSS contacting line is electrically coupled to the second pair of cross-coupled transistors. The second tunneling structure is disposed between the second VDD contacting line and the second pair of cross-coupled transistors.

According to yet another aspect of the present disclosure, wherein the first tunneling structure includes a first dielectric layer and the second tunneling structure includes a second dielectric layer, the first dielectric layer and the second dielectric layer are made of boron nitride, $CaF_2$, $SiO_2$, $HfO_2$, $Ta_2O_5$, or Perylene-3,4,9,10-tetracarboxylic dianhydride (PTCDA), and a thickness of the first dielectric layer is different from that of the second dielectric layer.

According to yet another aspect of the present disclosure, wherein the first tunneling structure includes a first superlattice structure with well layers sandwiched by barrier layers, and the second tunneling structure includes a second superlattice structure with well layers sandwiched by barrier layers.

According to yet another aspect of the present disclosure, wherein the thickness of the first superlattice structure is different from the thickness of the second superlattice structure According to yet another aspect of the present disclosure, wherein the change of thickness of the well layers or the barrier layers in the first superlattice structure is different from the change of thickness of the well layers or the barrier layers in the second superlattice structure.

According to yet another aspect of the present disclosure, the change of material composition of the well layers in the first superlattice structure is different from the change of material composition of the well layers in the second superlattice structure.

According to yet another aspect of the present disclosure, the change of doping concentration of the well layers in the first superlattice structure is different from the change of doping concentration of the well layers in the second superlattice structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects of the disclosure will become better understood with regard to the following detailed description of the preferred but non-limiting embodiment(s). The following description is made with reference to the accompanying drawings:

FIG. 5(d)~FIG. 5(f) show the change of thickness of well layers in superlattice structure of the tunneling structure according to the present invention.

FIG. 7(l) is the top view of the FIG. 7(k).

FIG. 8(*i*) is a cross-sectional view taken along the cutting line C8G2 as depicted in FIG. 8(*g*).

FIG. 8(*j*) is a top view illustrating a structure after the conduction layer is formed over the over the upper dielectric layer according to one embodiment of the present disclosure.

FIG. 8(*k*) is a cross-sectional view taken along the cutting line C8J1 as depicted in FIG. 8(*j*).

FIG. 8(*l*) is a cross-sectional view taken along the cutting line C8J2 as depicted in FIG. 8(*j*).

FIG. 9(*b*) is a cross-sectional view taken along the cutting line C9A1 as depicted in FIG. 9(*a*).

FIG. 9(*c*) is a cross-sectional view taken along the cutting line C9A2 as depicted in FIG. 9(*a*).

FIG. 9(*d*) is a top view of the constructed phase of a mMOSFET used in the new 4T SRAM according to yet another embodiment of the present disclosure.

FIG. 9(*e*) is a cross-sectional view taken along the cutting line C9D1 as depicted in FIG. 9(*d*).

FIG. 9(*f*) is a cross-sectional view taken along the cutting line C9D2 as depicted in FIG. 9(*d*).

DETAILED DESCRIPTION OF THE DISCLOSURE

Figure 1A:
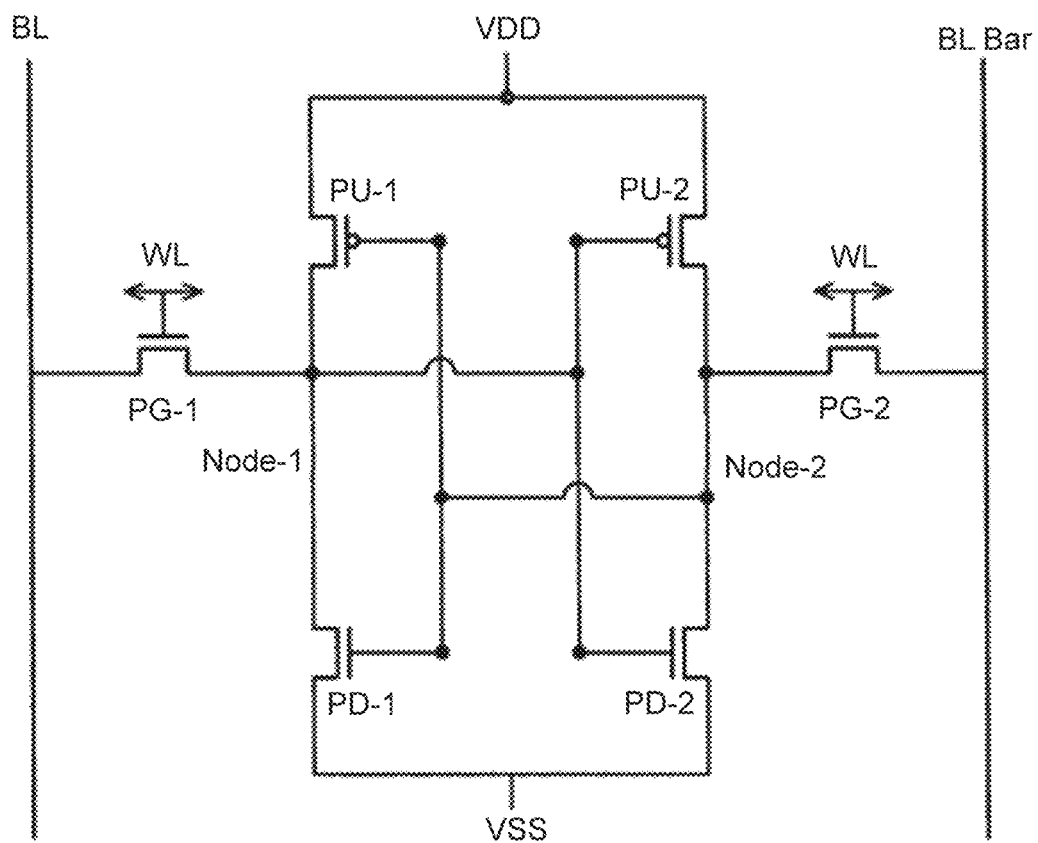
FIG. 1A is a schematic diagram for a regular 6T SRAM cell.
Figure 1B:
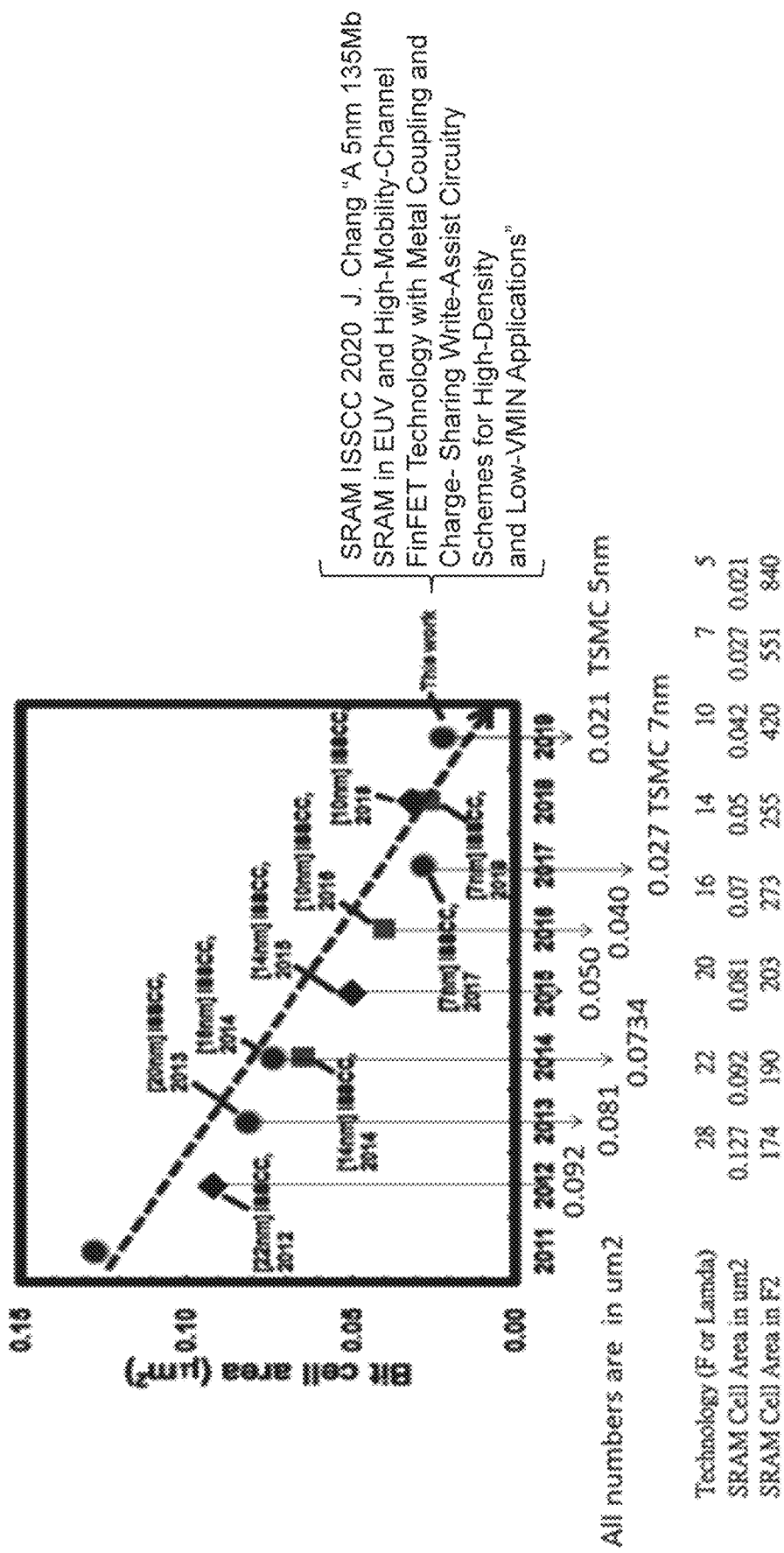
FIG. 1B is a diagram illustrating the total area of the SRAM cell in terms of $\lambda^2$ (or $F^2$) for different process dimension A (or F) according to the currently available manufacture processes.
Figure 1C:
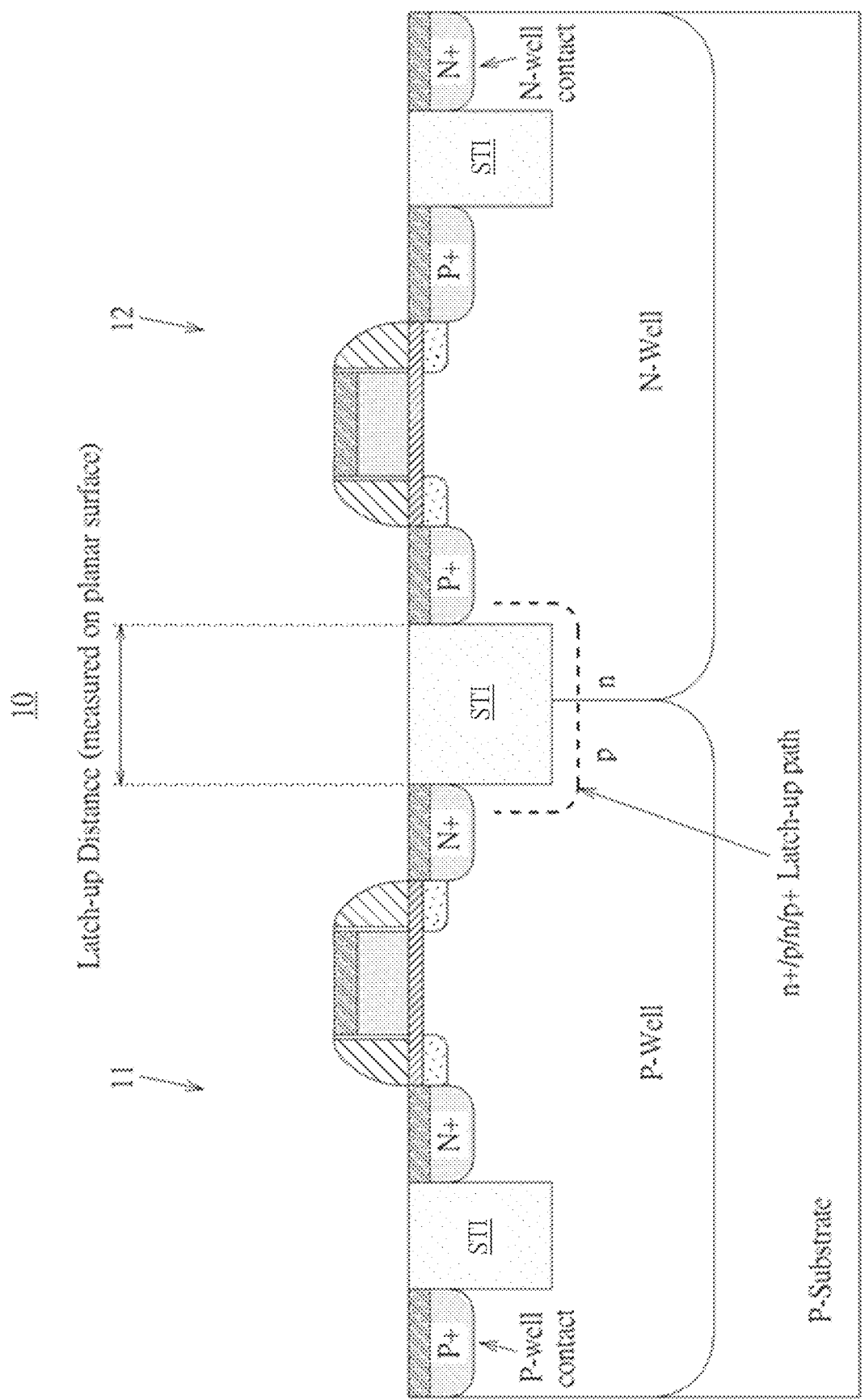
FIG. 1C is a diagram illustrating a diagram illustrating a cross-sectional of a traditional NMOS and PMOS structure.
Figure 1D:
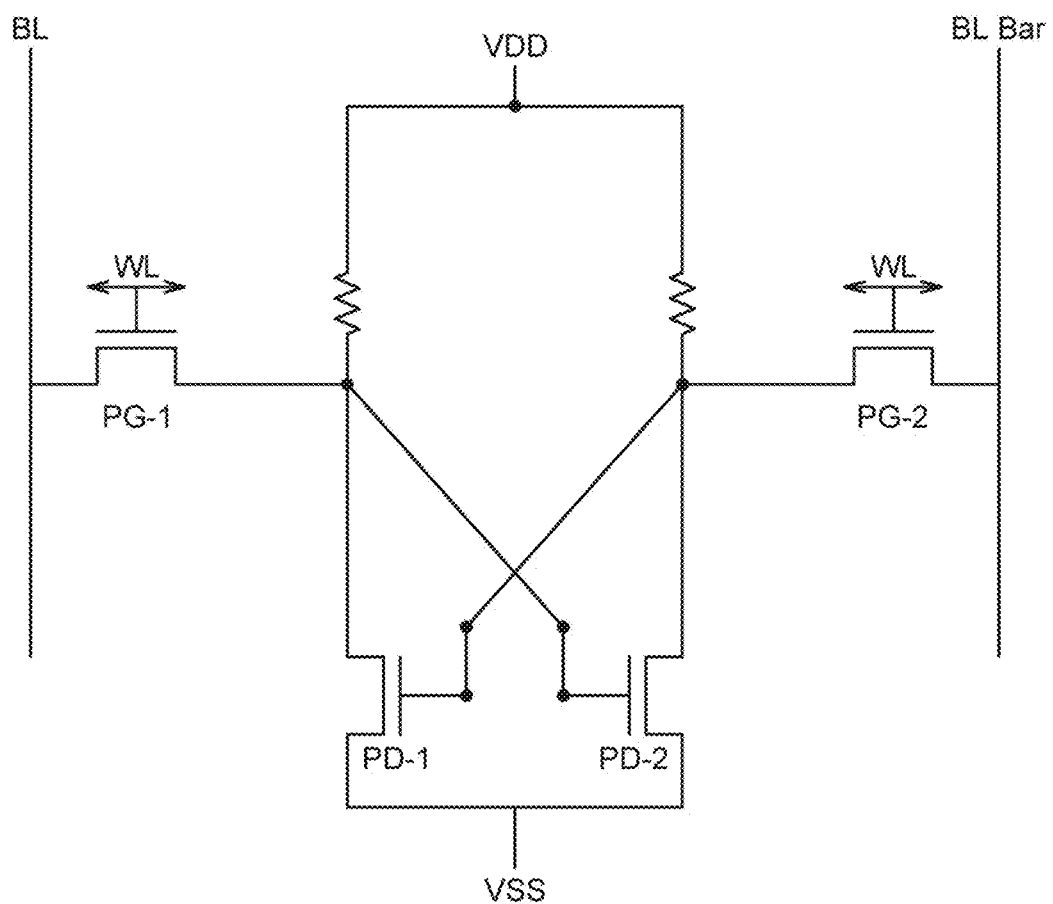
FIG. 1D is a schematic diagram for a 4T SRAM cell in which the original two PMOS pull-up transistors PU-1 and PU-2 of the 6T SRAM as depicted in FIG. 1A are replaced by two load resistors.
Figure 1E:
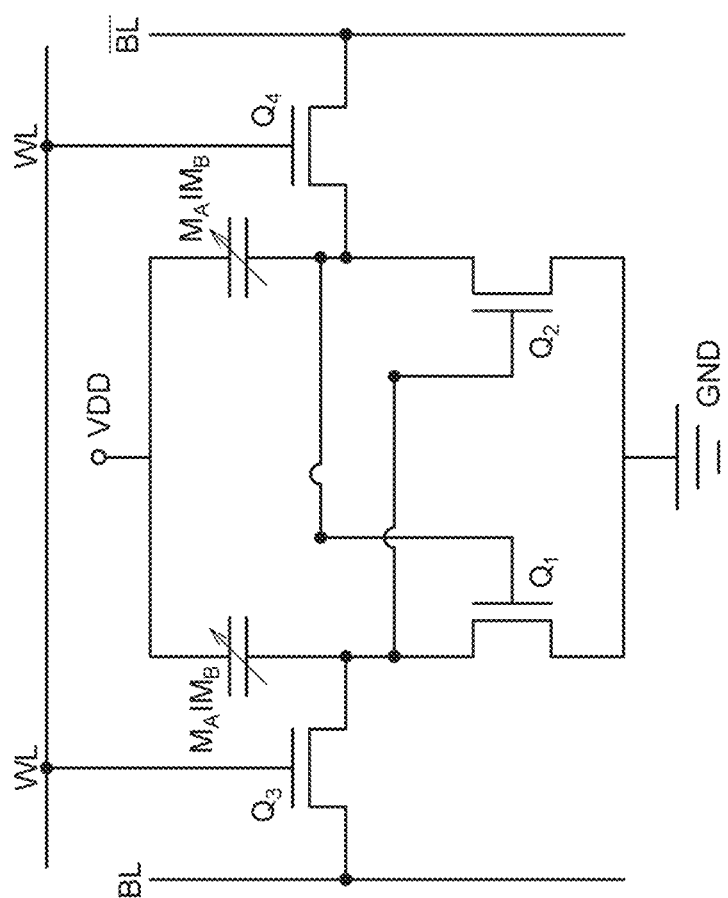
FIG. 1E is a schematic diagram for a 4T SRAM cell in which the original two PMOS pull-up transistors PU-1 and PU-2 of the 6T SRAM as depicted in FIG. 1A are replaced by two metal-dielectric (insulator) layer-metal structure (hereinafter "resistive load MIM").

In traditional 6T SRAM cell, even miniaturization of the manufacture process node is down to the 28 nm or lower (so called, "minimum feature size", "$\lambda$", or "F"), the size of transistor could not be diminished proportionally. The present invention discloses a new 4T SRAM cell structure is proposed in which the original two PMOS pull-up transistors PU-1 and PU-2 of the traditional 6T SRAM cell (e.g. the 6T SRAM cell as depicted in FIG. 1A) are replaced by two resistive load MIM (metal-insulator-metal) structures (such as $M_AIM_B$ shown in FIG. 1E). The replacement of 2 PMOS transistors by resistive load MIMs (also referred as to variable MIMs) or $M_AIM_B$ can reduce the conventional 6T bit cell layout area in x and y dimensions. The resistive load MIMs $M_AIM_B$ are respectively inserted between the Vdd contacting line and the plurality of transistors Q3 and Q4 (or between the Vdd contacting line and the plurality of transistors Q1 and Q2, as shown in FIG. 1E).

Figure 2:
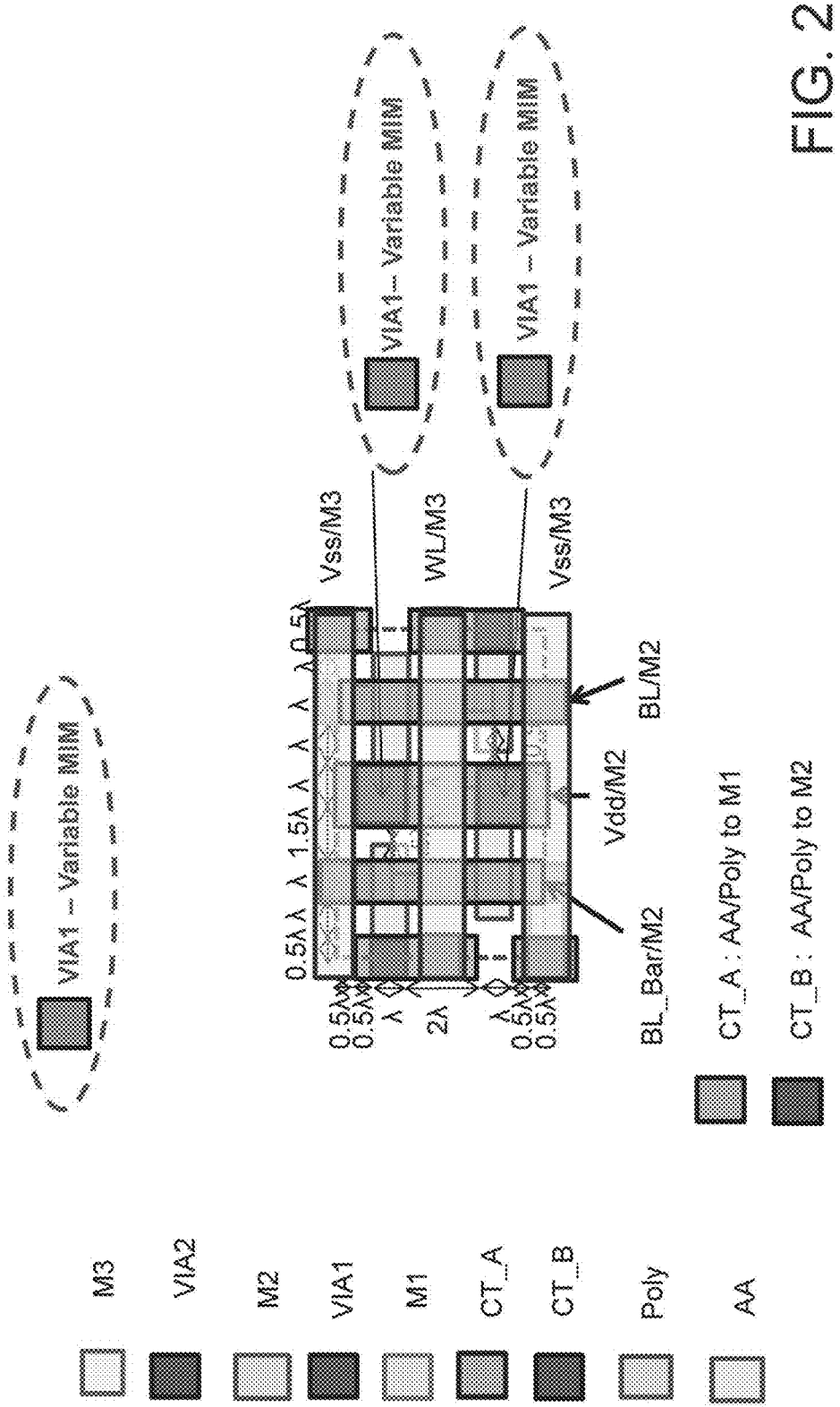
FIG. 2 is a stick diagram of the new 4T SRAM with dimension according to the present invention.

FIG. 2 is a stick diagram of the new 4T SRAM with dimension according to the present invention. The exemplary layout styles of the 4T SRAM cell structure design as described herein can achieve compact SRAM design of bit cell size of $51\lambda^2$. ($\lambda$: Lambda is the minimum feature of size of the technology node; WL: word line; BL: bit line; BL_bar: bit line bar; VDD: voltage high; VSS: voltage low or ground; M2: level two interconnection' M3: level three interconnection).

In FIG. 2, the meaning of the abbreviated symbols are as follows:

| | |
|---|---|
| Bit cell boundary | The boundary of the area of the single SRAM cell. |
| M3 | The Metal-3 layer |
| VIA2 | The VIA Mask layer for connecting the Metal-2 layer to the Metal-3 layer |
| M2 | The Metal-2 layer |
| VIA1 | The VIA Mask layer for connecting the Metal-1 layer to the Metal-2 layer |
| M1 | The Metal-1 layer |
| CT_A | Opening VIA Mask layer for connecting AA (or Poly) to the Metal-1 layer, wherein "AA" means the active region (source or drain), and "Poly" means gate region. |
| CT_B | Opening VIA Mask layer for connecting AA (or Poly) directly to the Metal-2 layer |
| Poly | The Mask layer for Polysilicon Gate or Metal Gate |
| AA | The Mask layer for Active Area (such as drain region or source region) |
| WL | Word-line |
| BL/BLB | Bit line/Bit line Bar |
| Vdd | Vdd voltage source |
| Vss | Vss voltage source |

Especially, a plurality of CT_A (Opening VIA Mask layer for connecting AA (or Poly) to the Metal-1 layer) and CT_B (Opening VIA Mask layer for directly connecting AA (or Poly) to the Metal-2 layer) are formed. The Metal-1 layers (M1) are formed to connect the plurality of CT_A, however, the plurality of CT_B do not connect to the Metal-1 layers (M1). The Metal-2 layers (M2) are formed at least to connect the plurality of CT_B. One Metal-2 layers (M2) is used as metal wires (the Vdd contacting line) connected to the Vdd voltage source, and the other two of the Metal-2 layers (M2) are used as bit line (BL) and bit line bar (BL Bar). One Metal-3 layer (M3) is used as the word line (WL), and the other two Metal-3 layers are used as metal wires (Vss contacting line) for connecting the Vss.

In the present embodiment, the resistive load $M_AIM_B$ are disposed between the Metal-1 layer (M1) of transistors Q3 and Q4, and the Metal-2 layers (M2) used as metal wires (the Vdd contacting line) connected to the Vdd voltage source. In detail, each of the resistive load $M_AIM_B$ is made of a dielectric layer disposed between the Metal-1 layer (M1) and the Metal-2 layers (M2), and in one embodiment the portions of the Metal-1 layer (M1) or the Metal-2 layers (M2) contact with the dielectric layer. In another embodiment, the dielectric layer overlaps with the VIA Mask layer (VIA1) for connecting the Metal-1 layer (M1) or the Metal-2 layer (marked by dash oval in FIG. 2) in the z direction.

The dielectric layer made of the resistive load MIMs may be formed by a band gap material, by which the dielectric layer will conduct current based on tunneling effect. In some embodiments of the present disclosure, the dielectric layer made of the resistive load MIMs may be selected form a group consisting of boron nitride (hBN), $CaF_2$, $SiO_2$, $HfO_2$, $Ta_2O_5$, $Al_2O_3$, Perylene-3,4,9,10-tetracarboxylic dianhydride (PTCDA) and the arbitrary combinations thereof. In the present embodiment, the dielectric layer used for forming the resistive load MIMs is made of hexagonal boron nitride (hBN). Wherein the equivalent oxide thickness of hBN, $CaF_2$, $SiO_2$, $HfO_2$, $Al_2O_3$, $Ta_2O_5$ and PTCDA are 1.28, 2.15, 1, 6.41, 2.31, 15.5 and 6-15, respectively.

Figure 3A:
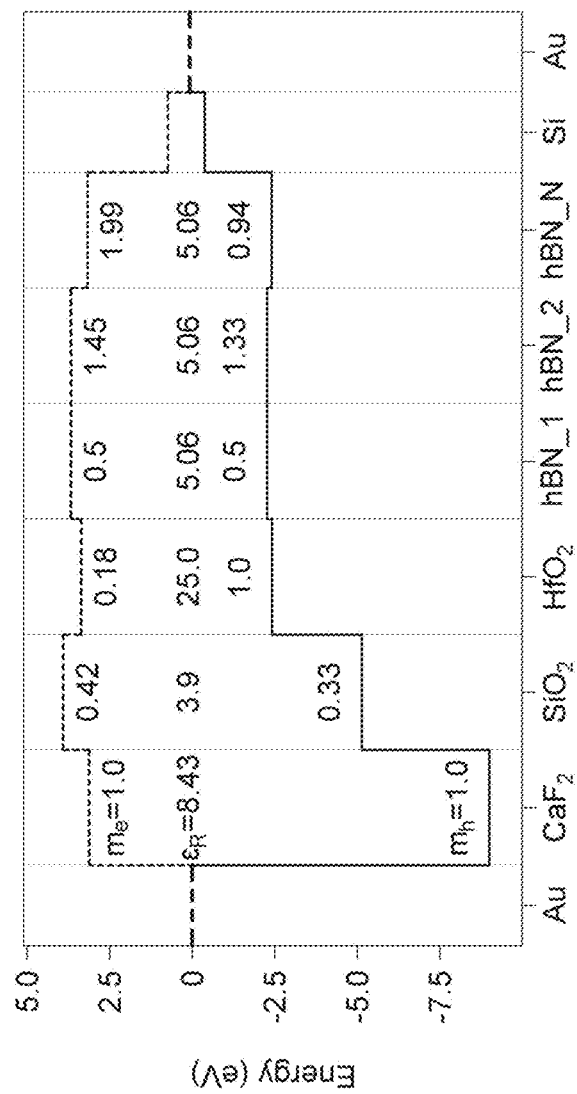
FIG. 3(a) is the band energy (Ev) levels of hBN with different number layers in comparison with that of other semiconductor materials.
Figure 3B:
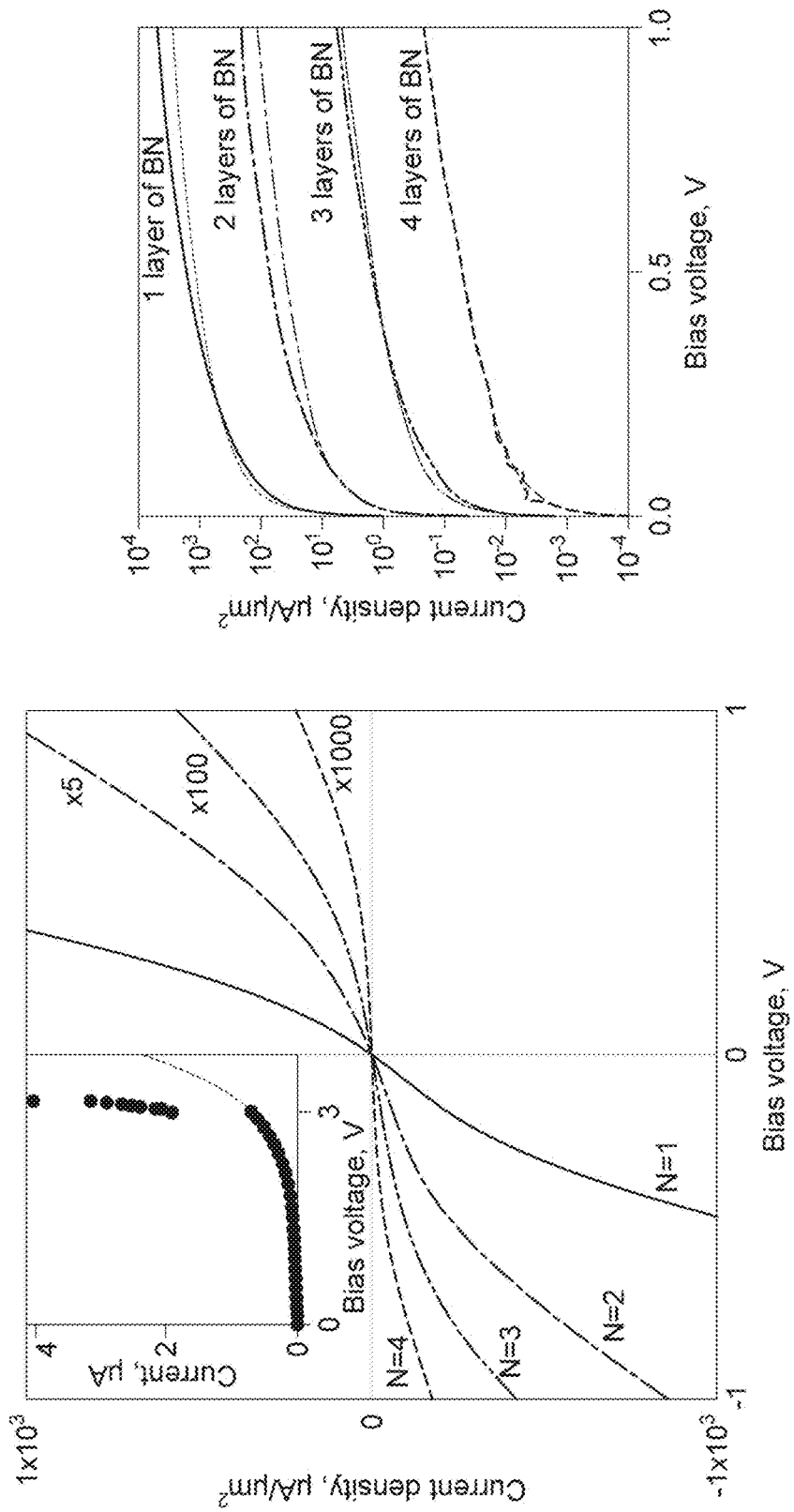
FIG. 3(b) are diagrams illustrating the characteristic I-V curves of graphite/hBN/graphite devices using different number layers of hBN and that in the log scale.

FIG. 3(*a*) is the band energy (Ev) levels of hBN with different number layers in comparison with that of other semiconductor materials. FIG. 3(*b*) are diagrams illustrating the characteristic I-V curves of graphite/hBN/graphite devices using different number layers of hBN and that in the log scale. The hBN can achieve wide resistance tuning range by stacking hBN layers to form MIM to meet either high performance or low leakage SRAM requirement as shown in FIG. 3(b). The hBN deposit can be used by the conventional semiconductor manufacture process. The electrical behavior of this wide bandgap material is using electron tunneling mechanism to conduct current. The tunneling mechanism of hBN material makes itself much less sensitive to temperature variation than poly load resistor. The hBN is a bi-directional conductive insulator.

Moreover, the thickness of the dielectric material utilized in the present invention could be between one layer ("one monolayer") to multiple layers, such as, between one monolayer to 10 nm. Of course, in a set of SRAM cells, different SRAM cell could have different thickness of the dielectric material utilized in the resistive load MIM of the SRAM cell. Therefore, different SRAM cell could have different performance.

Figure 4A:
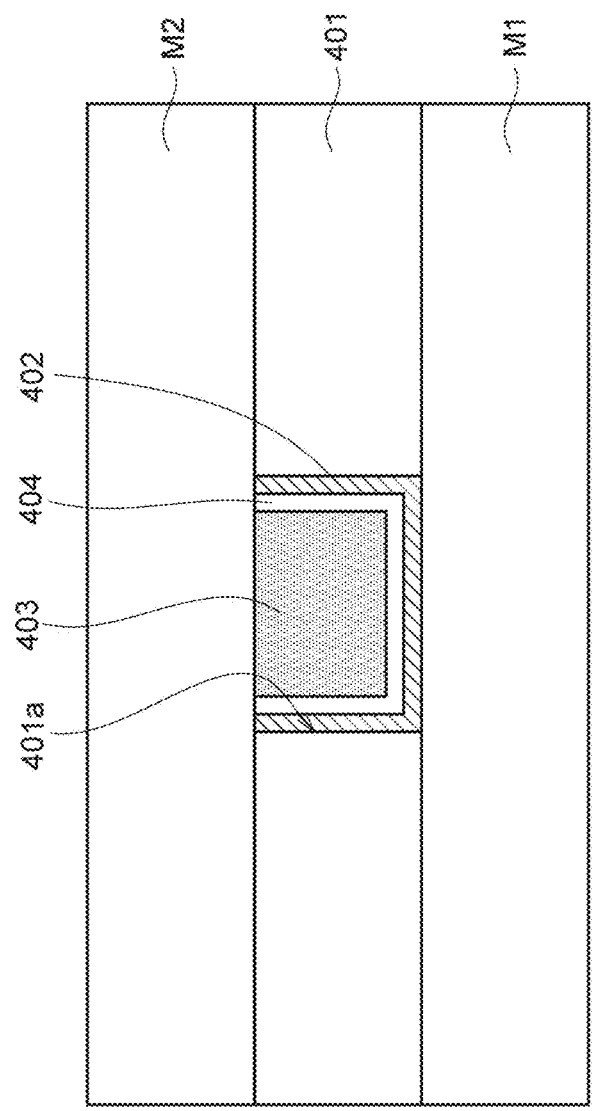
FIG. 4(a) is a prospective view illustrating a resistive load MIM as depicted in FIG. 2 according to one embodiment of the present disclosure.
Figure 4B:
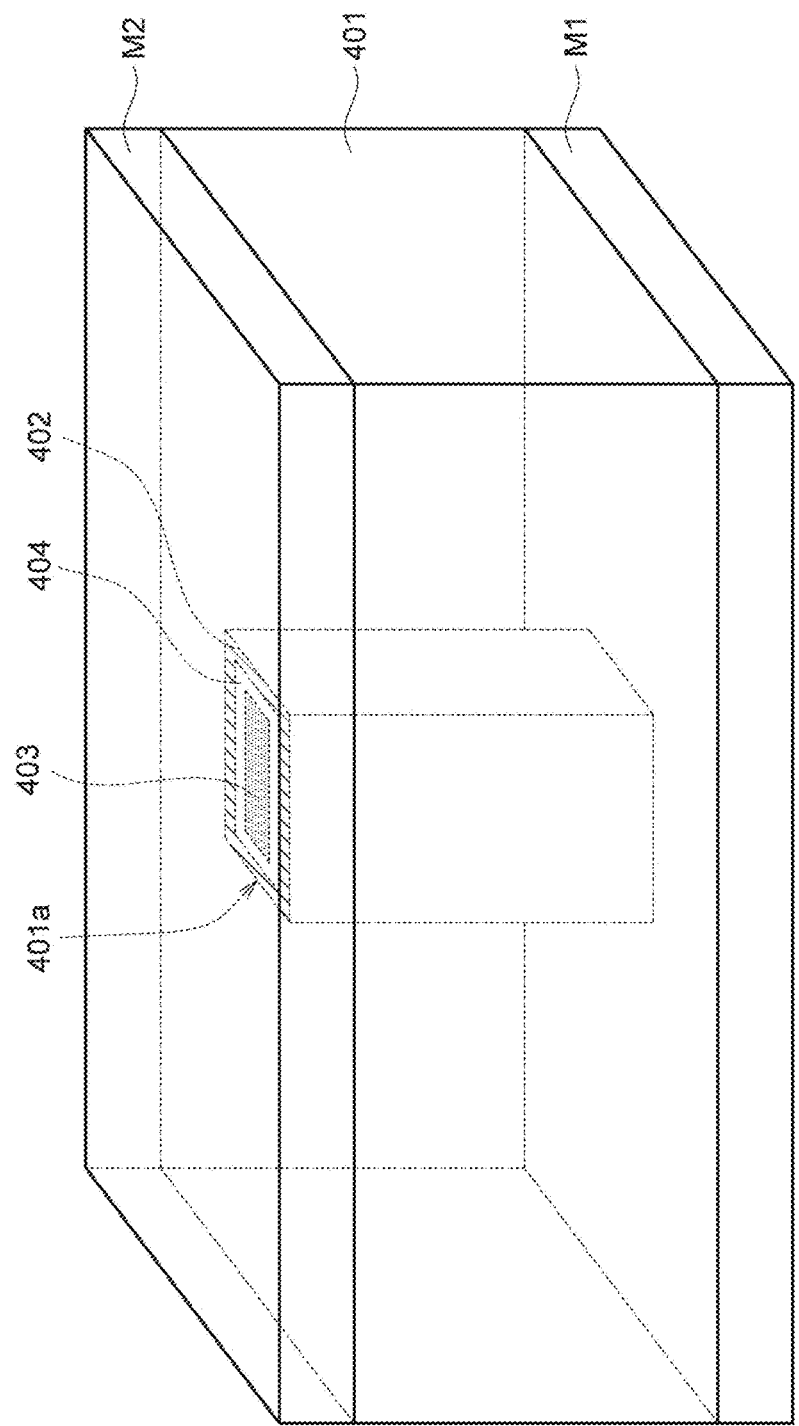
FIG. 4(b) is a cross-sectional view of the resistive load MIM as depicted in FIG. 4(a).

FIG. 4 (a) is a prospective view illustrating a resistive load MIM or $M_AIM_B$ as depicted in FIG. 2 according to one embodiment of the present disclosure; FIG. 4 (b) is a cross-sectional view of the resistive load MIM as depicted in FIG. 4 (a). The forming of the resistive load MIM includes steps of follows:

In the present embodiment, prior to forming the Metal-2 layer (M2), a dielectric layer 401 is formed on the Metal-1 layer (M1). A through hole 401a passing through the dielectric layer 401 is then formed to expose a portion of the Metal-1 layer (M1). Next, at least one layer of the hBN material 402 may be formed to cover the sidewalls of the through hole 401a and the exposed surface of the Metal-1 layer (M1).

Subsequently, a conductive via plug 403 is formed in the through hole 401 by filling conductive material, such as tungsten (W), in the through hole 401 and contact to the hBN material 402. After a planarization process performed on the conductive via 403 and the dielectric layer 401, the Metal-2 layer (M2) is formed thereon and electrically contact to the conductive via plug 403. In some embodiments of the present disclosure, the forming of the conductive via plug 403 further including coating a titanium nitride (TiN) layer 404 on the hBN material 402 prior to fill the conductive material.

FIG. 5 (a) is a prospective view illustrating a resistive load MIM or $M_AIM_B$ as depicted in FIG. 2 according to another embodiment of the present disclosure; FIG. 5 (b) is a cross-sectional view of the resistive load MIM as depicted in FIG. 5 (a). The forming of the resistive load MIM includes steps of follows:

In the present embodiment, prior to forming the Metal-2 layer (M2), a dielectric layer 501 is formed on the Metal-1 layer (M1). A conductive via plug 503 is formed in the dielectric layer 501. The conductive via plug 503 includes a TiN layer 504, a tungsten plug 503a and a copper pad 503b. Wherein the TiN layer 504 is formed to cover sidewalls of a through hole 501a that is formed in the dielectric layer 501 and the portion of the Metal-1 layer (M1) that is exposed through the through hole 501a, and the tungsten plug 503a is formed by conductive material, such as tungsten (W), filled in the through hole 501a.

A portion of the tungsten plug 503a is then removed; and the copper pad 503b is formed on the top of the through hole 501a and the tungsten plug 503a. After a planarization process performed on the copper pad 503b and the dielectric layer 501, at least one layer of the hBN material 502 is formed on and electrically contact to the copper pad 503b. Subsequently the Metal-2 layer (M2) is formed on and electrically contacts to the hBN material 502.

The operation of the new 4T SRAM design with two resistive load MIMs or $M_AIM_B$s (also referred to as two load resistors RL1 and RL2) was studied. Reasonable static margin (SNM) of the new 4T SRAM with different word line (WL) voltage can be maintained within a fairly large range of RL1 and RL2 of 20-400 kΩ. And the response time of a cell under a balance load condition is with in nano-seconds. In some embodiments of the present disclosure, the dynamic read and write characteristics can be altered by adjusting the contact area (λ*λ) and/or thickness (or number of layers) of the hBN material 502 involved in the resistive load MIMs or $M_AIM_B$. For example, resistor of 400 K-range ohm can be realized with one layer of hBN of 580K ohm. If the higher resistance is required to reduce the leakage current, 29G ohm can be realized with stacking 4 layers of hBN material 502 (the calculation can be based on the characteristic I-V curves FIG. 3(b)).

Based on the tunneling effect in the MIM structure, the hBN material 402 (or other suitable dielectric material in the aforesaid paragraphs) of MIM structure could be replaced by quantum wells/barriers (or superlattice structure, SPSL), and becomes "MQM". The quantum wells/barriers or superlattice structure includes multiple well layers that are thin layers of low bandgap semiconductor material sandwiched by high bandgap barrier layers. In particular, a quantum well layer is so thin that allowable energy levels in the quantum well take on discrete values, so that a quantum well exhibits a substantial density of states at the lowest allowed (discrete) energy level compared to bulk material. With the electrical voltage applied on both sides of the superlattice structure, current will flows from one side to the other sides according tunneling effect. Therefore, such quantum wells/barriers or superlattice structure could replace the hBN material 402 in MIM structure.

Figure 5A:
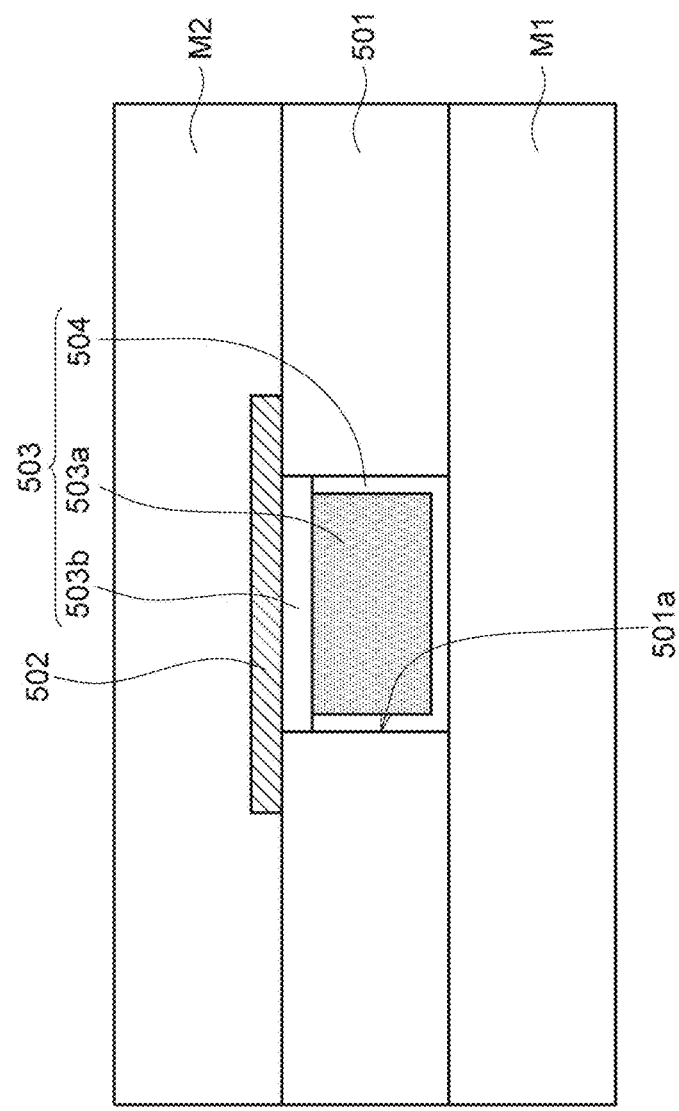
FIG. 5(a) is a prospective view illustrating a resistive load MIM as depicted in FIG. 2 according to another embodiment of the present disclosure.
Figure 5B:
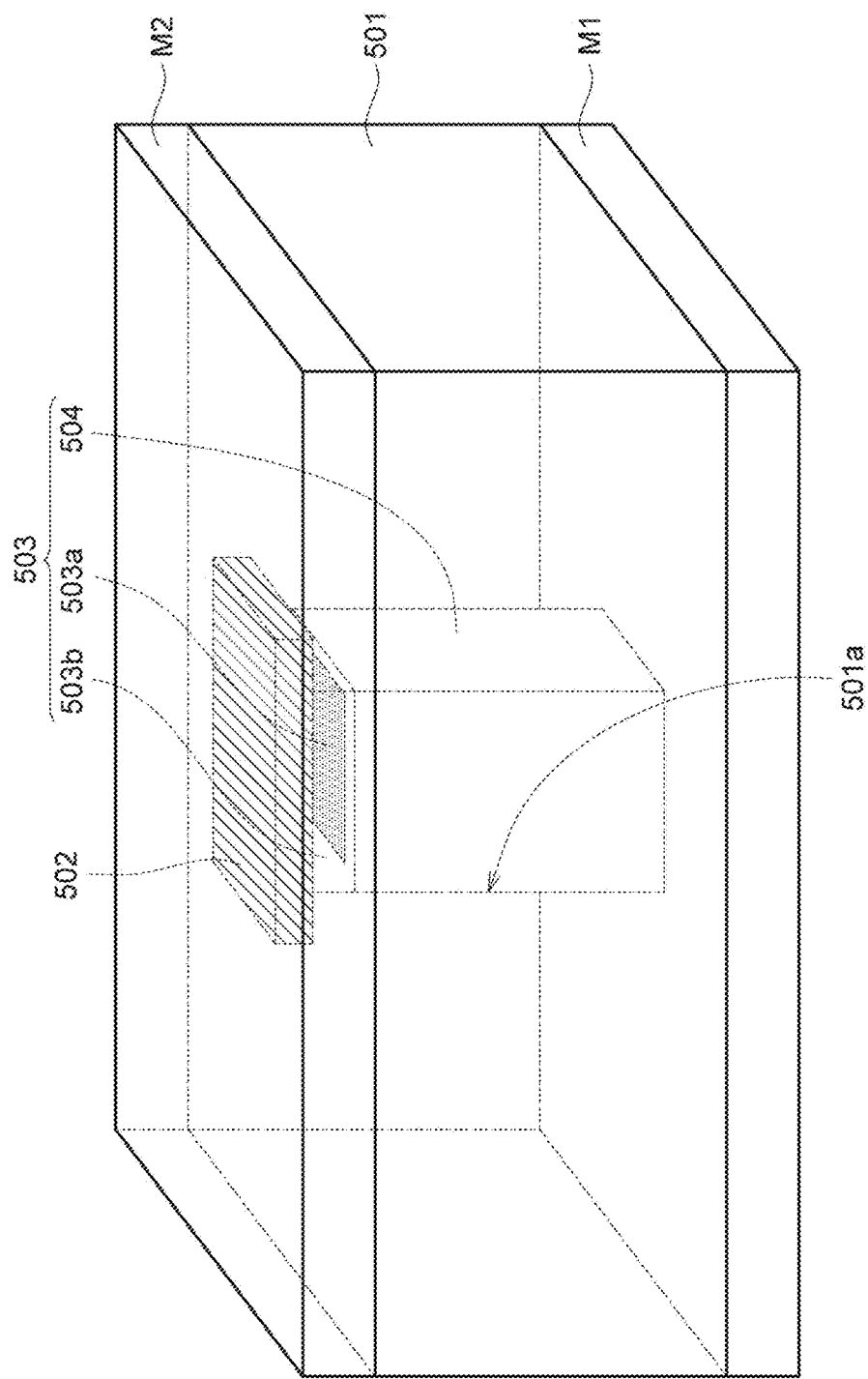
FIG. 5(b) is a cross-sectional view of the resistive load MIM as depicted in FIG. 5(a).
Figure 5C:
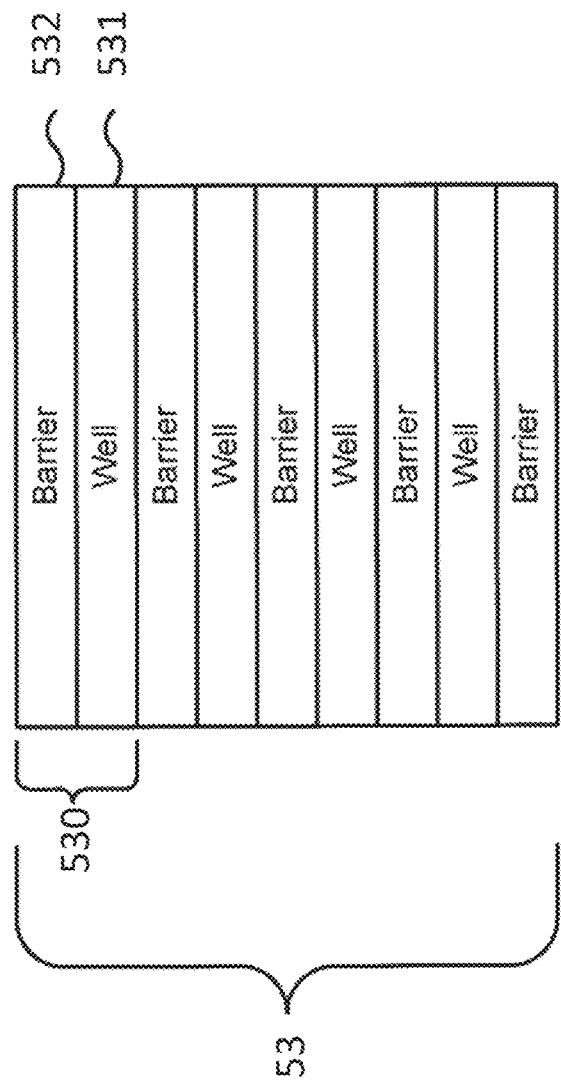
FIG. 5(c) shows a quantum wells/barrier or superlattice structure of the tunneling structure according to the present invention.

As shown in FIG. 5(c), the quantum wells/barriers or superlattice structure 53 may include a periodically repeating structure 530 of layers including a well layer 531 and a barrier layer 532 on the well layer 531. There may be 3-5 periodically repeating structure 530. In particular, the barrier layer 532 may be positioned between the well layer 530, and each well layer 531 may be positioned between a pair of barrier layers 532. For example, the well layer 531 could be $Si_xGe_{1-x}$ (direct bandgap~=3.1 eV for $Si_{0.75}Ge_{0.25}$; ~=2.5 eV for $Si_{0.5}Ge_{0.5}$; ~=1.6 eV for $Si_{0.25}Ge_{0.75}$), and barrier layer could be Si (direct bandgap=3.4 eV). Thus, changing the material composition in a well changes the bandgap of the quantum well/barrier structure or superlattice structure, for example, gradually increased or decreased x of from one side to the other side, or other modulated thickness from one side to the other side. Such changed material composition may affect the I-V curve of the MQM structure.

The thickness of a well layer may be extremely small, for example less than about 2 nm. However, the thickness of the well layers can be accurately controlled by controlling the growth time of the well layers. Thus, the quantum well/barrier structure or superlattice structure according to the present invention may have well layers of varying thickness, for example, gradually increased or decreased thickness from one side to the other side, or other modulated thickness (such as periodic change) from one side to the other side, as shown in FIG. 5(d)~5(f). Of course, the thickness of a barrier layer may be small as well, for example less than about 3~4 nm, and the quantum well/barrier structure or superlattice structure according to the present invention may have barrier layers of varying thickness, for example, gradually increased or decreased thickness from one side to the other side, or other modulated thickness (such as periodic change) from one side to the other side. Such changed thickness may affect the I-V curve of the MQM structure.

Moreover, the doping concentration in well layer or barrier layer could be changed such that the doping concentration in well layer (or barrier layer) is gradually increased or decreased from one side to the other side, or other modulated changed (such as periodic change) from one side to the other side. Such changed doping concentration may affect the I-V curve of the MQM structure.

No matter MIM structure or MQM structure, both of which are tunneling structure according to the present invention. The tunneling structure herein has two terminals on which an electrical voltage could be applied, then due to the tunneling effect, current will flows from one side to the other side, or vice versa. Therefore, the tunneling structure has bilateral current directions.

Figure 5G:
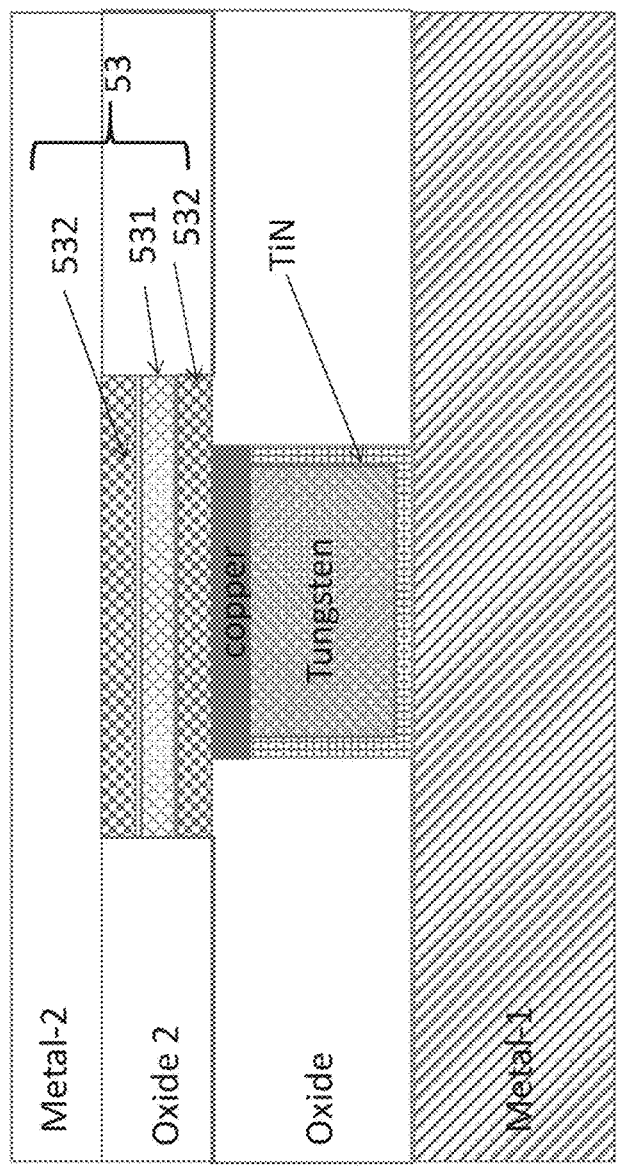
FIG. 5(g) and FIG. 5(h) show MQM structures, each of MQM includes a superlattice structure with two barrier layers and one well layer between the two barrier layers.
Figure 5H:
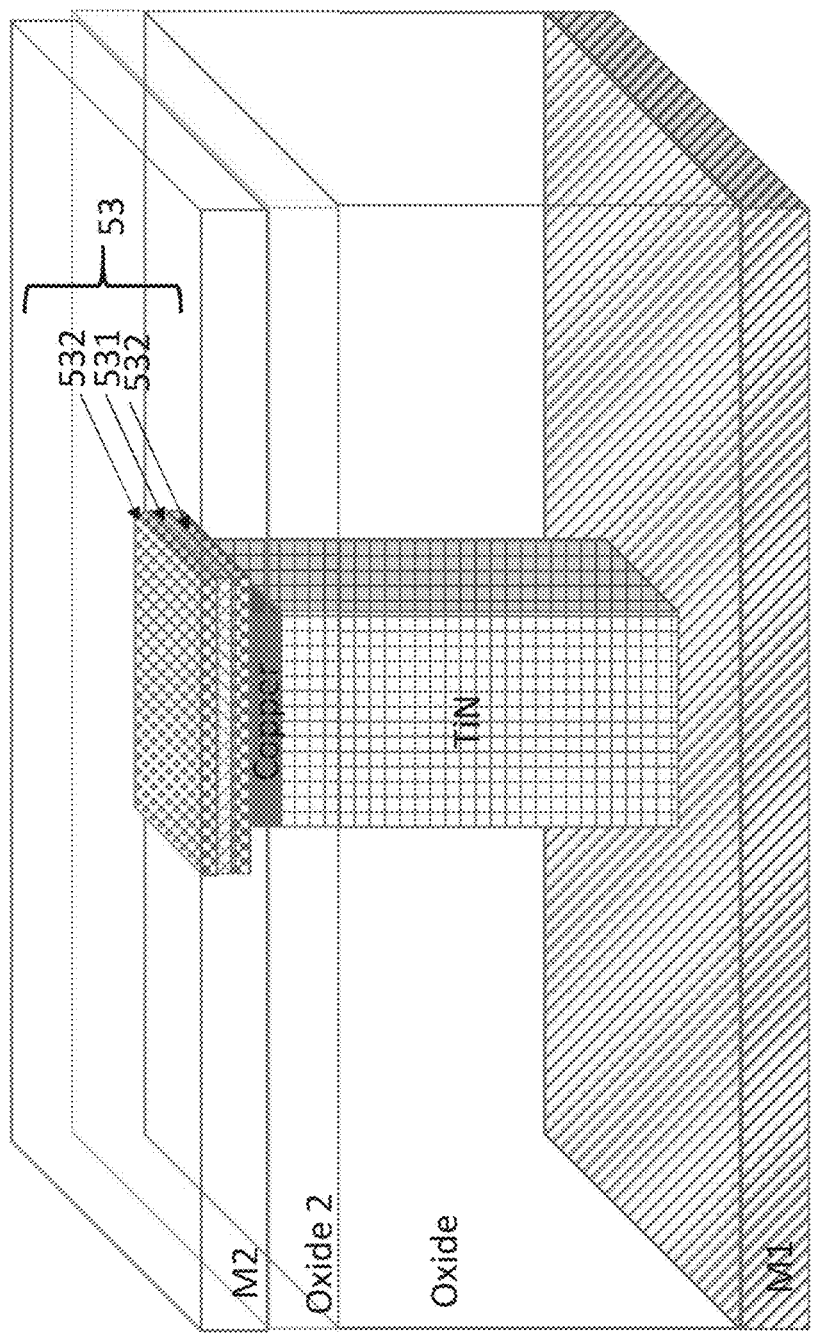

FIG. 5(g) and FIG. 5(h) show two different MQM structures capable to be used in the SRAM structure according to the present invention, wherein each MQM includes a superlattice structure 53 with two barrier layers 532 and one well layer 531 between the two barrier layers 532.

Figure 6:
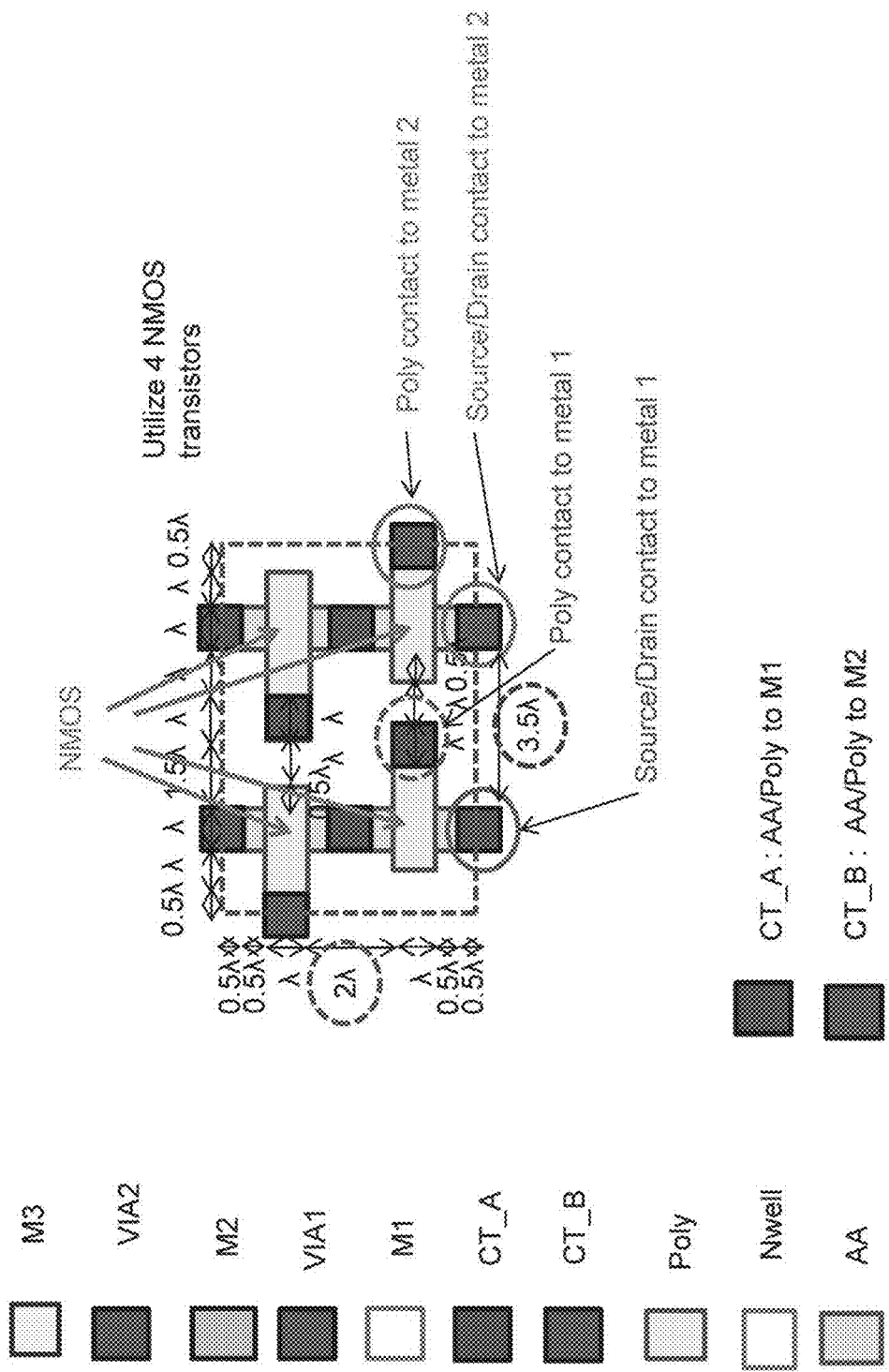
FIG. 6 is an example of a miniaturized metal oxide semiconductor field effect transistor (mMOSFET) used in the new 4T SRAM according to one embodiment of the present disclosure.

In addition, the present invention discloses a new 4T SRAM cell structure in which the linear dimensions of the source, the drain and the gate of the transistors in the SRAM are precisely controlled, and the linear dimension can be as small as the minimum feature size, Lamda ($\lambda$). In traditional 6T SRAM cell, even miniaturization of the manufacture process node is down to the 28 nm or lower (so called, "minimum feature size", "$\lambda$", or "F"), the size of transistor could not be diminished proportionally. However, in the present embodiment, when two adjacent transistors are connected together through the drain/source, the distance between the edges of the gates of the two adjacent transistors could be as small as 2A (marked by blue dash oval), as shown in FIG. 6. Additionally, a linear dimension for a contact hole for the source, the drain and the gate could be less than $\lambda$, such as $0.6\lambda$~$0.8\lambda$, can be achieved within the drain area (so is within the source area and the gate area).

As shown in FIG. 6, the source/drain contacts (for connection to the Metal-1 layer (M1)) could be formed over the active regions. The present invention uses the temporary Dummy-Shield-Gate (DSG) added on the Gate-Level Mask to achieve making the designed distance from the Gate Edge to the Boundary Edge between the Source Region and the Isolation Region (GEBESI) sharply by avoiding Photolithographic Misalignment Tolerances (MTP).

Figure 7A:
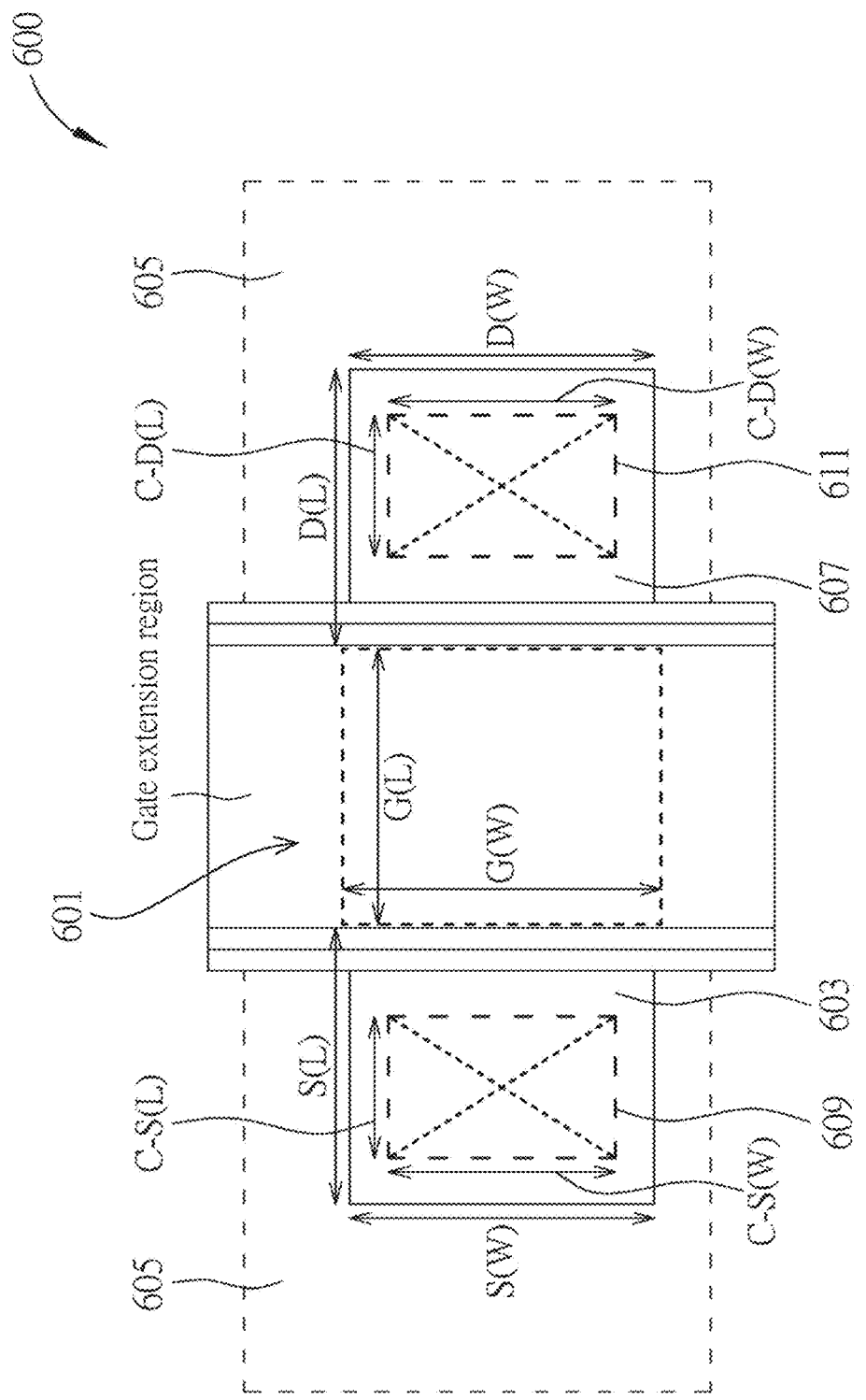
FIG. 7(a) is a diagram illustrating a top view of a miniaturized metal-oxide-semiconductor field-effect transistor (mMOSFET) used in the new 4T SRAM according to the present invention.

FIG. 7(a) is an example of a miniaturized metal oxide semiconductor field effect transistor (mMOSFET) 600 used in the new 4T SRAM according to one embodiment of the present invention. As shown in FIG. 7(a), the mMOSFET 600 includes: (1) a gate structure 601 has a length G(L) and a width G(W), (2) on a left-hand side of the gate structure 601, a source 603 has a length S(L) which is a linear dimension from an edge of the gate structure 601 to an edge of an isolation region 605 and a width S(W), (3) on a right-hand side of the gate structure 601, a drain 607 has a length D(L) which is a linear dimension from the edge of the gate structure 601 to the edge of the isolation region 605 and a width D(W), (4) at a center of the source 603, a contact-hole 609 formed by a self-alignment technology has length and width of an opening labeled as C-S(L) and C-S(W), respectively, and (5) similarly at a center of the drain 607, a contact hole 611 formed by the self-alignment technology has length and width of an opening labeled as C-D(L) and C-D(W), respectively. The length G(L), the length D(L), and the length S(L) could be precisely controlled as small as the minimum feature size A. Furthermore, the length and width of an opening labeled as C-S(L) and C-S(W) or the length and width of an opening labeled as C-S(L) and C-S(W) could be less than A, such as $0.6\lambda$~$0.8\lambda$.

The following briefly describes the manufacture process for the aforesaid mMOSFET 600 used in the SRAM of the present invention. The detailed description for the structure of the mMOSFET 600 and the manufacture process thereof is presented in the U.S. patent application Ser. No. 17/138,918, filed on Dec. 31, 2020 and entitled: "MINIATURIZED TRANSISTOR STRUCTURE WITH CONTROLLED DIMENSIONS OF SOURCE/DRAIN AND CONTACT-OPENING AND RELATED MANUFACTURE METHOD", and the whole content of the U.S. patent application Ser. No. 17/138,918 is incorporated by reference herein.

Figure 7B:
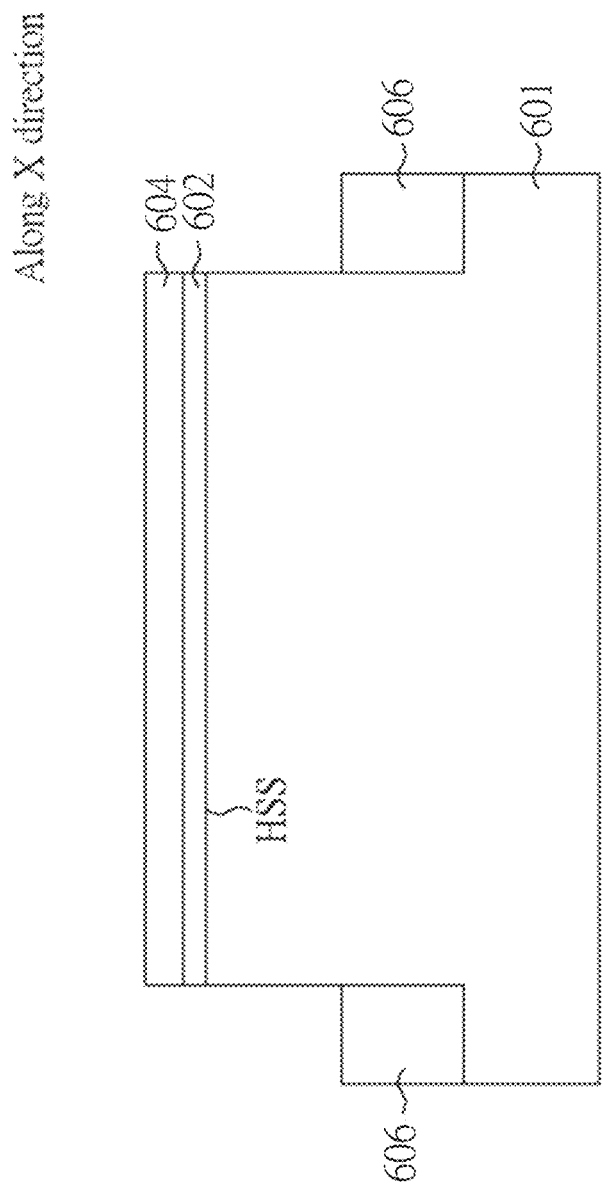
FIG. 7(b) is a diagram illustrating a cross-section of pad-oxide layer, the pad-nitride layer on the substrate, and the STI-oxide1 formed in the substrate.

As shown in FIG. 7(b), a pad-oxide layer 602 is formed and a pad-nitride layer 604 is deposited on a substrate 601. The active region of the mMOSFET 600 is defined by removing parts of silicon material outside the active region to create the trench structure. An oxide-1 layer is deposited in the trench structure and etched back to form a shallow trench isolation (STI-oxide1) 606 below the original horizontal surface of the silicon substrate ("HSS").

Figure 7C:
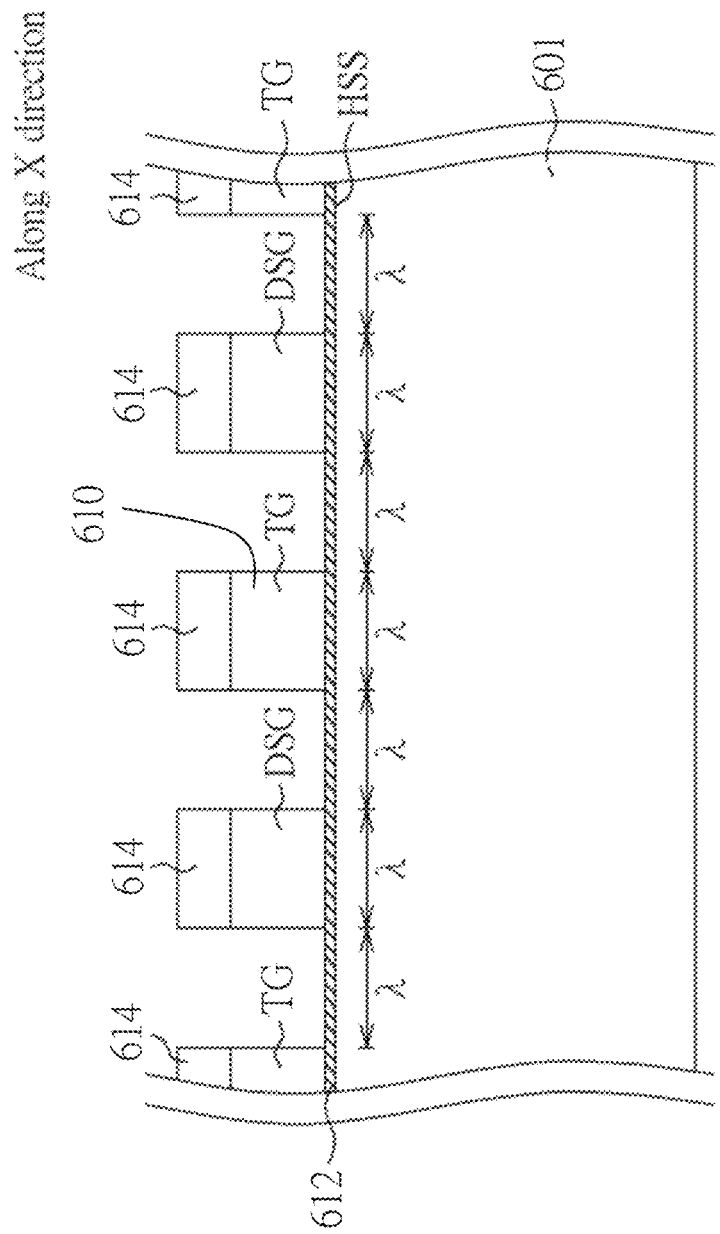
FIG. 7(c) is a diagram illustrating the true gate (TG) and the dummy shield gate (DSG) formed on above the active region.

The pad-oxide layer 602 and the pad-nitride layer 604 are removed, and a dielectric insulator 612 is formed over the HSS. Then, a gate layer 610 and a nitride layer 614 are deposited above the HSS, and the gate layer 610 and the nitride layer 614 are etched to form a true gate (TG) of the mMOSFET and dummy shield gates (DSG) with a desired linear distance to the true gate, as shown in FIG. 7(b). As shown in FIG. 7(c), the length of the true gate (TG) is $\lambda$, the length of the dummy shield gate (DSG) is also A, and the distance between the edges of the true gate (TG) and the dummy shield gate (DSG) is A as well.

Figure 7D:
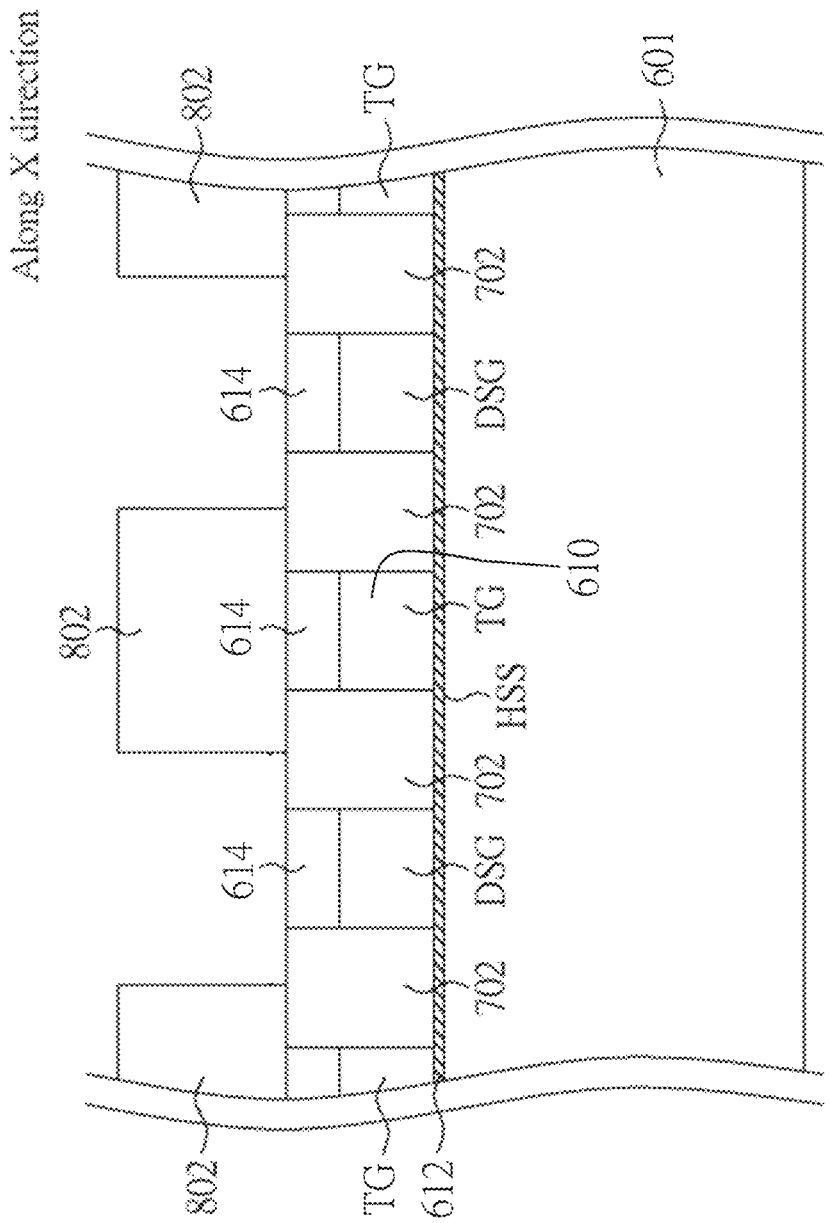
FIG. 7(d) is a diagram illustrating the spin-on dielectrics (SOD) being deposited, and a well-designed gate mask layer being deposited and etched.
Figure 7E:
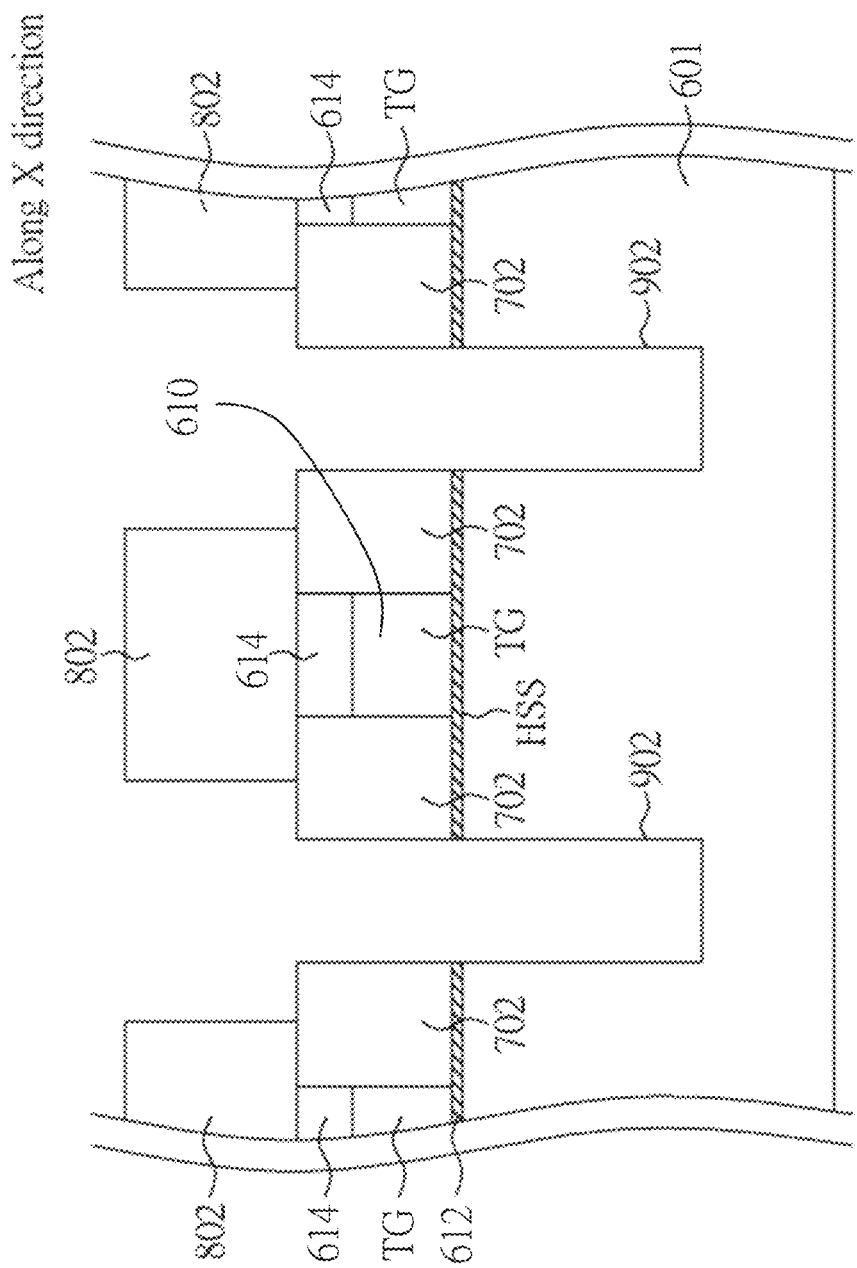
FIG. 7(e) is a diagram illustrating the nitride layer above the dummy shield gate (DSG), the DSG, portion of the dielectric insulator corresponding to the DSG, and the p-type substrate corresponding to the DSG are removed.

Then, deposit a spin-on dielectrics (SOD) 702, and then etch back the SOD 702. Form a well-designed gate mask layer 802 by the photolithographic masking technique, as shown in FIG. 7(d). Thereafter, utilize the anisotropic etching technique to remove the nitride layer 614 above the dummy shield gate (DSG), and remove the dummy shield gate (DSG), portion of the dielectric insulator 612 corresponding to the dummy shield gate (DSG), and the p-type substrate 602 corresponding to the dummy shield gate (DSG), as shown in FIG. 7(e).

Figure 7F:
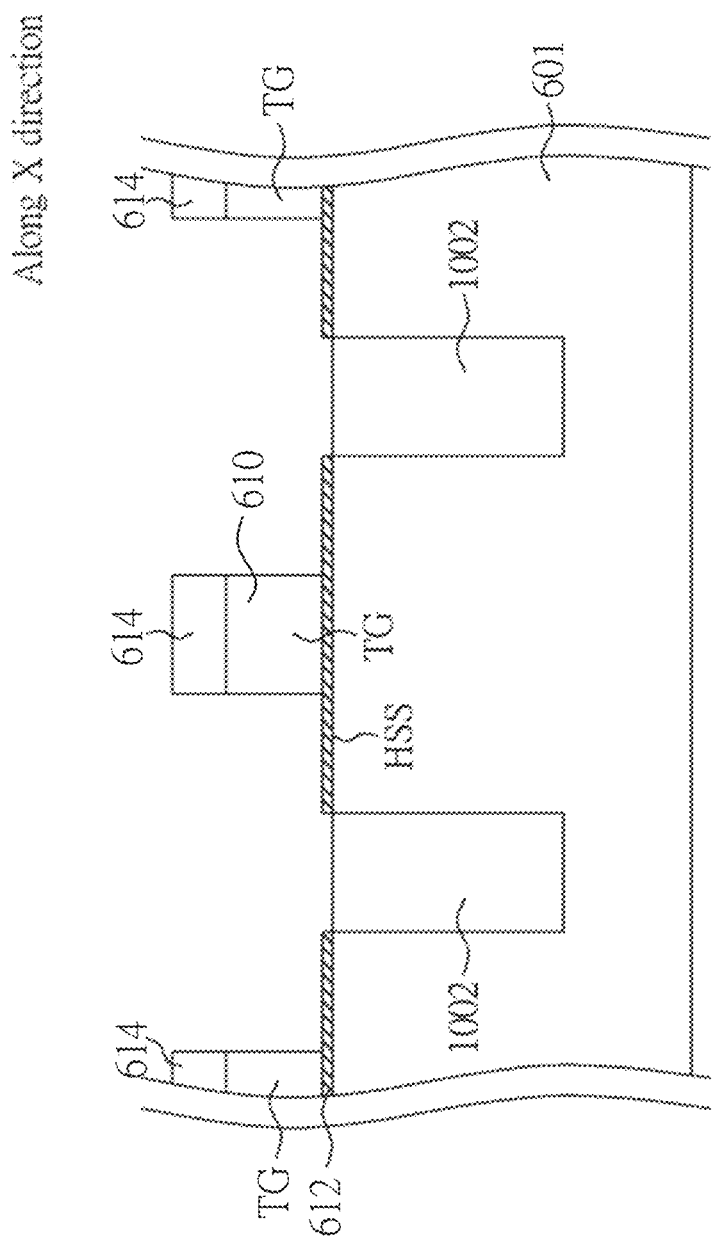
FIG. 7(f) is a diagram illustrating the gate mask layer being removed, the SOD being etched, and an oxide-2 layer being deposited to form a STI-oxide2.
Figure 7G:
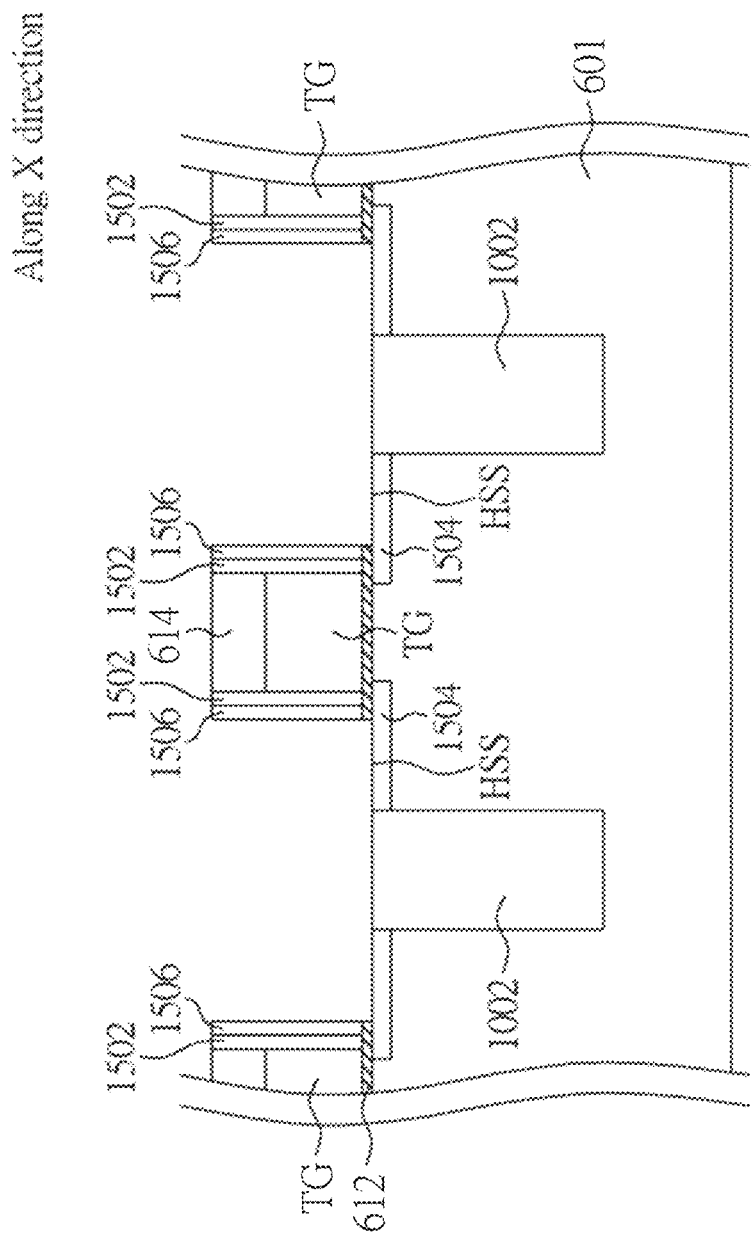
FIG. 7(g) is a diagram illustrating the oxide-3 layer being deposited and etched to form the oxide-3 spacer, the lightly Doped drains (LDDs) being formed in the p-type substrate, the nitride layer being deposited and etched back to form the nitride spacer, and the dielectric insulator being removed.

Furthermore, remove the gate mask layer 802, etch the SOD 702, and deposit a STI-oxide-2 1002 and then etch back, as shown in FIG. 7(f). Then, deposit and etch back an oxide-3 layer to form an oxide-3 spacer 1502, form the lightly Doped drains (LDDs) 1504 in the p-type substrate 601, deposit and etch back a nitride layer to form a nitride spacer 1506, and remove a portion of the dielectric insulator 612 not covered by the nitride spacer 1506, the oxide-3 spacer 1502 and the true gate (TG), as shown in FIG. 7(g).

Figure 7H:
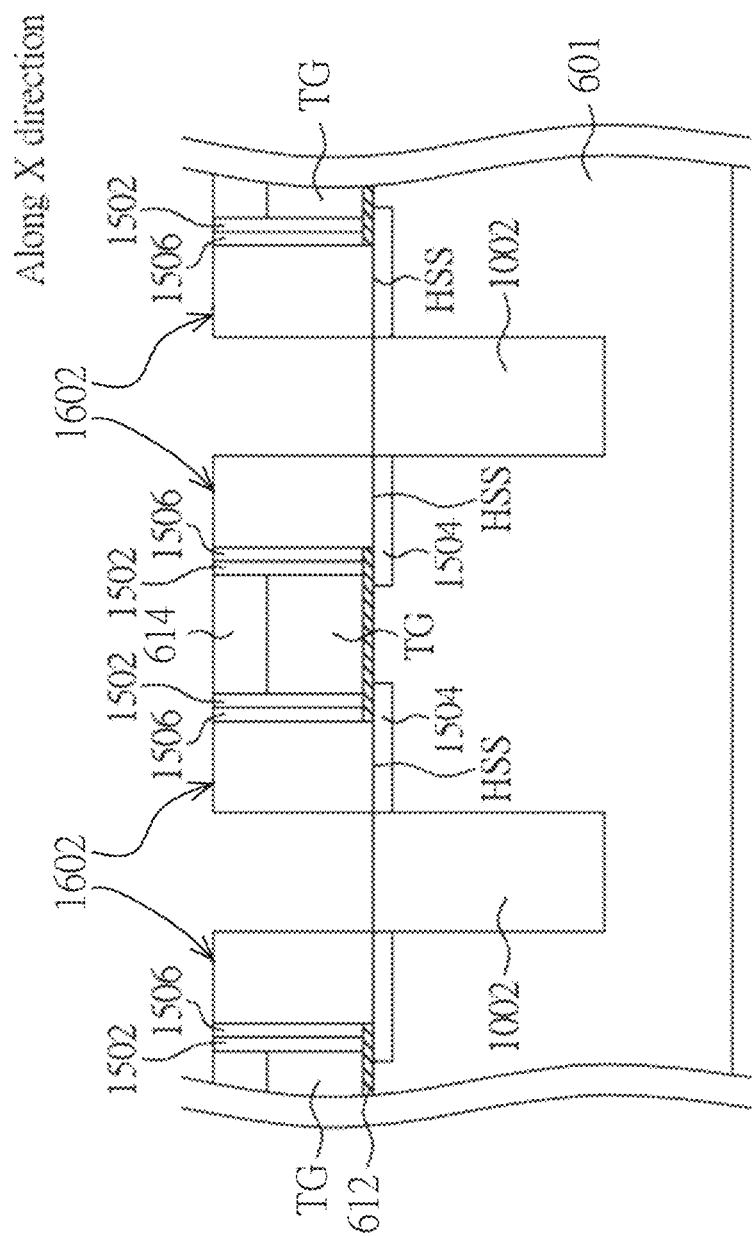
FIG. 7(h) is a diagram illustrating the intrinsic silicon electrode being grown by the selective epitaxy growth (SEG) technique.
Figure 7I:
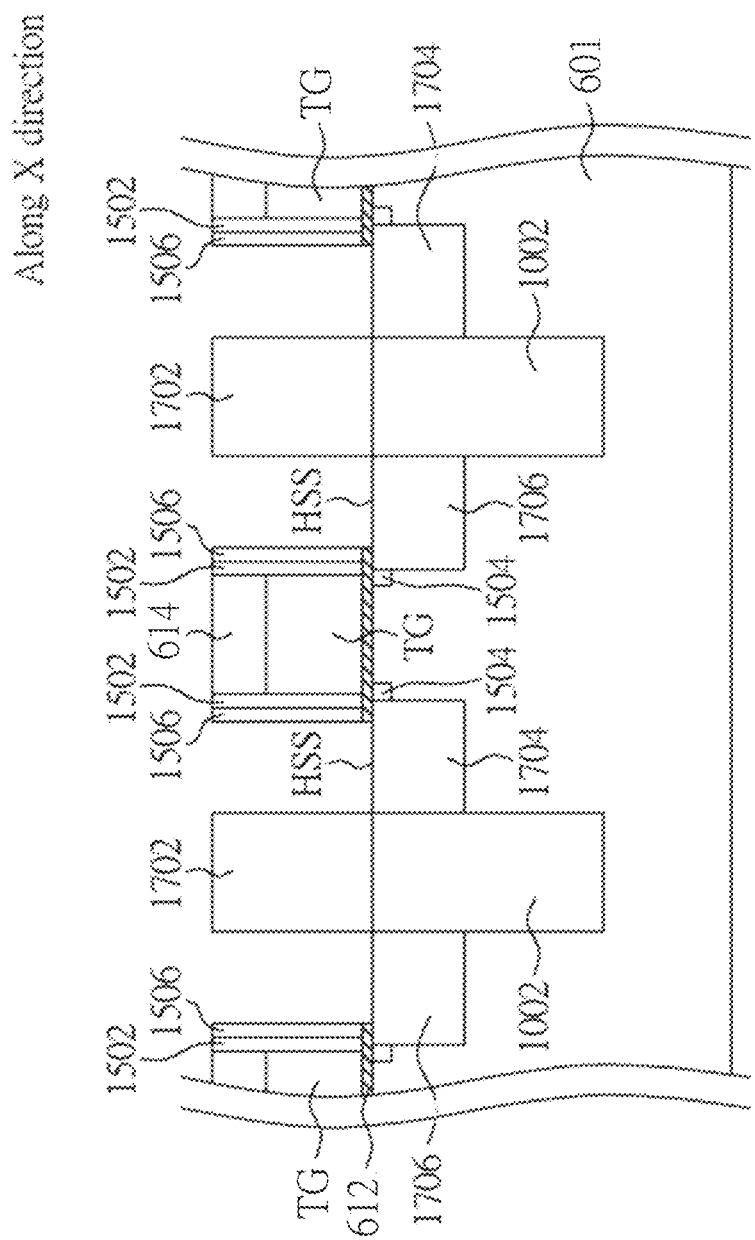
FIG. 7(i) is a diagram illustrating the CVD-STI-oxide3 layer being deposited and etched back, the intrinsic silicon electrode being removed, and the source (n+ source) and the drain (n+ drain) of the mMOSFET being formed.
Figure 7J:
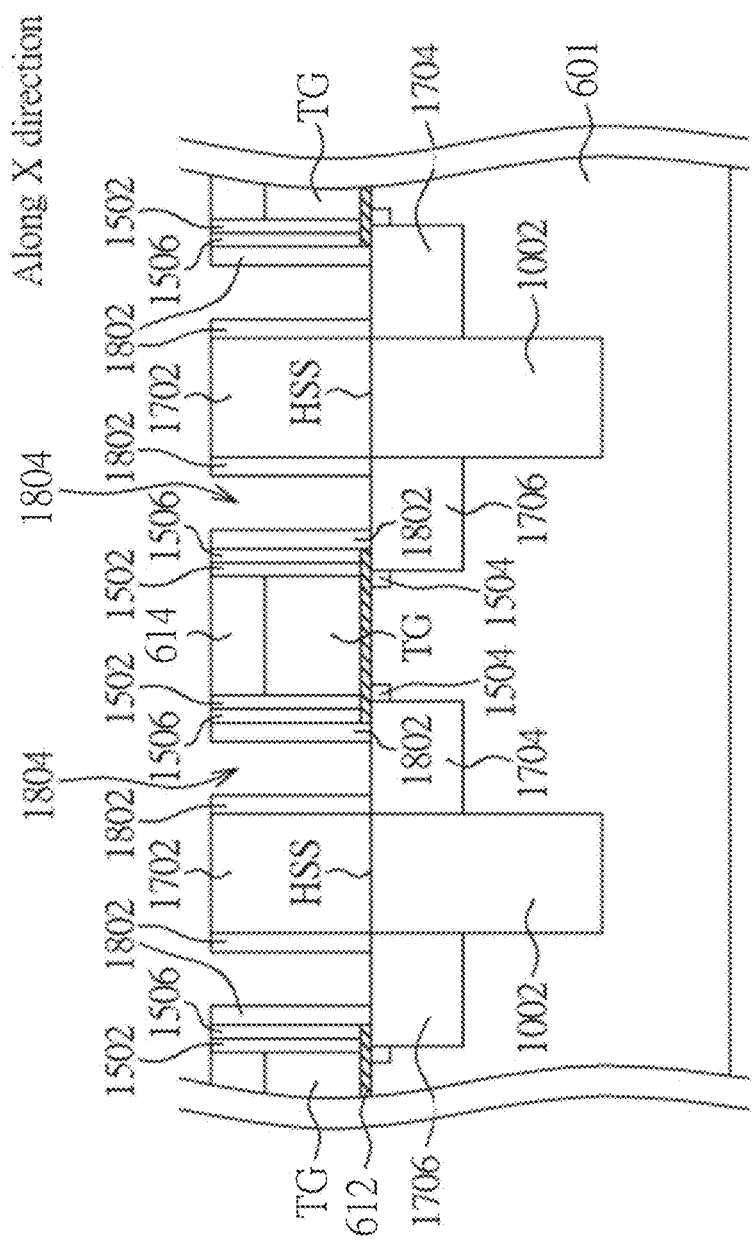
FIG. 7(j) is a diagram illustrating the oxide spacer being deposited and etched to form the contact-hole openings.
Figure 7K:
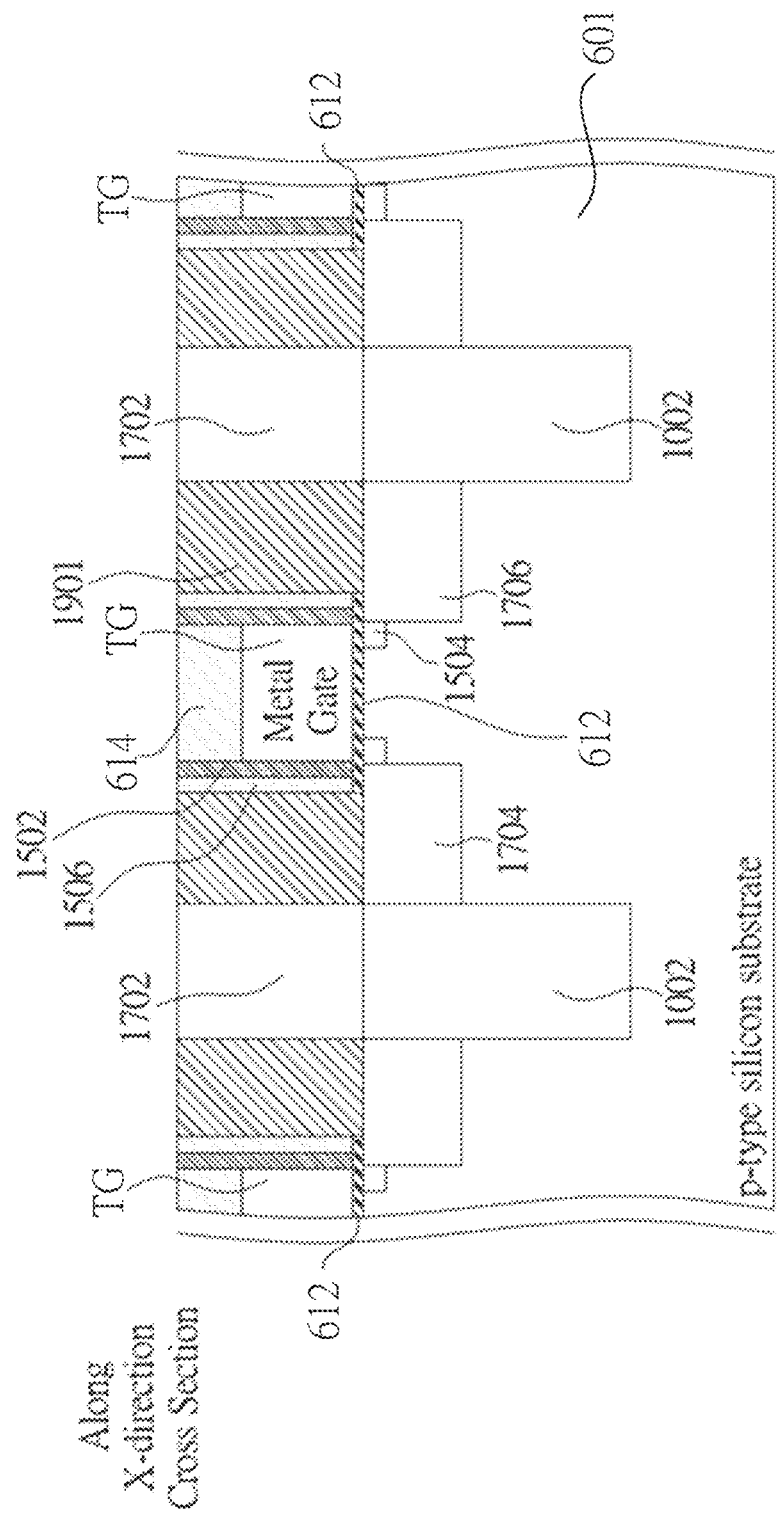
FIG. 7(k) is a diagram illustrating a layer of SOD is deposited to fill the vacancies on the substrate, and use CMP to make the surface flat.
Figure 7I:
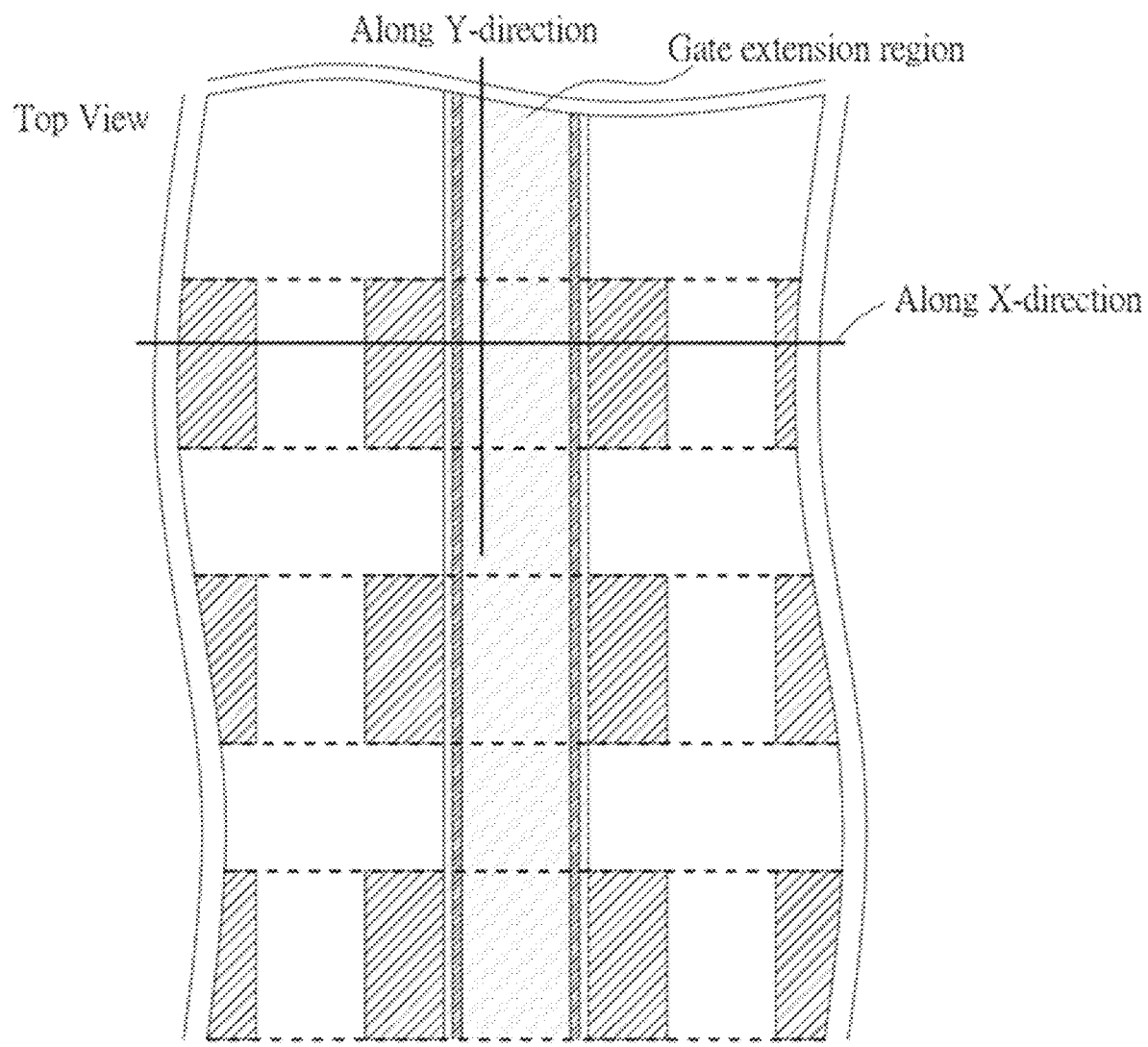
Figure 7M:
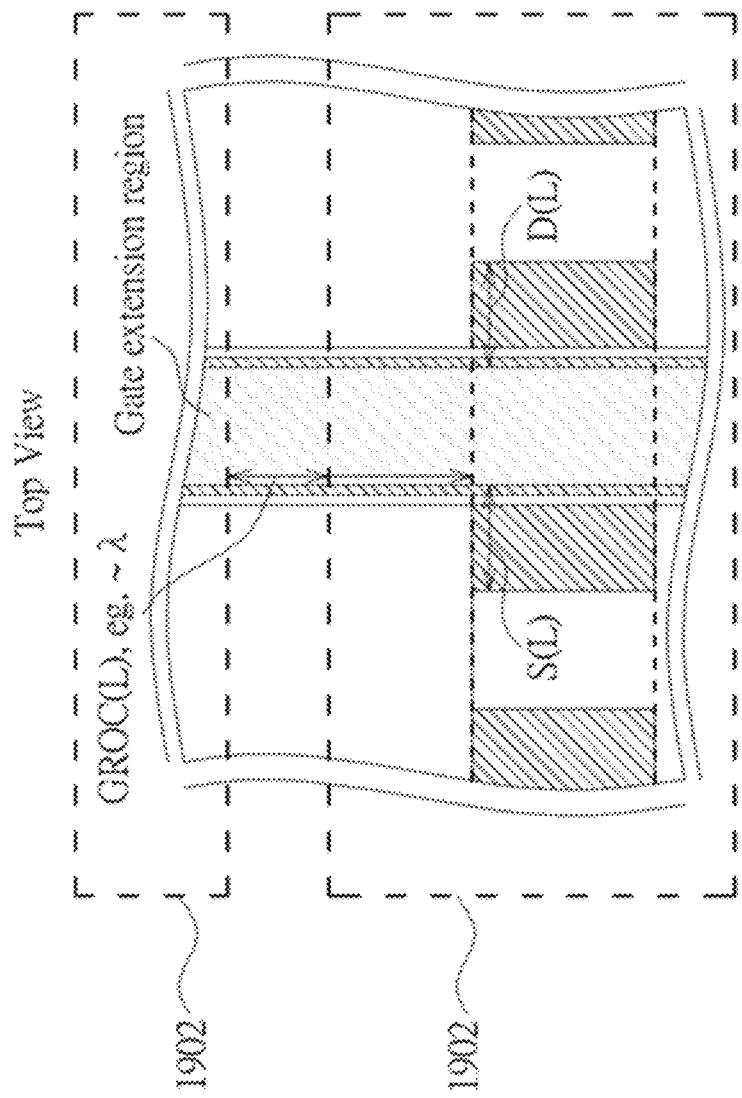
FIG. 7(m) is a diagram illustrating the photo resistance layer formed over the structure in FIG. 7(l).
Figure 7N:
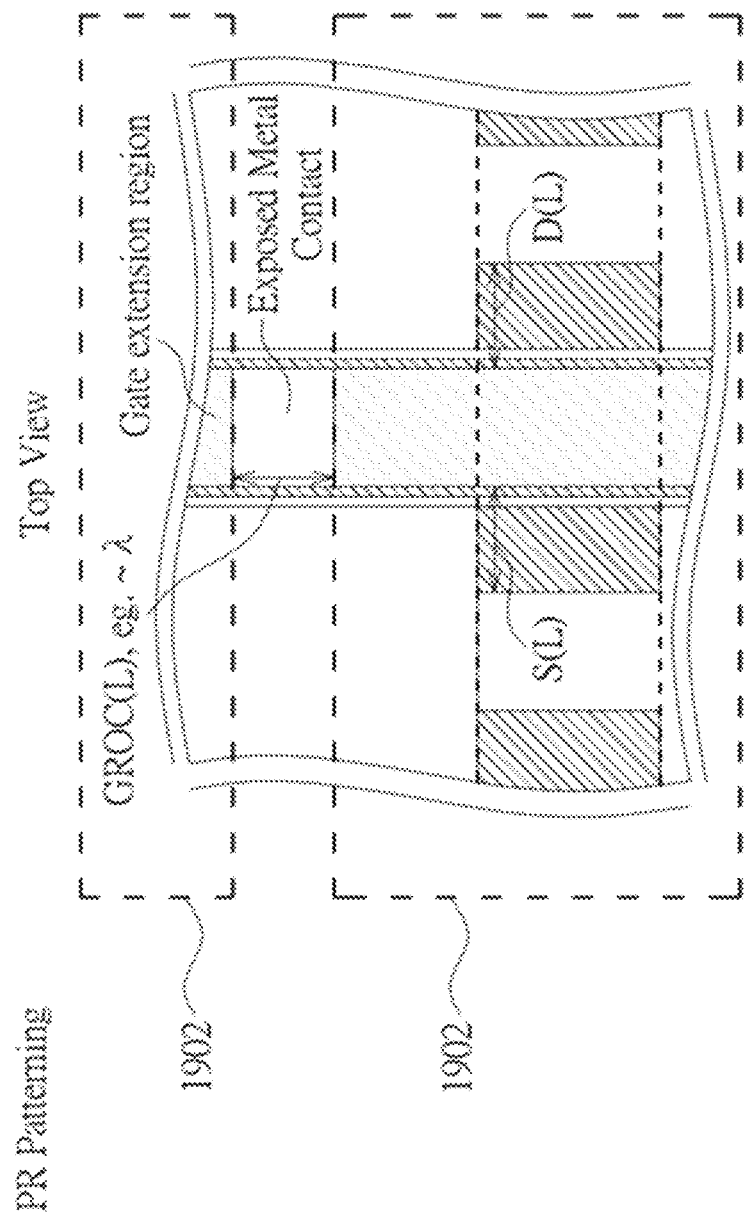
FIG. 7(n) is a diagram illustrating an anisotropic etching technique to remove the Nitride-cap layer within the exposed gate extension region to reveal the conductive Metal-gate layer.
Figure 7O:
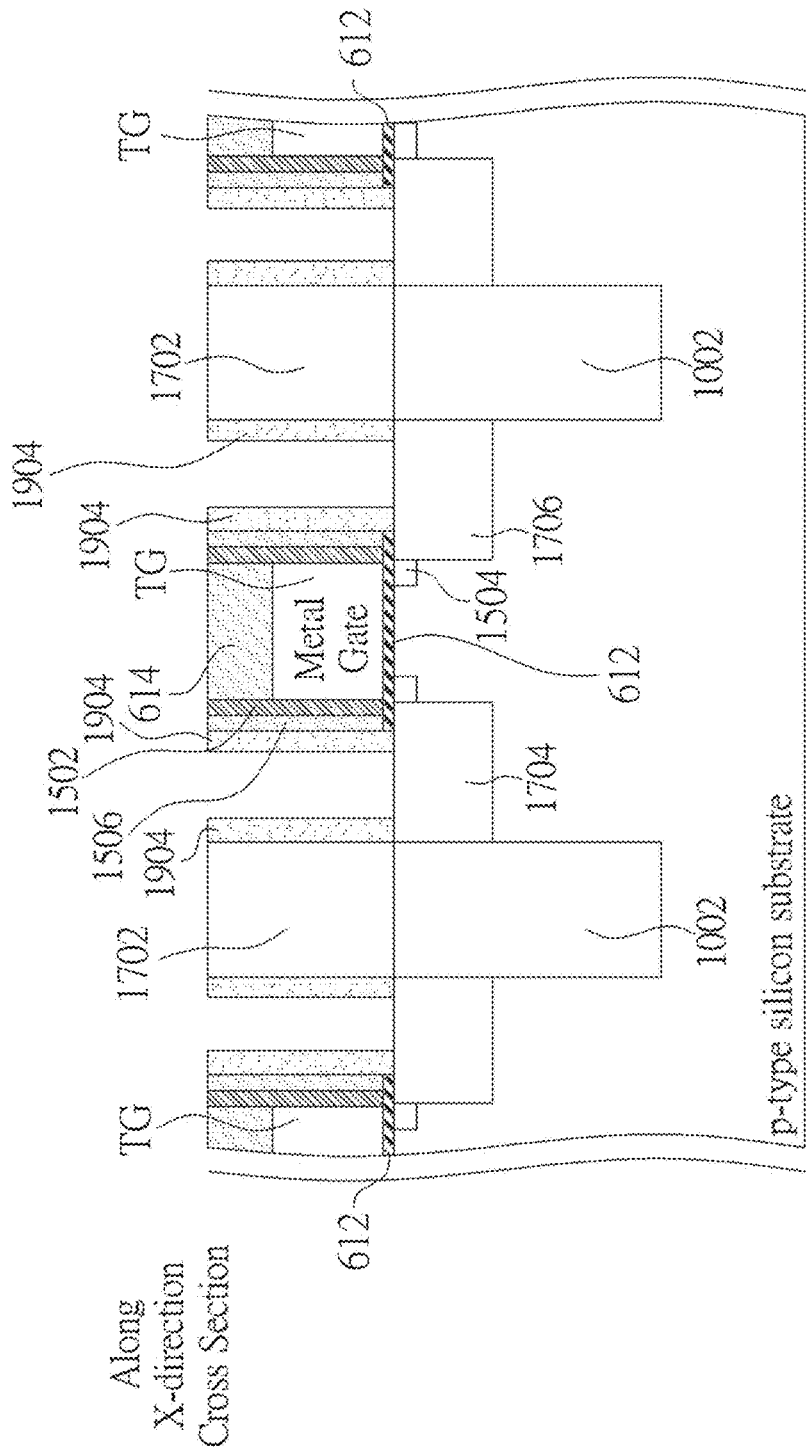
FIG. 7(o) is a diagram illustrating the photo resistance layer and the SOD layers being removed to form opening regions on top of both the source region and the drain region, and the spacers being formed.
Figure 7P:
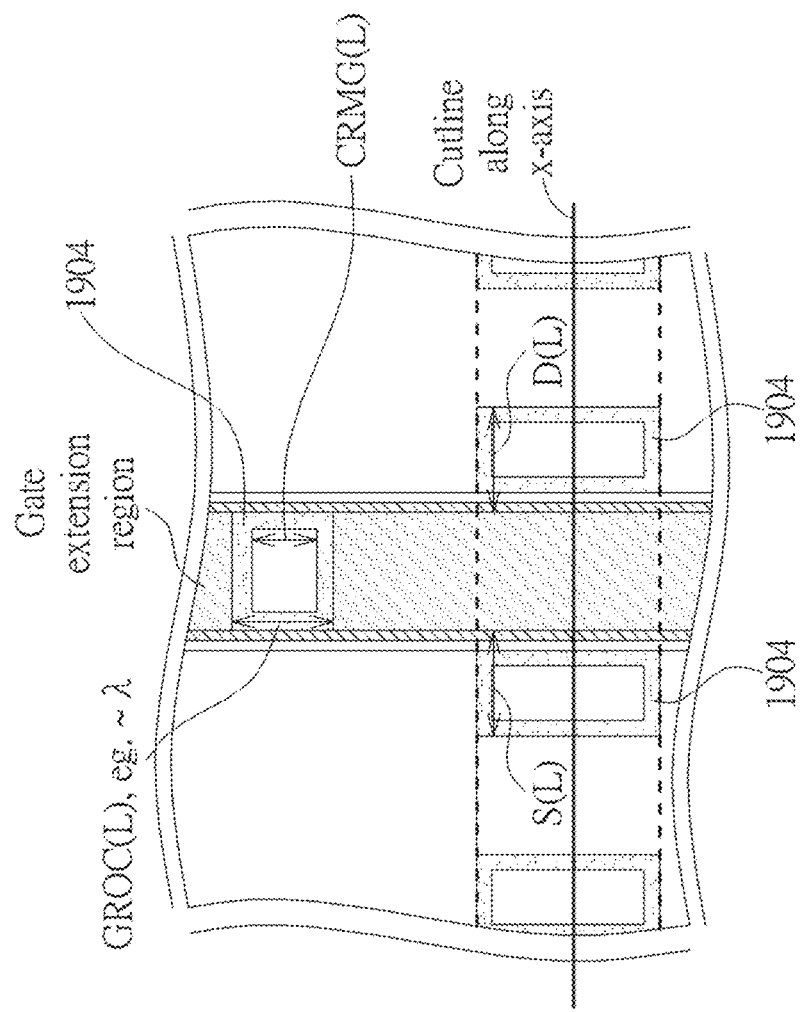
FIG. 7(p) is the top view of the FIG. 7(o).
Figure 7Q:
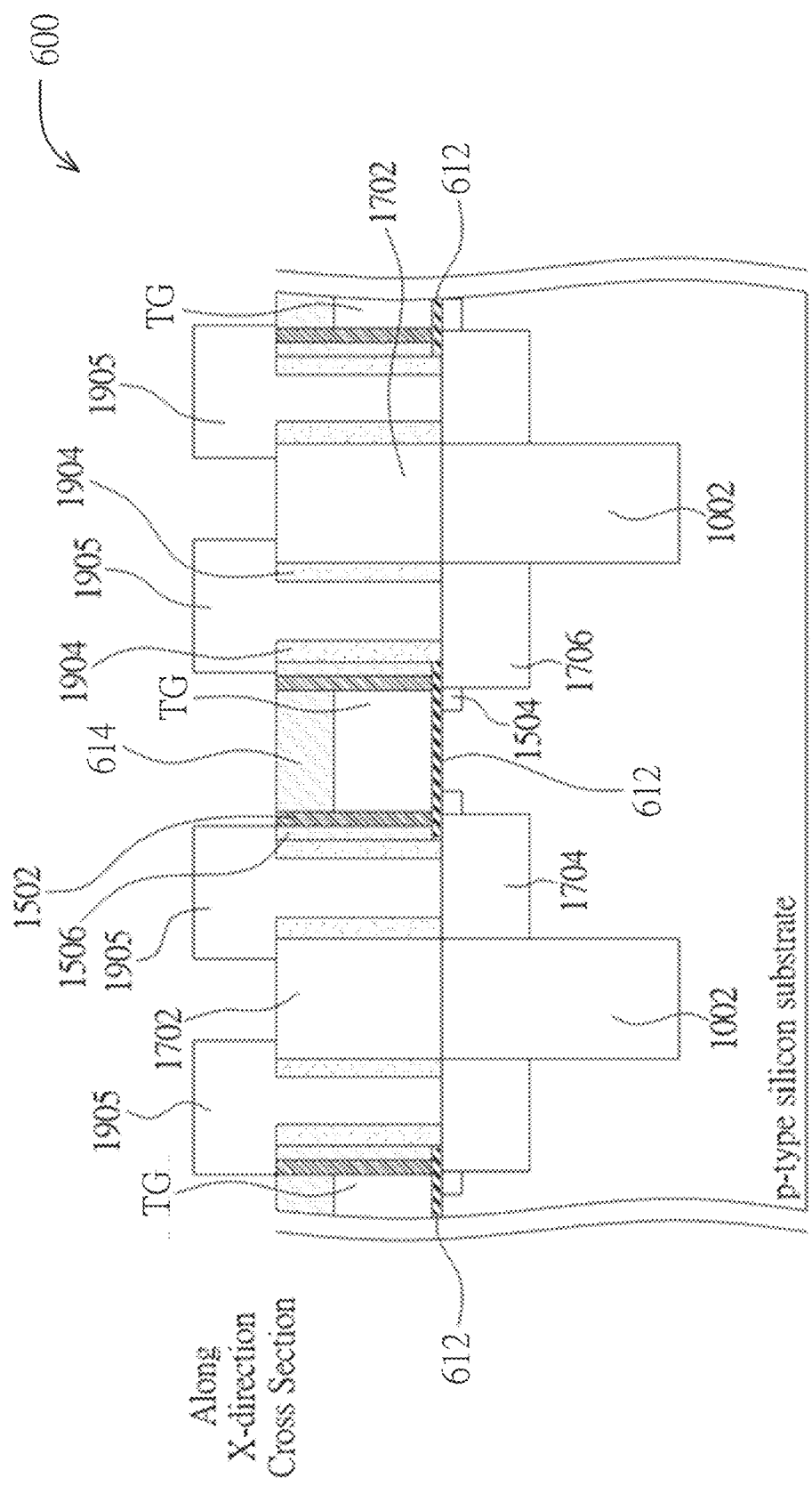
FIG. 7(q) is a diagram illustrating the layer of Metal-1 interconnection networks being formed.
Figure 7R:
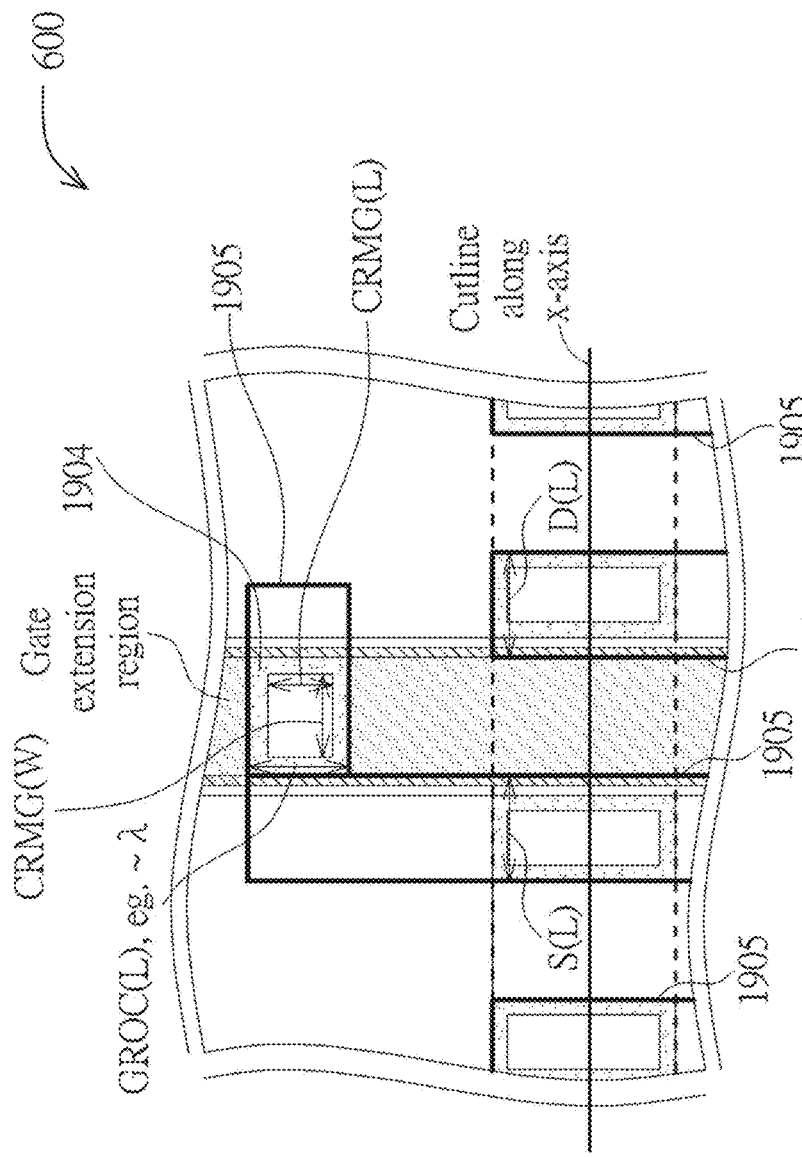
FIG. 7(r) is the top view of the FIG. 7(q), in which the gate is connected to the source region through the Metal-1 layer.

Moreover, utilize a selective epitaxy growth (SEG) technique to grow intrinsic silicon electrode 1602, as shown in FIG. 7(h). Then deposit and etch back a CVD-STI-oxide3 layer 1702, remove the intrinsic silicon 1602, and form a source region (n+ source) 1704 and a drain region (n+ drain) 1706 of the mMOSFET, as shown in FIG. 7(i). Since the source region (n+ source) 1704 and a drain region (n+ drain) 1706 are formed between the true gate (TG) and the CVD-STI-oxide3 layer 1702 the location of which is originally occupied by the dummy shield gate (DSG), thus, the length and width of the source region (n+ source) 1704 (or a drain region (n+ drain) 1706) is as small as A. The opening of the source region (n+ source) 1704 (or a drain region (n+ drain)

1706) could be less than λ, such as 0.8λ. Such openings could be shrunk if further oxide spacer 1802 is formed, as shown in FIG. 7(*j*).

Additionally, the new 4T SRAM cell structure makes the first metal interconnection (M1 layer) directly connect Gate, Source and/or Drain regions through self-aligned miniaturized contacts without using a conventional contact-hole-opening mask and/or a Metal-0 translation layer for M1 connections. Following FIG. 7 (K), a layer of SOD 1901 is deposited to fill the vacancies on the substrate, including the openings 1804 of the source region (n+ source) 1704 (or a drain region (n+ drain) 1706). Then use CMP to make the surface flat, as shown in FIG. 7(*k*). FIG. 7(*l*) is the top view of the FIG. 7(*k*) and shows multiple fingers in horizontal direction.

Furthermore, use a well-designed mask and carry out a photo resistance layer 1902 which results in some stripe pattern along the X-axis in FIG. 7(*l*) with a separate space of the length GROC(L) to expose the area of gate extension region along the Y-axis in Figure FIG. 7(*l*), then the result is shown as a top view in FIG. 7(*m*). The most aggressive design rules with GROC(L)=λ, as shown in FIG. 7(*m*). Then use an anisotropic etching technique to remove the Nitride-cap layer within the exposed gate extension region to reveal the conductive Metal-gate layer (as shown in FIG. 7(*n*)).

Thereafter, remove photo resistance layer 1902, and then remove the SOD layers 1901 so that those opening regions on top of both the source region 1704 and the drain region 1706 are revealed again. Then deposit a layer of oxide 1904 with well-designed thickness and then use an anisotropic etching technique to form spacers on the four sidewalls in opening regions of the source region 1704 and the drain region 1706 and the exposed gate extension region. Therefore, a natural built-up contact-hole opening is formed in the exposed gate extension region, the source region 1704 and the drain region 1706, respectively. FIG. 7(*o*) shows the cross-sectional of such transistor structure. FIG. 7(*p*) shows top view of such a transistor structure in FIG. 7(*o*). The vertical length CRMG(L) of the opening in the exposed gate extension region is smaller than the length GROC(L) which could be A.

Finally, form a layer of Metal-1 1905 which has the well-designed thickness to fill in the holes of all the aforementioned contact-hole openings and result in a smooth planar surface following the topography of the wafer surface. Then use a photolithographic masking technique to create all the connections among those contact-hole openings respectively to achieve the necessary Metal-1 interconnection networks, as shown in FIG. 7(*q*). FIG. 7(*r*) is the top view of the mMOSFET 600 shown in FIG. 7(*q*). So this Metal-1 layer complete the tasks of achieving both the contact-filling and the plug-connection to both Gate and Source/Drain functions as well as a direct interconnection function of connecting all transistors. There is no need to use an expensive and very rigidly controlled conventional contact-hole mask and to carry on the subsequent very difficult process of drilling the contact-hole openings, especially which should be the most difficult challenges in further scaling down the horizontal geometries of billions of transistors. In addition, it eliminates making both a metal plug into the contact-hole openings and a CMP process to achieve a Metal stud with complex integrated processing step (e.g. as definitely required for some leading-edge technology of creating a Metal-Zero structure).

Thus, the size of the source/drain contact could be as small as λ*λ (CT_A mask, marked by red circle in the bottom of FIG. 6), no matter the size of the technology node or (or minimum feature size). Similarly, gate contact (for direct connection to the metal 2 layer, to be explained later) could be formed on the gate or Poly line, and the size of the gate contact is λ*λ as well (CT_A mask, marked by red dash circle in the bottom of FIG. 6). That is, the linear dimensions of the source, the drain and the gate of the transistors and the contacts thereof are precisely controlled, and the linear dimension can be as small as the minimum feature size, Lambda (λ). In this embodiment the gap between two gate or Poly lines is as small as 2A (marked by blue dash circle in the top of FIG. 6.

Moreover, as mentioned, the traditional 6T SRAM cell may not allow the Gate or Diffusion directly connect to M2 without bypassing the M1 structure. The present invention discloses a new 4T SRAM cell structure in which either Gate or Diffusion (Source/Drain) areas to be directly connected to the M2 interconnection layer without a transitional layer M1 in a self-alignment way through one vertical conductive plug being composed of Contact-A and Via1-A which are respectively formed during the construction phases of making Contact and Via1 in the other locations on the same die. As results, the necessary space between one M1 interconnection and the other M1 interconnection and blocking issue in some wiring connections will be reduced.

The following briefly describes a mMOSFET 800 used in the new 4T SRAM according to another embodiment of the present invention, in which the Gate and Diffusion (Source/Drain) areas is directly connected to the M2 interconnection layer without a transitional layer M1 in a self-alignment way. The detailed description regarding Gate area/active region directly connected to the Metal-2 interconnection layer (M2) is presented in the U.S. Provisional Application No. 63/158,896, filed on Mar. 10, 2021 and entitled "Self-Aligned Interconnection From Terminals of Devices to Any Level of Metal Layer Over the Devices", and the whole content of the U.S. Provisional Application No. 63/158,896 is incorporated by reference herein.

FIG. 8(*a*) is a top view of the constructed phase of the mMOSFET 800, and FIG. 8(*b*) and FIG. 8(*c*) are two cross-sectional views of the constructed phase of the transistor along cutline C8A1 and cutline C8A2 shown in FIG. 8(*a*), respectively. As shown in FIG. 8(*b*) and FIG. 8(*c*), the mMOSFET 800 is formed and limited by a shallow trench isolator (STI) 805. The mMOSFET 800 has a gate terminal 802, a transistor channel region 803 beneath the gate terminal 802 and source/drain regions 804. The gate terminal 802 comprises a gate dielectric layer 802*a*, a gate conduction layer 802*b* formed over the gate dielectric layer 802*a* and a silicon region (or a seed region) 802*c* formed over the gate conduction layer 802*b*. The silicon region 802*c* can be made of polysilicon or amorphous silicon. The gate terminal 802 further includes a capping layer 802*d* (e.g. a nitride layer) over the top of the silicon region 802*c* and further includes at least one spacer (e.g., including a nitride spacer 802*s*1 and a thermal oxide spacer 802*s*2) over the sidewalls of the gate dielectric layer 802*a*, the gate conduction layer 802*b*, the silicon region 802*c* and the capping layer 802*d*. The first dielectric layer 820 is formed on the semiconductor substrate 801 at least covering the active area of the mMOSFET 800 including the gate terminal 802 and the source/drain regions 804 as well as the STI 805.

A plurality of open holes (such as the open holes 807*a* and 807*b* are formed in the first dielectric layer 820 to reveal the top portion 81 of the silicon 802*c* region and the top portion 82 of the s source/drain regions 804. In some embodiments, the open holes 807*a* and 807*b* are formed by a photolithography process to remove portions of the first dielectric layer 820 to expose the portion the silicon region 802c and the silicon region of the drain terminal of the source/drain regions 804. In one example, each of the open holes 807a and 807b could be a size equal to a minimum feature size (e.g. a critical size of the mMOSFET 800). Of course, the size of the open holes 807a and 807b could be larger than the minimum feature size. The bottoms of the open holes 807a and 807b (i.e. the revealed top portion 81 and the revealed top portion 82) are made of materials with either polycrystalline/amorphous silicon or crystalline silicon with heavily doped concentrations having high conductivity, respectively. The exposed silicon region 802c of the gate terminal and the exposed silicon region of the source/drain terminal are seed regions for the selective epitaxy growth technique (SEG) to grow pillars based on the seed regions.

Figure 8A:
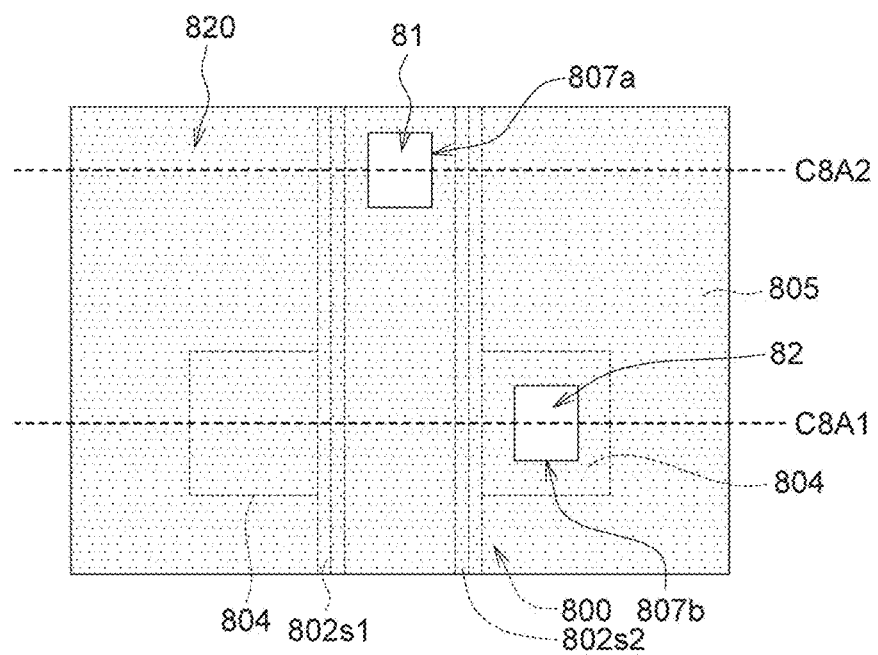
FIG. 8(a) is a top view of the constructed phase of a mMOSFET used in the new 4T SRAM according to another embodiment of the present disclosure.
Figure 8B:
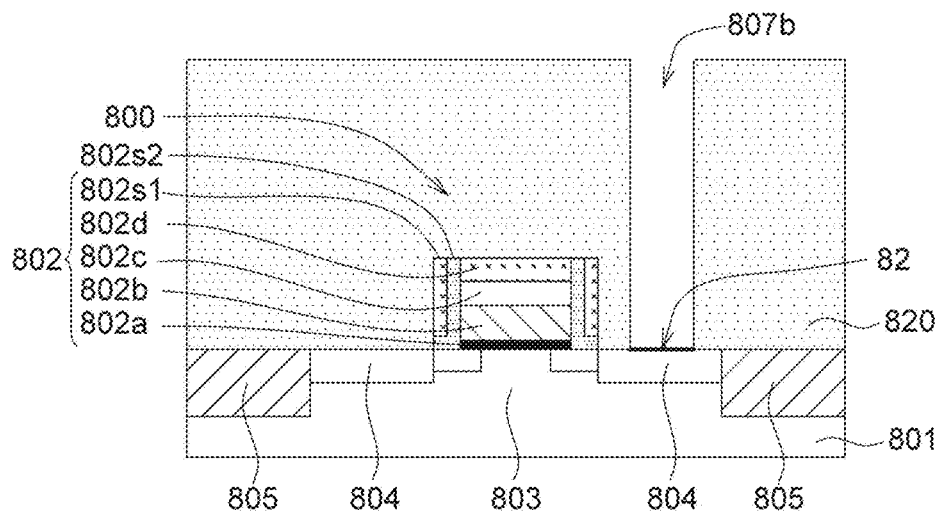
FIG. 8(b) and FIG. 8(c) are two cross-sectional views of the constructed phase of the transistor along cutline C8A1 and cutline C8A2 shown in FIG. 8(a), respectively.
Figure 8C:
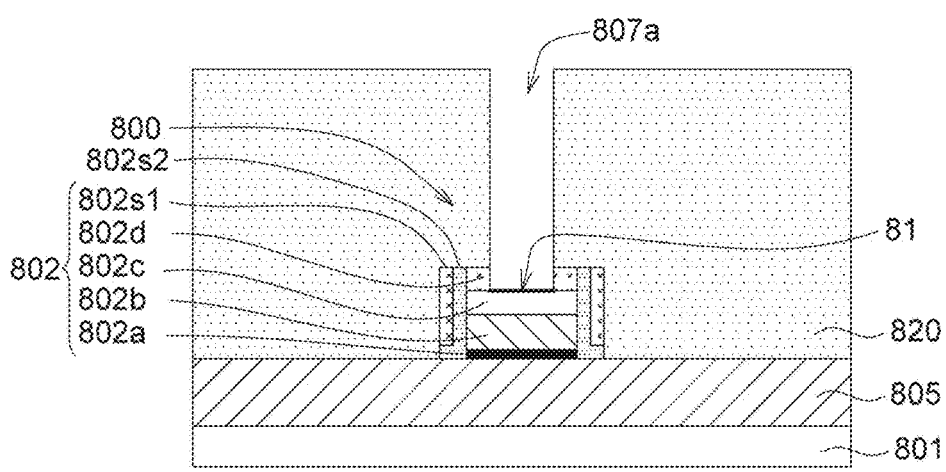
Figure 8D:
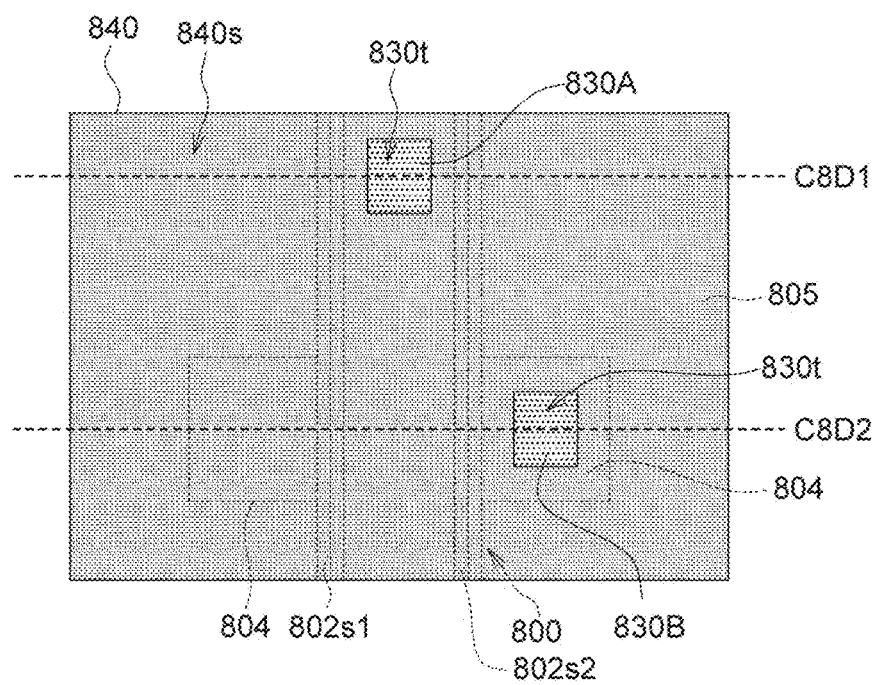
FIG. 8(d) is a top view illustrating a structure after the second conductor pillar portion and the fourth conductor pillar portion are formed on the first conductor pillar portions and the third conductor pillar portion, according to one embodiment of the present disclosure.
Figure 8E:
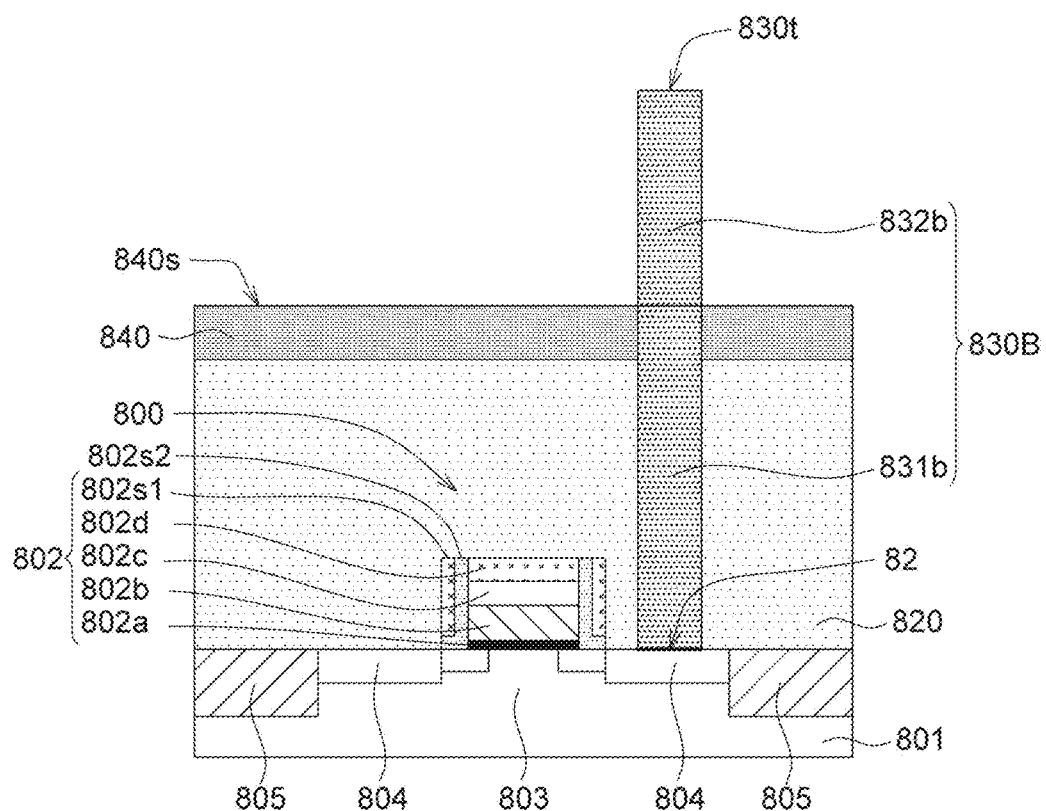
FIG. 8(e) is a cross-sectional view taken along the cutting line C8D1 as depicted in FIG. 8(d).
Figure 8F:
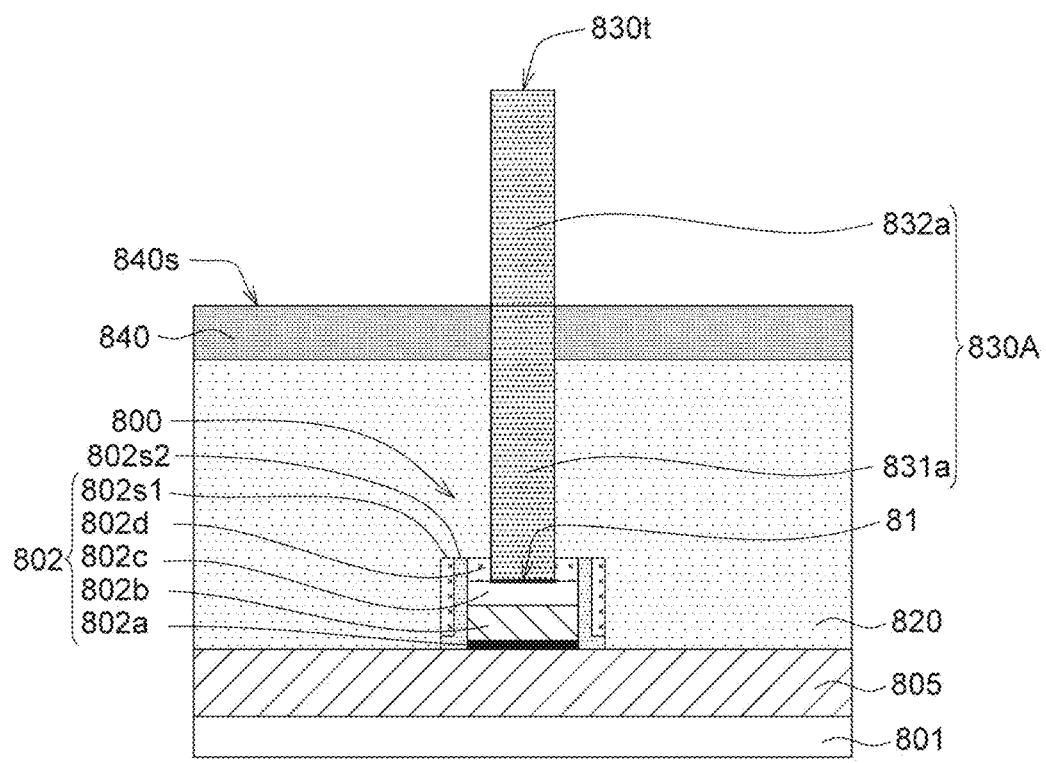
FIG. 8(f) is a cross-sectional view taken along the cutting line C8D2 as depicted in FIG. 8(d).

Then, as shown in FIGS. 8(d)-8(f), heavily doped conductive silicon plugs (or the conductor pillars) are grown by SEG based on the revealed top portion 81 and the revealed top portion 82, to form the first conductor pillar portion 831a and the third conductor pillar portion 831b. A first dielectric sub-layer 840 is then formed over the first dielectric layer 820 to make the top surface 840s of the first dielectric sub-layer 840 substantially coplanaring with the top surfaces of the first conductor pillar portion 831a and the third conductor pillar portion 831b. Those "Exposed Heads" (or the expose top surface) of the first conductor pillar portion 831a and the third conductor pillar portion 831b can be used as seed portion for the subsequent SEG process. Furthermore, each of the first conductor pillar portions 831a and the third conductor pillar portion 831b has a seed region or seed pillar in the upper portion thereof, and such seed region or seed pillar could be used for the following selective epitaxy growth. Subsequently, a second conductor pillar portion 832a is formed on the first conductor pillar 831a by a second selective epitaxy growth; and a fourth conductor pillar portion 832b is formed on the third conductor pillar portion 831b. FIG. 8(d) is a top view illustrating a structure after the second conductor pillar portion 832a and the fourth conductor pillar portion 832b are formed on the first conductor pillar portions 831a and the third conductor pillar portion 831b, according to one embodiment of the present disclosure. FIG. 8(e) is a cross-sectional view taken along the cutting line C8D2 as depicted in FIG. 8(d). FIG. 8(f) is a cross-sectional view taken along the cutting line C8D1 as depicted in FIG. 8(d).

Figure 8G:
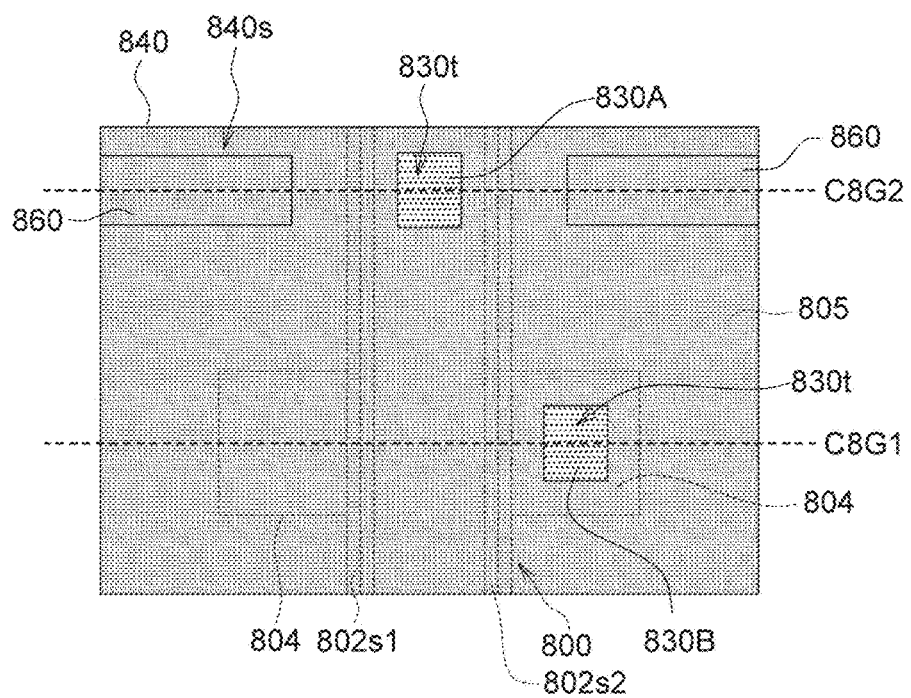
FIG. 8(g) is a top view illustrating a structure after the first conduction layer and the second dielectric sub-layer are formed over the first dielectric layer according to one embodiment of the present disclosure.
Figure 8H:
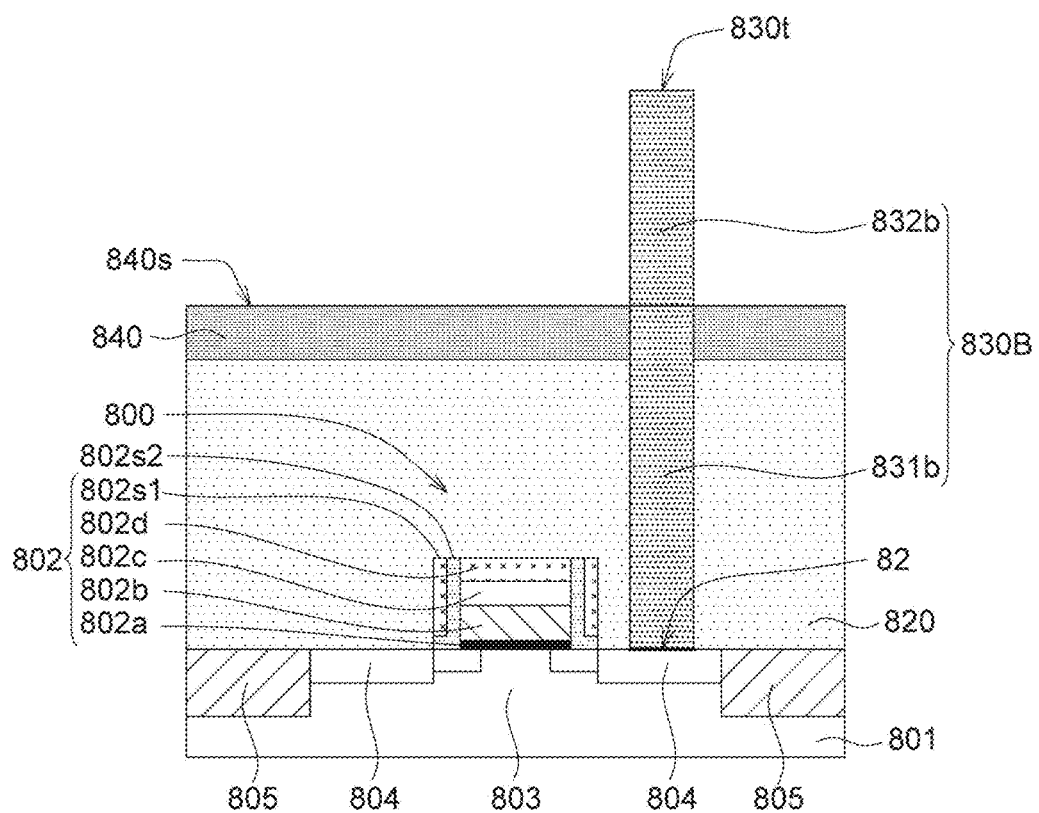
FIG. 8(*h*) is a cross-sectional view taken along the cutting line C8G1 as depicted in FIG. 8(*g*).
Figure 8I:
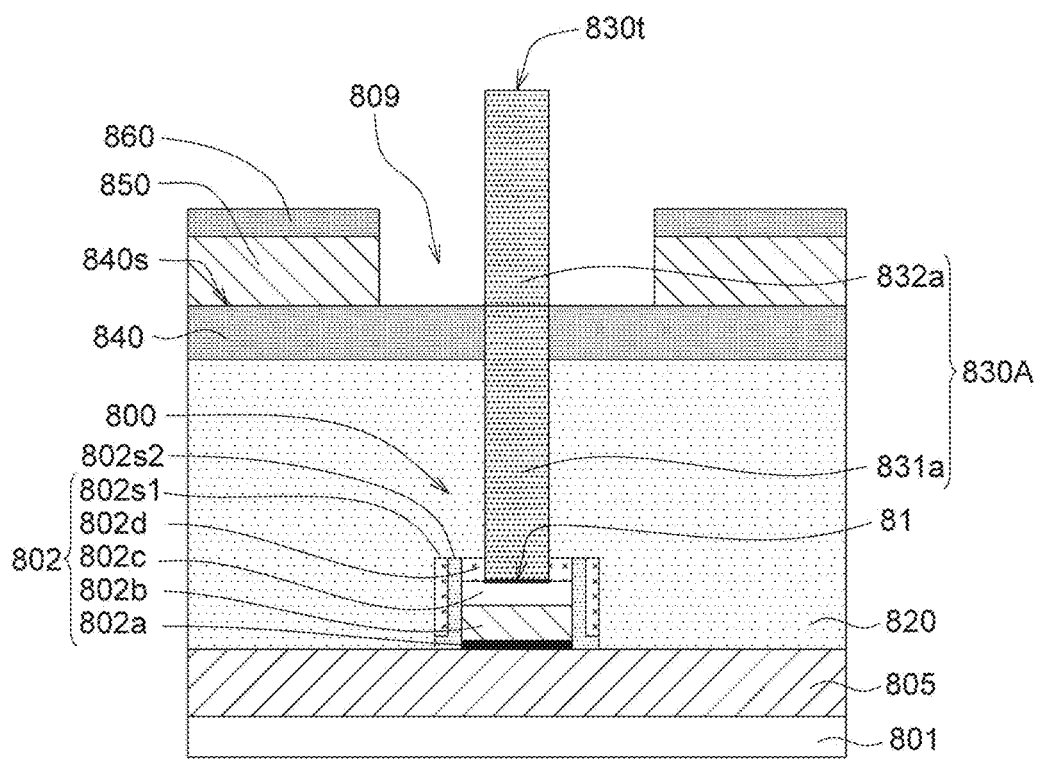

Furthermore, as shown in FIGS. 8(g)-8(i), a first conduction layer 850, such as copper (Cu), Aluminum (Al), tungsten (W) or other suitable conductive material, can be deposited on the top surface 840s of the first dielectric sub-layer 840. A second dielectric sub-layer 860 is then deposited on the first conduction layer 850. The first conduction layer 850 and the second dielectric sub-layer 860 are patterned to define an opening hollow 809, wherein the first conductor pillar 830A penetrates through the opening hollow 809 without contacting the first conduction layer 850 and the second dielectric sub-layer 860. FIG. 8(g) is a top view illustrating a structure after the first conduction layer 850 and the second dielectric sub-layer 860 are formed over the dielectric sub-layer 840 according to one embodiment of the present disclosure. FIG. 8(h) is a cross-sectional view taken along the cutting line C8G1 as depicted in FIG. 8(g). FIG. 8(i) is a cross-sectional view taken along the cutting line C8G2 as depicted in FIG. 8(g).

Figure 8J:
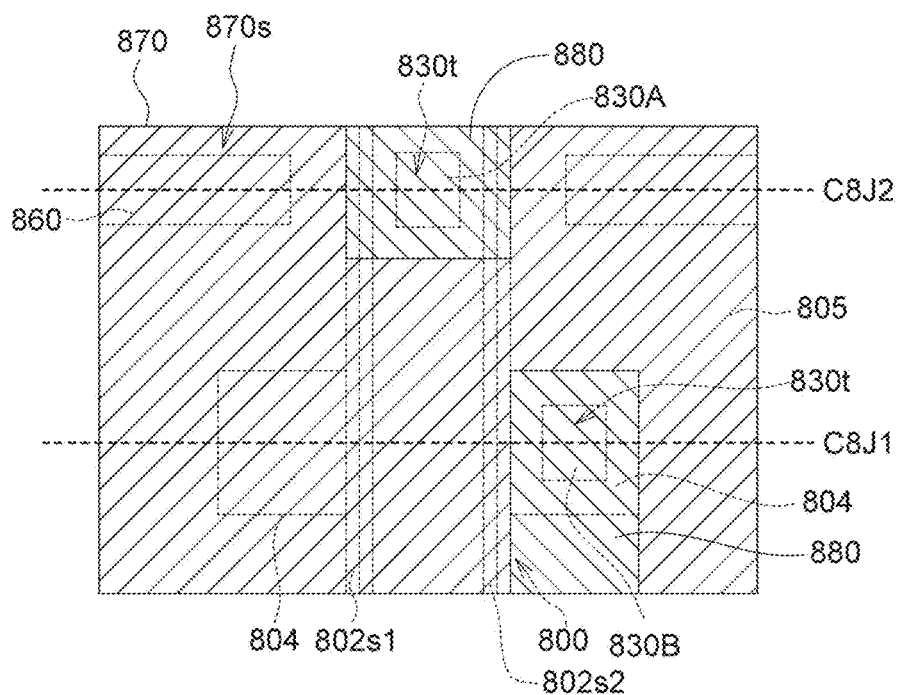
Figure 8K:
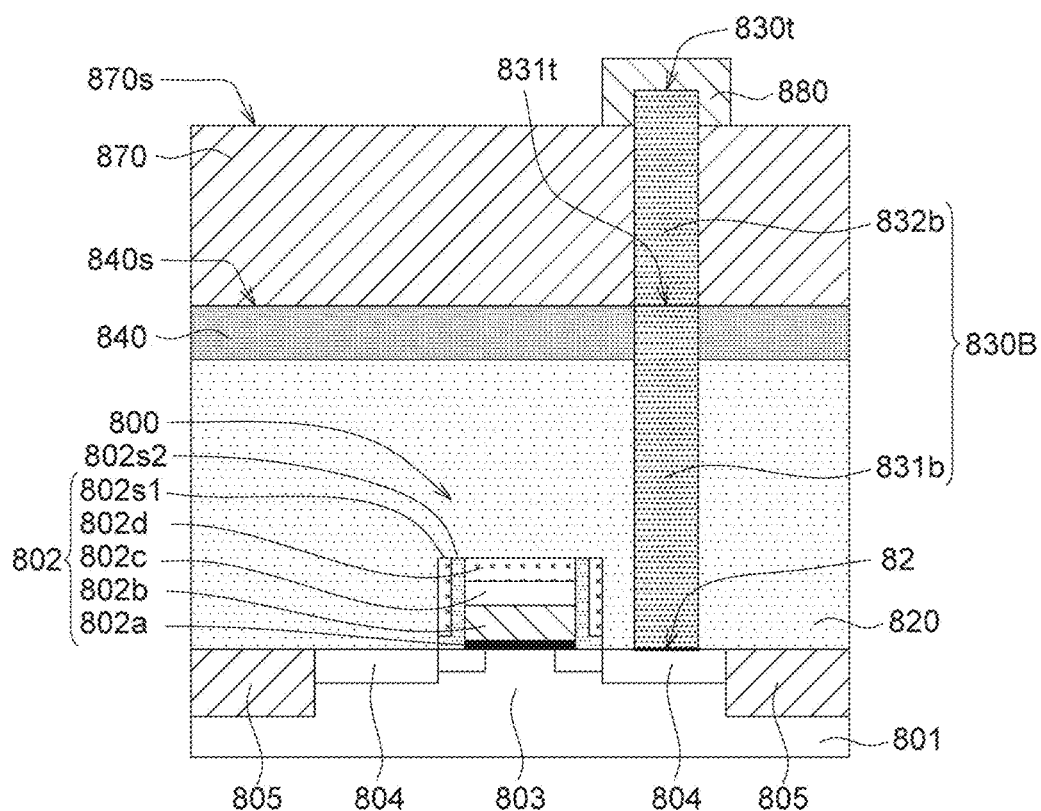
Figure 8I:
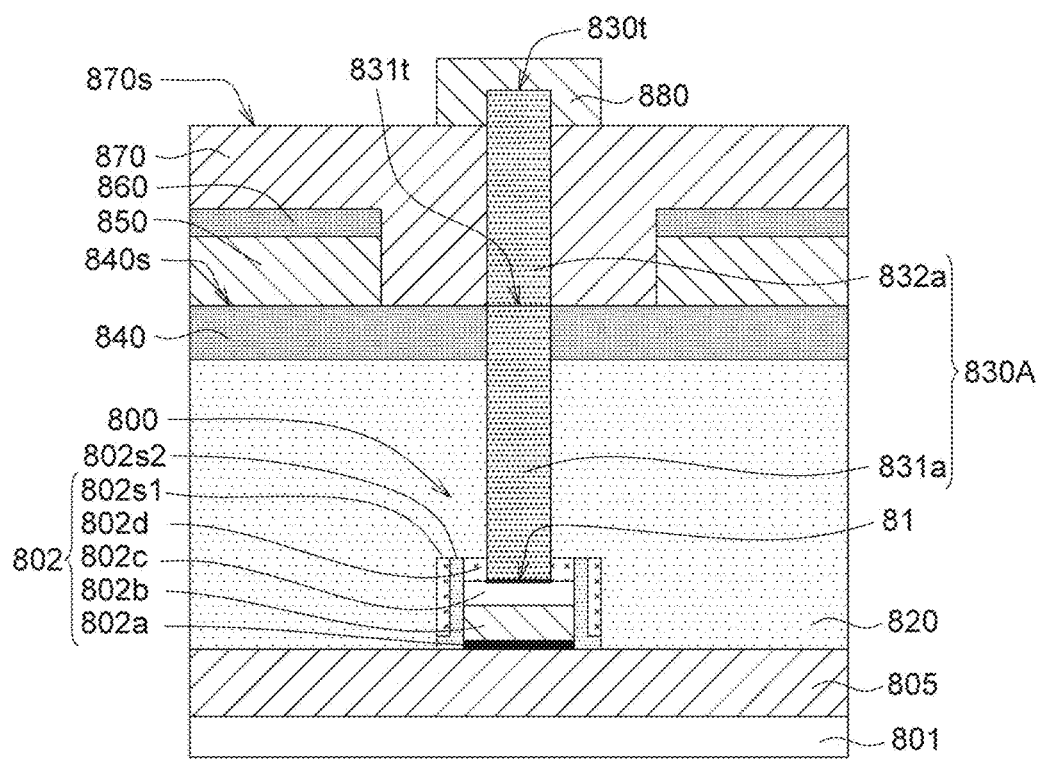

Moreover, as shown in FIGS. 8(j)-8(l), the upper dielectric layer 870 is deposited to cover the second dielectric sub-layer 860 and the first dielectric sub-layer 840 to fill in the opening hollow 809. A top surface 870s of the upper dielectric layer 870 is lower than the top surface 830t of the first conductor pillar 830A (including the first conductor pillar portion or sub-pillar 831a and the second conductor pillar portion or sub-pillar 832a) and the second conductor pillar 830B (including the third conductor pillar portion or sub-pillar 831b and the fourth conductor pillar portion or sub-pillar 832b). An upper conduction layer 880 is then formed over the upper dielectric layer 870; wherein the first conductor pillar 830A connects to the upper conduction layer 880 but disconnects from the first conduction layer 850. In this example, FIG. 8(j) is a top view illustrating a structure after the conduction layer 880 is formed over the over the upper dielectric layer 870 according to one embodiment of the present disclosure. FIG. 8(k) is a cross-sectional view taken along the cutting line C8J1 as depicted in FIG. 8(j). FIG. 8(l) is a cross-sectional view taken along the cutting line C8J2 as depicted in FIG. 8(j).

As mentioned, each of the exposed silicon region 802c of the gate terminal and the exposed silicon region of the source/drain terminal has seed regions for the selective epitaxy growth technique (SEG) to grow pillars based on the seed regions. Furthermore, each of the first conductor pillar portions 831a and the third conductor pillar portion 831b also has a seed region or seed pillar in the upper portion thereof, and such seed region or seed pillar could be used for the following selective epitaxy growth. This embodiment could also be applied to allow M1 interconnection (a kind of conductive terminal) or conduction layer to be directly connected to the MX interconnection layer (without connecting to the conduction layers M2, M3, ... MX−1) in a self-alignment way through one vertical conductive or conductor plug, as long as there is a seed portion or seed pillar on the upper portion of the conductive terminal and the conductor pillar portions configured for following selective epitaxy growth technique. The seed portion or seed pillar is not limited to silicon, and any material which could be used as a seed configured for following selective epitaxy growth is acceptable.

Figure 9A:
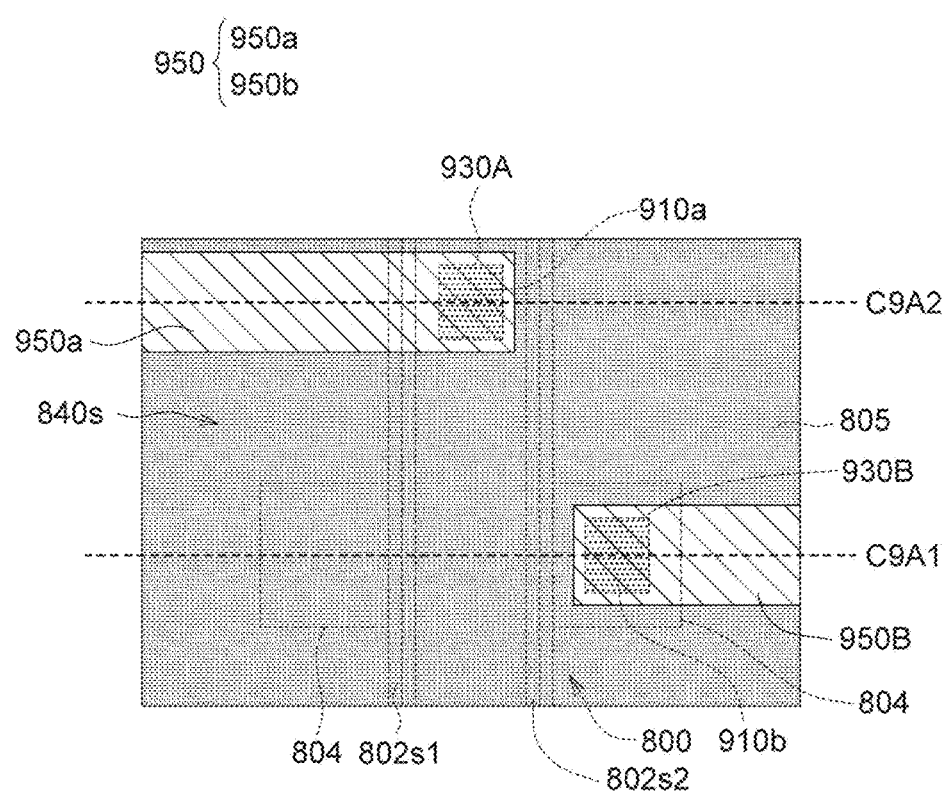
FIG. 9(*a*) is a top view of the constructed phase of a mMOSFET used in the new 4T SRAM according to yet another embodiment of the present disclosure.
Figure 9B:
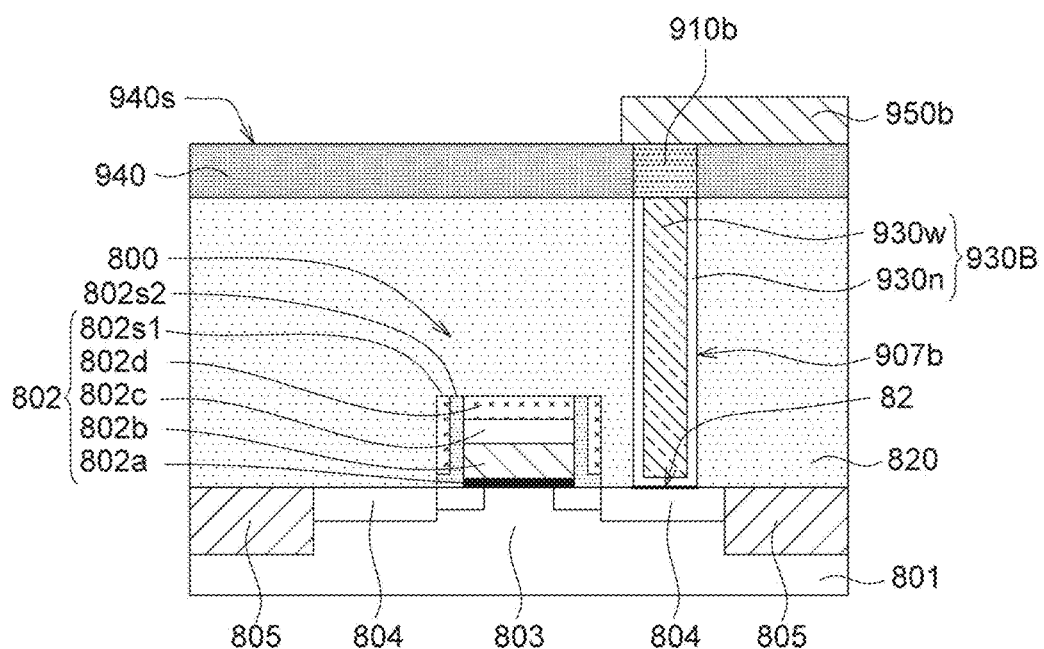
Figure 9C:
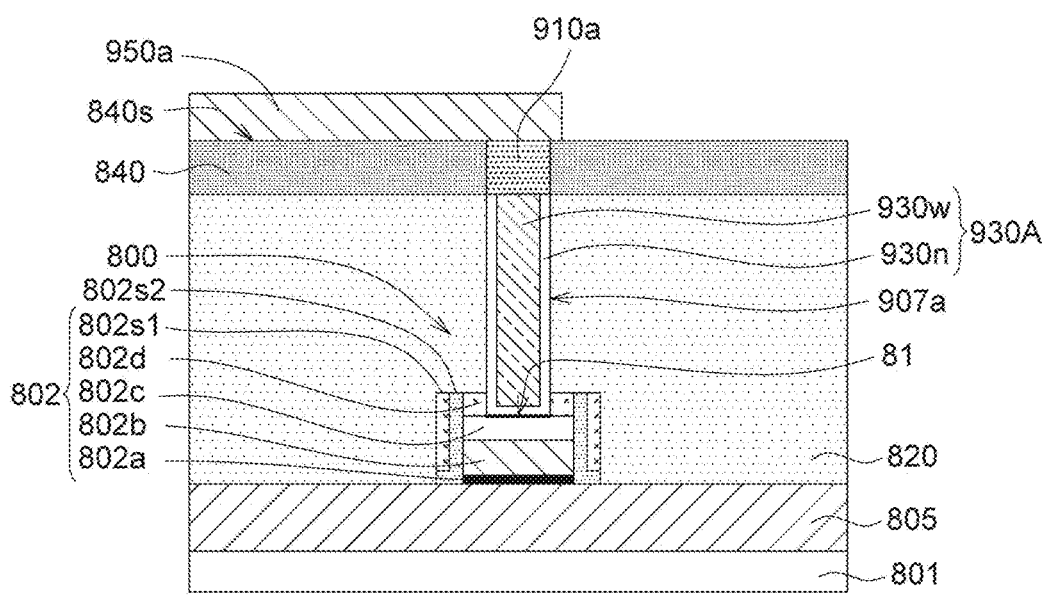

The conductor pillar could be a metal conductor pillar, or could be a composite conductor pillar with metal conductor pillar and a seed portion or seed pillar on the upper portion thereof. As shown in FIGS. 9(a)-9(c), the highly doped N+ poly silicon pillars 831a, 832a, 831b, 832b in FIGS. 8(j)-8(k) could be removed and replaced by tungsten pillars 930w, the TiN layer 930n, and the highly doped silicon pillar. As shown in FIGS. 9(b)-9(c), a first conductor pillar includes a metal pillar portion 930A (which includes tungsten pillars 930w and the TiN layer 930n) and a highly doped silicon pillar 910a, and a second conductor pillar includes a metal pillar portion 930B (which includes tungsten pillars 930w and the TiN layer 930n) and a highly doped silicon pillar 910b. The highly doped silicon pillars 910a and 910b are the seed region or seed pillar of the conductor pillar configured for following metal connection, as shown in FIGS. 9(b) and 9(c) the first conduction layer 950 is formed over the first dielectric sub-layer 940 and electrically connected to the highly doped silicon pillars 910a and 910b. Moreover, the highly doped silicon pillars 910a and 910b are the seed region or seed pillar of the conductor pillar configured for following SEG processes to grow another silicon pillars thereon. In this example, FIG. 9(a) is a top view of the constructed phase of a mMOSFET 800 used in the new 4T SRAM according to yet another embodiment of the present disclosure. FIG. 9(b) is a cross-sectional view taken along the cutting line C9A1 as depicted in FIG. 9(a). FIG. 9(c) is a cross-sectional view taken along the cutting line C9A2 as depicted in FIG. 9(a). In this way, a conductor pillar could include the tungsten pillars and the first highly doped silicon pillar, that is, the conductor pillar has a seed region or seed pillar in the upper portion thereof.

Figure 9D:
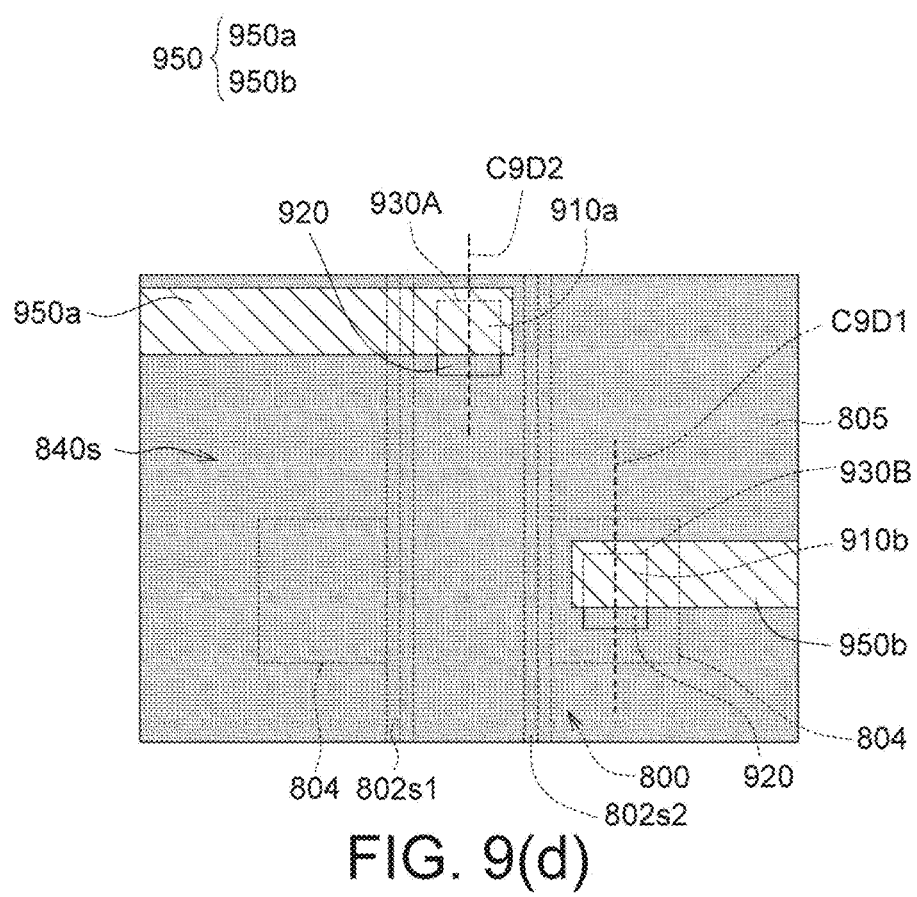
Figure 9E:
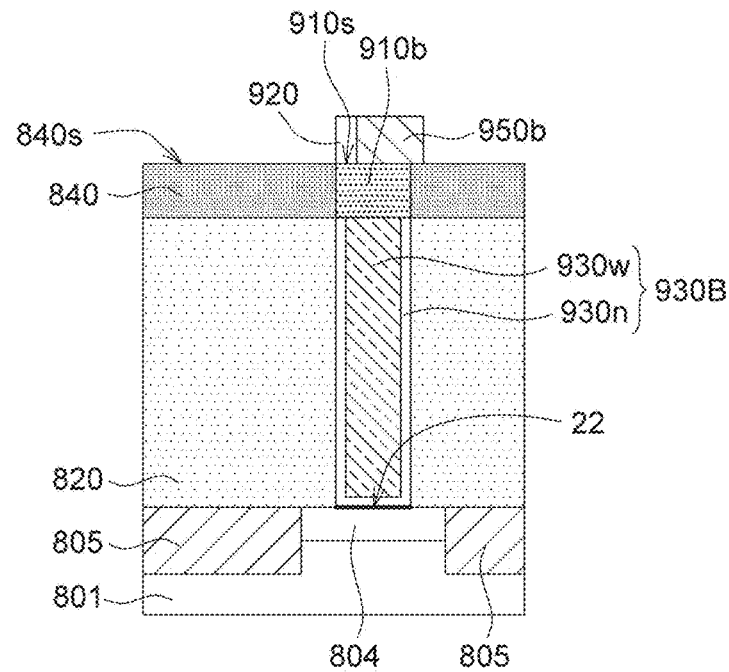
Figure 9F:
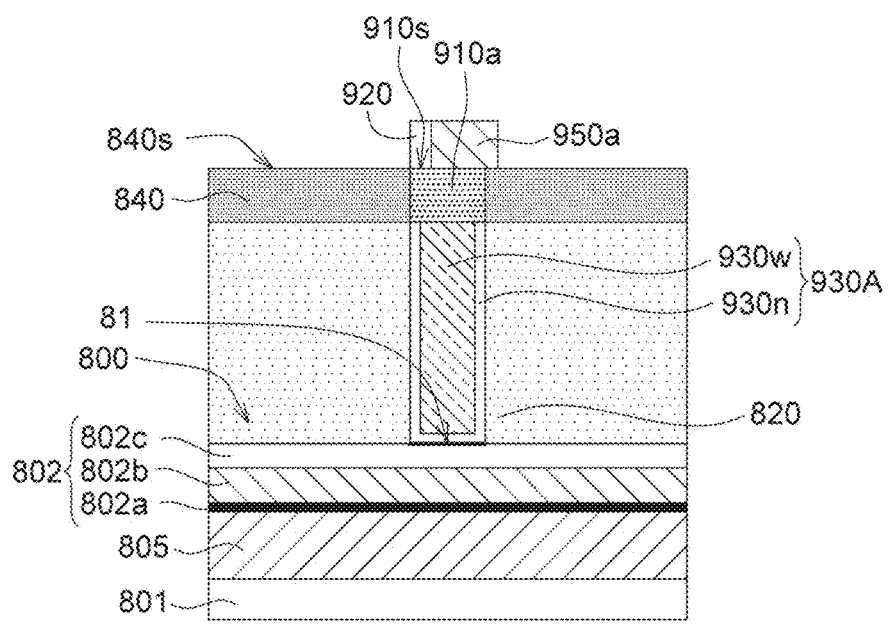

The conductor pillar could have a seed region or seed pillar in the upper portion thereof, a borderless contact is fulfilled since the highly doped silicon pillars 910a and 910b are the seed region or seed pillar of the conductor pillar configured for following SEG processes to grow another silicon pillars thereon. As shown in FIGS. 9(d)-9(f), even if the width of the metal conduction layer (such as, the first metal sub-layer 950a or the second metal sub-layer 950b) is the same as that of the underneath contact plug (which may be as small as minimum feature size), then the photolithographic masking Misalignment tolerance can cause that the metal conduction layer 950a or 950b cannot fully cover the contact (as shown in FIGS. 9(e) and 9(f)), though there is no worry about the resistance between the metal conduction layer and contact may be too high due to shortages of contact areas. The invention here is that further using SEG to grow some extra highly doped silicon material (side pillars 920) to attach the vertical walls of the metal conduction layers 950a and 950b. In this example, FIG. 9(d) is a top view of the constructed phase of a mMOSFET 800 used in the new 4T SRAM according to yet another embodiment of the present disclosure. FIG. 9(e) is a cross-sectional view taken along the cutting line C9D1 as depicted in FIG. 9(d). FIG. 9(f) is a cross-sectional view taken along the cutting line C9D2 as depicted in FIG. 9(d).

Additionally, the present invention discloses a MOS structure used in the new 4T SRAM, in which the source and drain regions are fully isolated by insulators, such insulators would not only increase the immunity to Latch-up issue, but also increase the isolation distance into silicon substrate to separate junctions in adjacent transistors so that the surface distance between junctions can be decreased (such as 3.5λ), so is the size of the SRAM cell. The following briefly describes a new CMOS structure in which the n+ regions of the source and drain regions in the NMOS transistors is fully isolated by insulators. The detailed description for the new structure of the NMOS is presented in the U.S. patent application Ser. No. 17/318,097, field on May 12, 2021 and entitled "COMPLEMENTARY MOSFET STRUCTURE WITH LOCALIZED ISOLATIONS IN SILICON SUBSTRATE TO REDUCE LEAKAGES AND PREVENT LATCH-UP", and the whole content of the U.S. patent application Ser. No. 17/318,097 is incorporated by reference herein.

Figure 10:
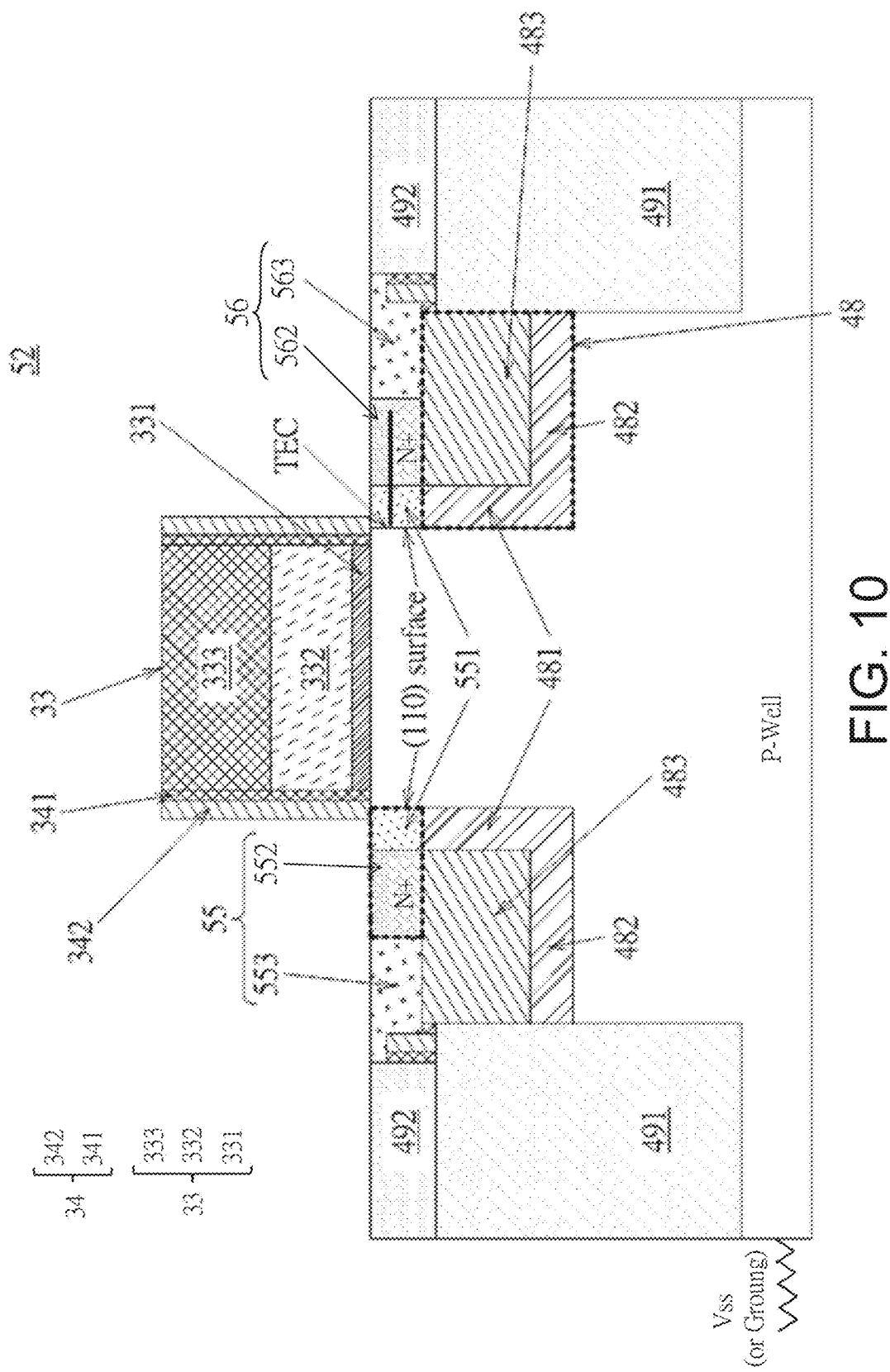
FIG. 10 is a diagram illustrating a cross-sectional view of the NMOS transistor used in the new 4T SRAM.
Figure 11A:
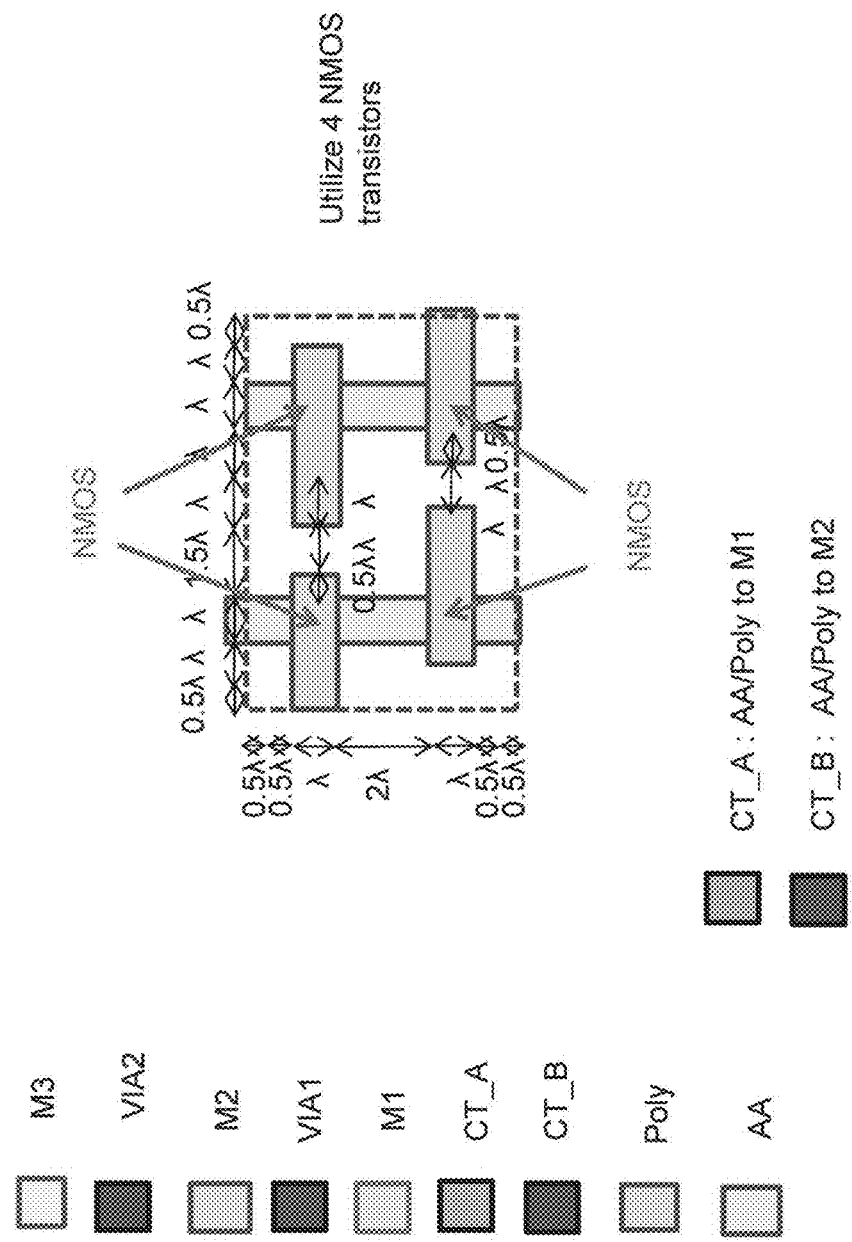
FIGS. 11(*a*)-11(*h*) are top view illustrating the processing structures for forming the new 4T SRAM according to one embodiment of the present disclosure.
Figure 11C:
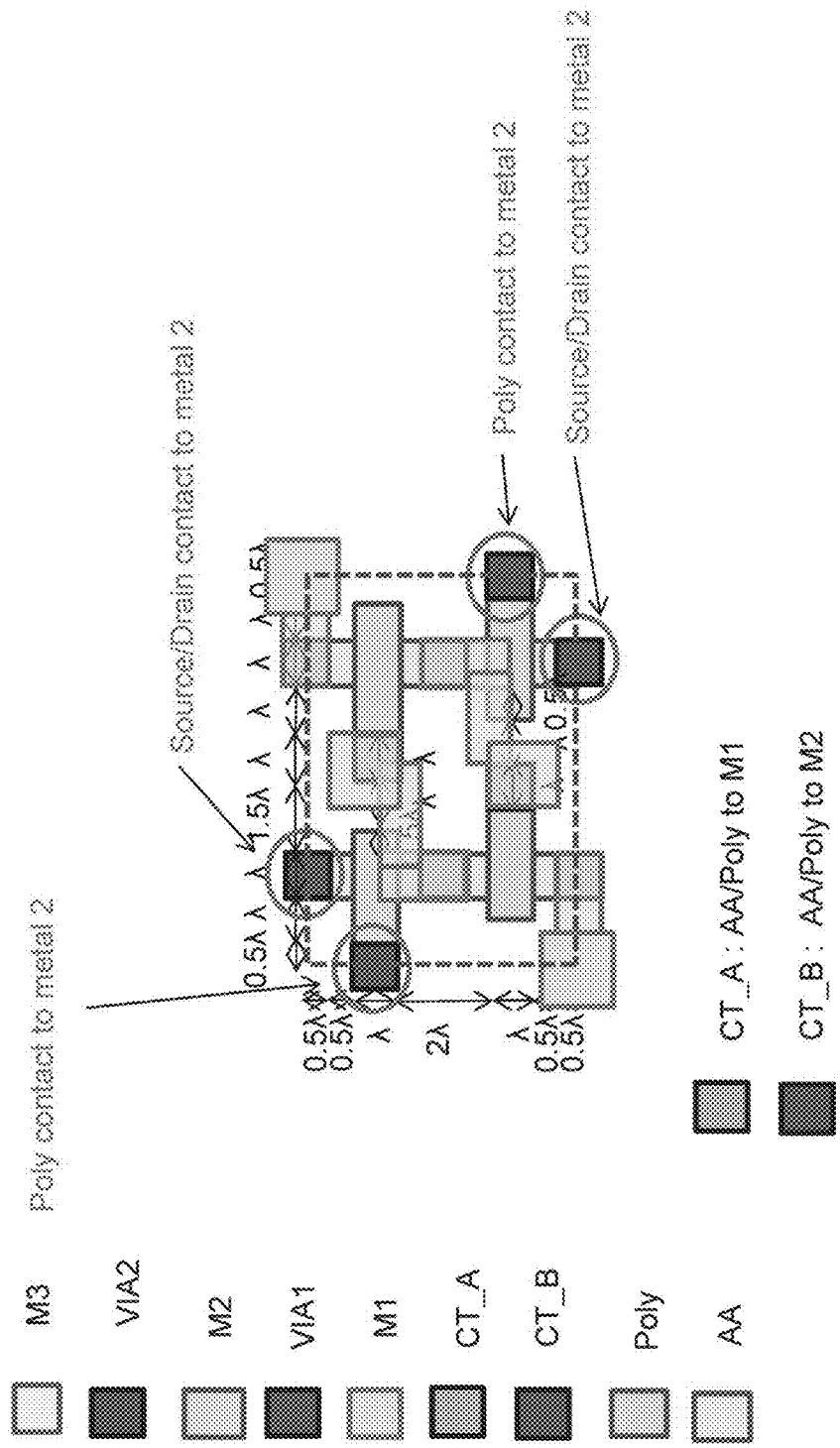
Figure 11E:
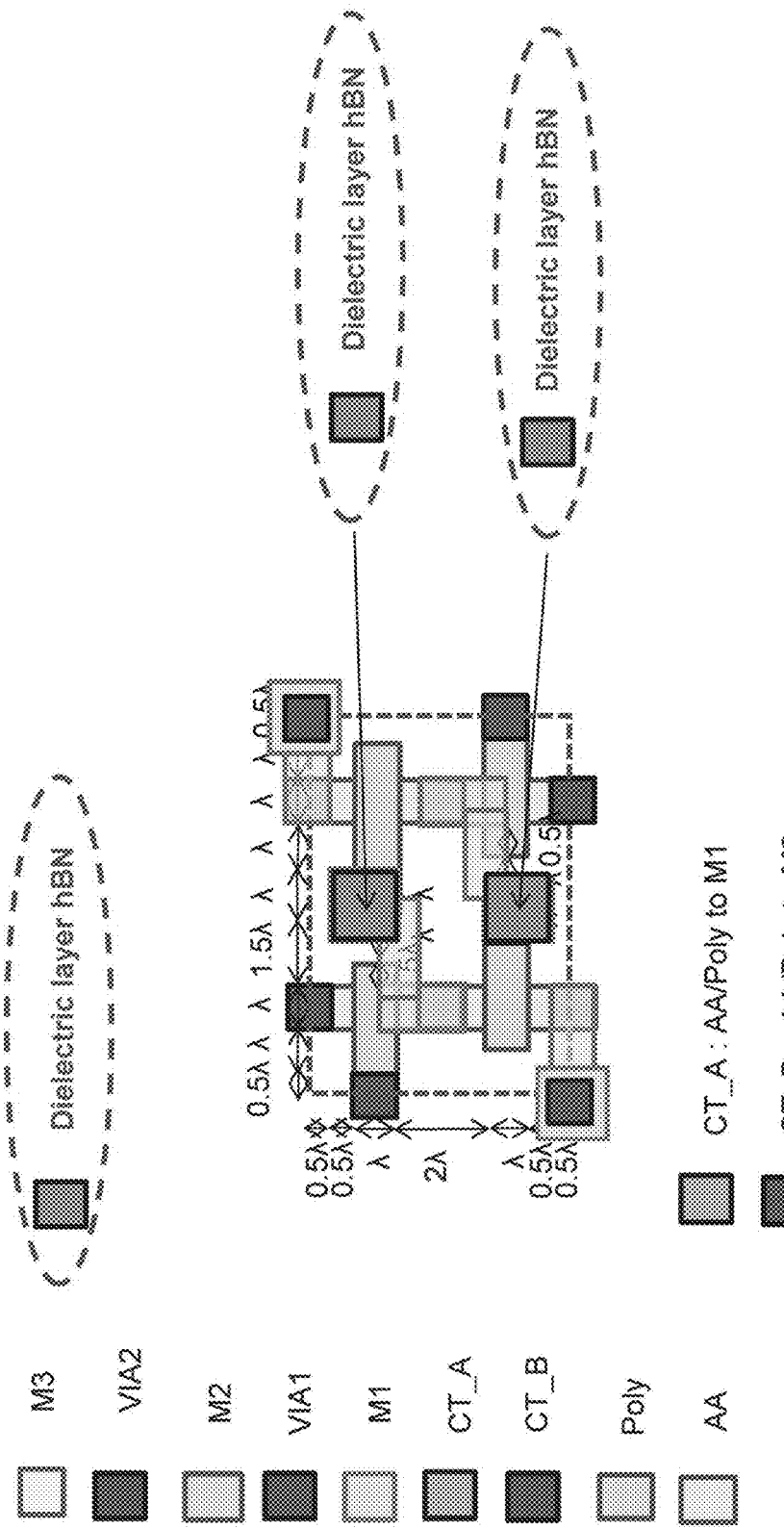
Figure 11F:
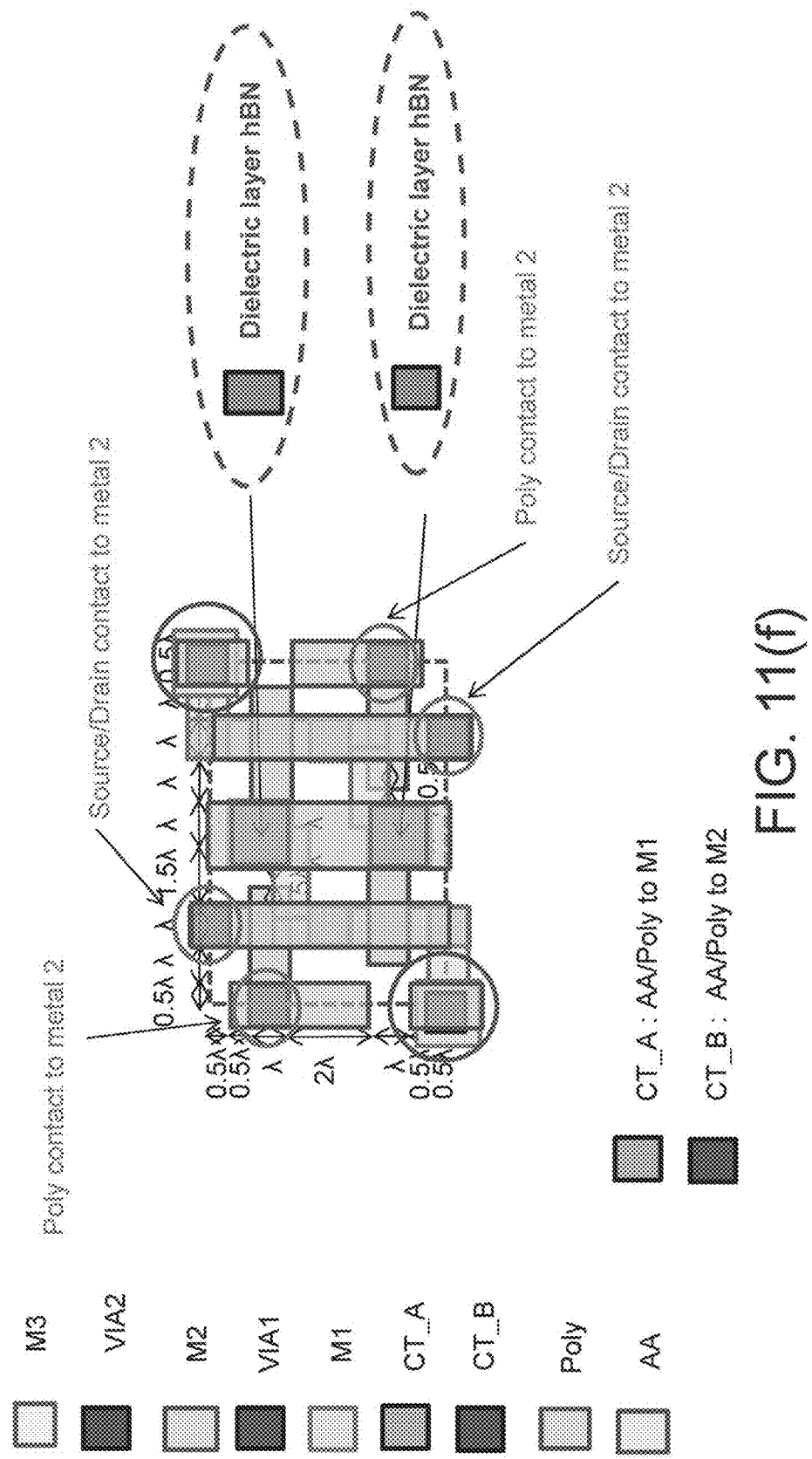
Figure 11G:
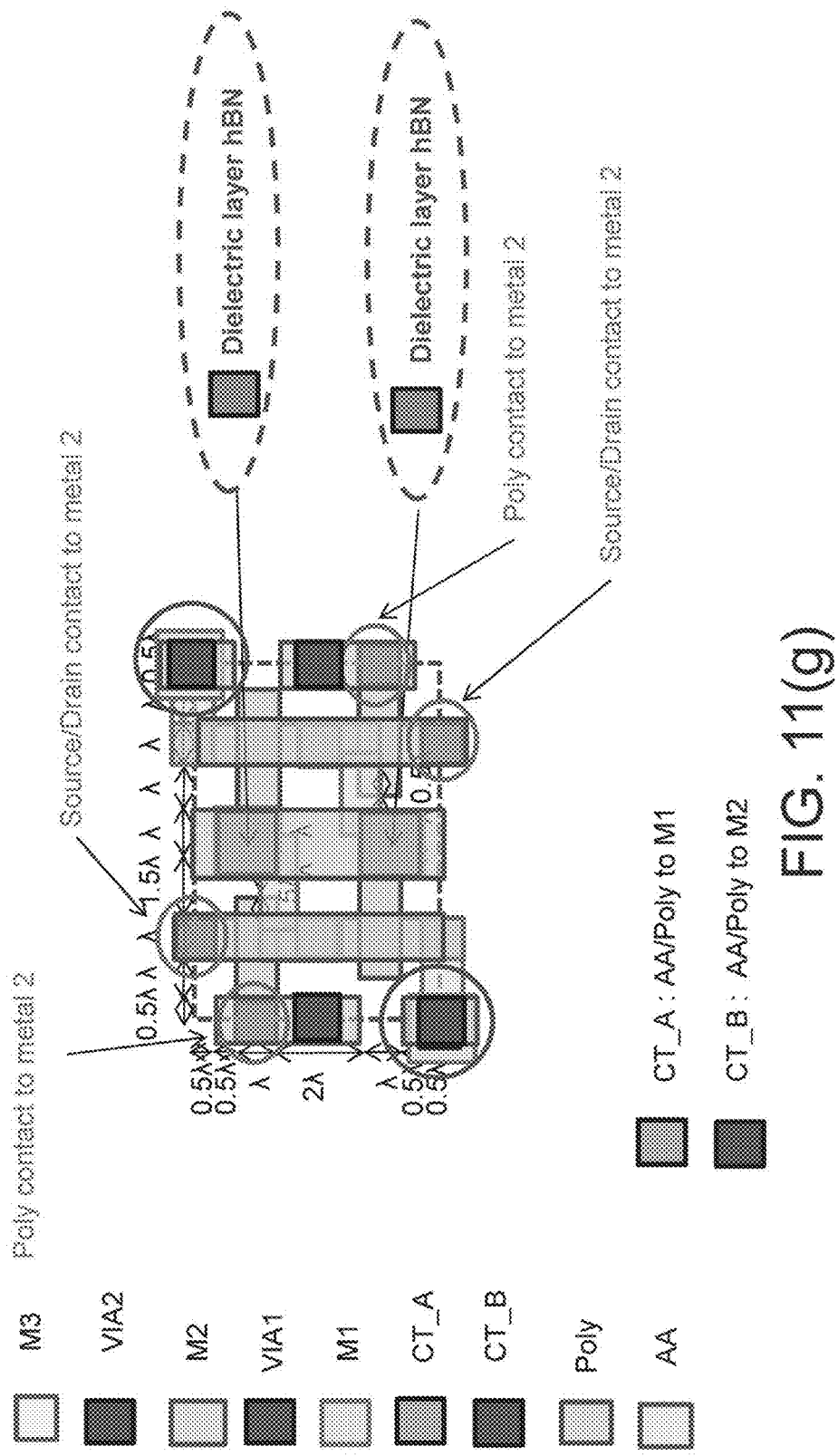
Figure 11H:
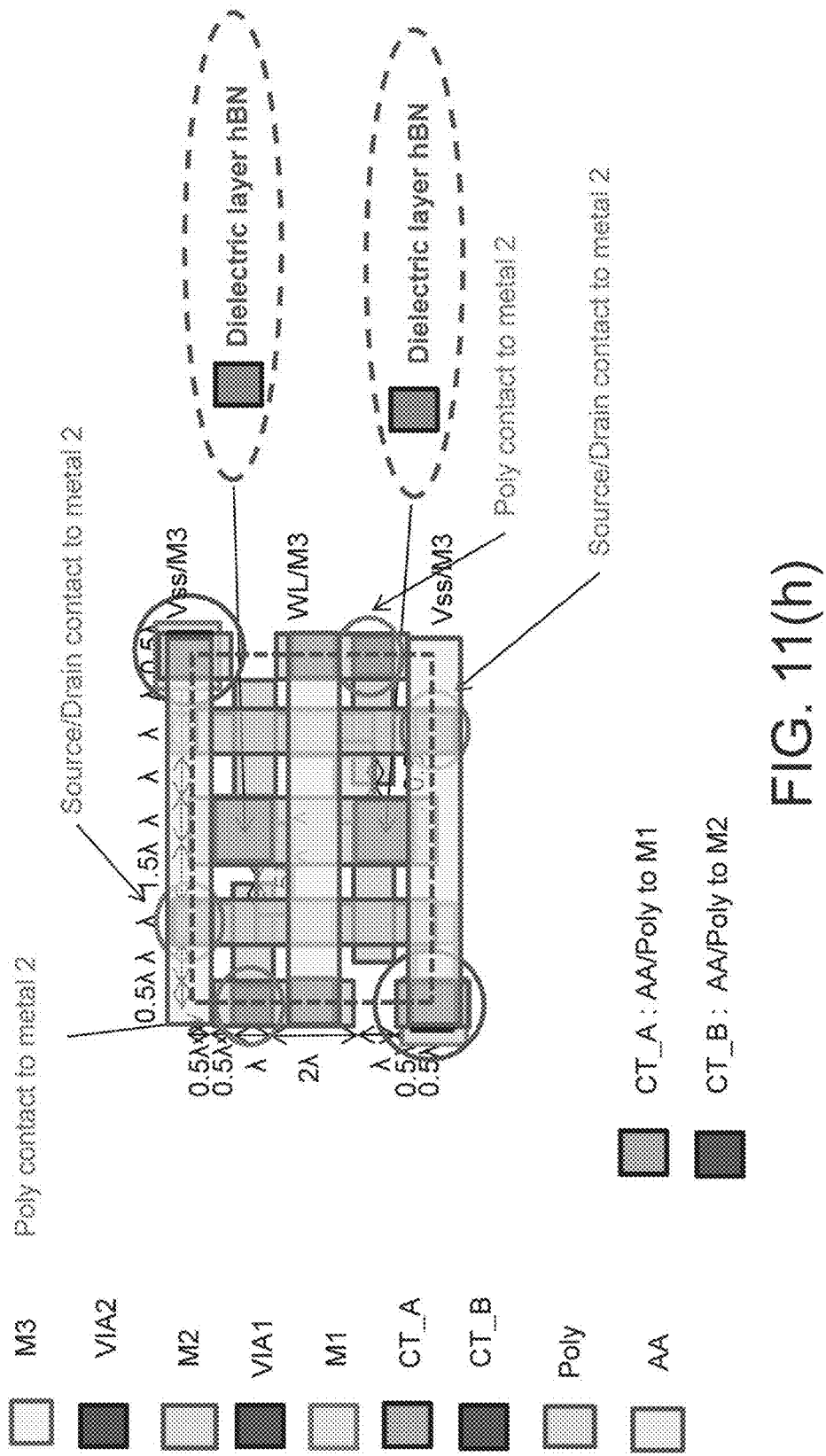

Please refer to FIG. 10, FIG. 10 is a diagram illustrating a cross-sectional view of the NMOS transistor 52 used in the new 4T SRAM. The gate structure 33 comprising a gate dielectric layer 331 and gate conductive layer 332 (such as gate metal) is formed above the horizontal surface or original surface of the semiconductor substrate (such as silicon substrate). A dielectric cap 333 (such as a composite of oxide layer and a Nitride layer) is over the gate conductive layer 332. Furthermore, spacers 34 which may include a composite of an oxide layer 341 and a Nitride layer 342 is used to over sidewalls of the gate structure 33. Trenches are formed in the silicon substrate, and all or at least part of the source region 55 and the drain region 56 are positioned in the corresponding trenches, respectively. The source region 55 (or the drain region 56) in the MOS transistor 52 may include N+ region 552 (or N+ region 562 of the drain region 56) or other suitable doping profile regions (such as gradual or stepwise change from P− region and P+ region). Furthermore, a localized isolation 48 (such as nitride or other high-k dielectric material) is located in one trench and positioned under the source region, and another localized isolation 48 is located in another trench and positioned under the drain region. Such localized isolation 48 is below the horizontal silicon surface (HSS) of the silicon substrate and could be called as localized isolation into silicon substrate (LISS) 48. The LISS 48 could be a thick Nitride layer or a composite of dielectric layers. For example, the localized isolation or LISS 48 could comprise a composite localized isolation which includes an oxide layer (called Oxide-3V layer 481) covering at least a portion sidewall of the trench and another oxide layer (Oxide-3B layer 482) covering at least a portion bottom wall of the trench. The Oxide-3V layer 481 and Oxide-3B layer 482 could be formed by thermal oxidation process. The composite localized isolation 48 further includes a nitride layer 483 (called as Nitride-3) being over the Oxide-3B layer 482 and contacting with the Oxide-3V layer 481. It is mentioned that the nitride layer 483 or Nitride-3 could be replaced by any suitable insulation materials as long as the Oxide-3V layer remains most as well as being designed. Furthermore, the STI (Shallow Trench Isolation) region in FIG. 10 could comprises a composite STI 49 which includes a STI-1 layer 491 and a STI-2 layer 492, wherein the STI-1 layer 491 and a STI-2 layer 492 could be made of thick oxide material by different process, respectively.

Moreover, the source (or drain) region in FIG. 10 could comprise a composite source region 55 and/or drain region 56. For example, in the NMOS transistor 52, the composite source region 55 (or drain region 56) at least comprises a lightly doped drain (LDD) 551 and a heavily N+ doped region 552 in the trench. Especially, it is noted that the lightly doped drain (LDD) 551 abuts against an exposed silicon surface with a uniform (110) crystalline orientation. The exposed silicon surface has its vertical boundary with a suitable recessed thickness in contrast to the edge of the gate structure, which is labeled in FIG. 10 as TEC (Thickness of Etched-away Transistor-body Well-Defined to be the Sharp Edge of Effective Channel Length). The exposed silicon surface is substantially aligned with the gate structure. The exposed silicon surface could be a terminal face of the channel of the transistor.

The lightly doped drain (LDD) 551 and the heavily N+ doped region 552 could be formed based on a Selective Epitaxial Growth (SEG) technique (or other suitable technology which may be Atomic Layer Deposition ALD or selective growth ALD-SALD) to grow silicon from the exposed TEC area which is used as crystalline seeds to form new well-organized (110) lattice across the LISS region which has no seeding effect on changing (110) crystalline structures of newly formed crystals of the composite source region 55 or drain region 56. Such newly formed crystals (including the lightly doped drain (LDD) 551 and the heavily N+ doped region 552) could be named as TEC-Si, as marked in FIG. 10. In one embodiment, the TEC is aligned or substantially aligned with the edge of the gate structure 33, and the length of the LDD 551 is adjustable, and the sidewall of the LDD 551 opposite to the TEC could be aligned or substantially aligned with the sidewall of the spacer 34. The composite source region 55 (or the composite drain region 56) could further comprise some Tungsten (or other suitable metal materials) plugs 553 (or Tungsten plugs 563 of the composite drain region 56) formed in a horizontal connection to the TEC-Si portion for completion of the entire source/drain regions, as shown in FIG. 10. As shown in FIG. 10 the active channel current flowing to future Metal interconnection such as Metal-1 layer is gone through the LDD 551 and heavily-doped conductive region 552 to Tungsten 553 (or other metal materials) which is directly connected to Metal-1 by some good Metal-to-Metal Ohmic contact with much lower resistance than the traditional Silicon-to-Metal contact.

Furthermore, in currently available SRAM cell, the metal wires for high level voltage VDD and low level voltage VSS (or Ground) are distributed above the original silicon surface of the silicon substrate, and such distribution will interfere with other metal wires for the word-line (WL), bit-lines (BL and BL Bar), or other connection metal lines if there is no enough spaces among those metal wires. In another embodiment of the present invention, a new SRAM cell structure has the metal wires for high level voltage VDD and/or the low level voltage VSS which could be distributed under the original silicon surface of the silicon substrate, thus, the interference among the size of the contacts, among layouts of the metal wires connecting the word-line (WL), bit-lines (BL and BL Bar), high level voltage VDD, and low level voltage VSS, etc. could be avoided even the size of the SRAM cell is shrunk.

Using FIG. 10 for explanation, it is possible to remove the Oxide-3B layer 482 in FIG. 10. Therefore, in one embodiment, in the drain region of the NMOS 52, the Tungsten or other metal materials 553 could be electrically coupled to the Pwell which is electrically coupled to VDD. In another embodiment, in the source region of the NMOS 52, the Tungsten or other metal materials 563 could be electrically coupled to the P well or P-substrate which is electrically coupled to Ground. Thus, the openings for the source/drain regions which are originally used to electrically couple the source/drain regions with metal layer 2 or metal layer 3 for VDD or Ground connection could be omitted in the new SRAM cell. The detailed description for the structure of the aforesaid structure and the manufacture process thereof is presented in the U.S. patent application Ser. No. 16/991,044, filed on Aug. 12, 2020 and entitled: "TRANSISTOR STRUCTURE AND RELATED INVERTER", and the whole content of the U.S. patent application Ser. No. 16/991,044 is incorporated by reference herein.

To sum up, at least there are following advantages in the new 4T SRAM cell:

(1) The linear dimensions of the source, the drain and the gate of the transistors in the SRAM are precisely controlled, and the linear dimension can be as small as the minimum feature size, Lamda ($\lambda$). Therefore, when two adjacent transistors are connected together through the drain/source, the length dimension of the transistor would be as small as $3\lambda$, and the distance between the edges of the gates of the two adjacent transistors could be as small as $2\lambda$. Of course, for tolerance purpose, the length dimension of the transistor would be around $3\sim6\lambda$ or larger, the distance between the edges of the gates of the two adjacent transistors could be $3\lambda\sim5\lambda$ or larger.

(2) The first metal interconnection (M1 layer) could directly connect Gate, Source and/or Drain regions through self-aligned miniaturized contacts without using a conventional contact-hole-opening mask and/or a Metal-0 translation layer for M1 connections.

(3) The Gate and/or Diffusion (Source/Drain) areas could be directly connected to the M2 interconnection layer without connecting the M1 layer in a self-alignment way. Therefore, the necessary space between one M1 interconnection and the other M1 interconnection and blocking issue in some wiring connections will be reduced. Furthermore, same structure could be applied to a lower metal layer which is directly connected to an upper metal layer by a conductor pillar, but the conductor pillar is not electrically connected to any middle metal layer between the lower metal layer and the upper metal layer.

(4) The metal wires for high level voltage VDD and/or the low level voltage VSS in the new 4T SRAM cell could be distributed under the original silicon surface of the silicon substrate, thus, the interference among the size of the contacts, among layouts of the metal wires connecting the word-line (WL), bit-lines (BL and BL Bar), high level voltage VDD, and low level voltage VSS, etc. could be avoided even the size of the new 4T SRAM cell is shrunk. Moreover, the openings for the source/drain regions which are originally used to electrically couple the source/drain regions with metal layer 2 or metal layer 3 for VDD or Ground connection could be omitted in the new 4T SRAM cell.

FIG. 11(*a*) is a stick diagram of the new 4T SRAM with dimension according to the advantages of the present invention. In the present embodiment, FIG. 11(*a*) is a copy of FIG. 1E showing the "stick diagram" representing the layout and connection among the new 4 transistors of the SRAM. As shown in FIG. 11(*a*), the dimension of the transistor would be as small as $3\lambda$. Furthermore, the distance between the edges of the gates of the two adjacent transistors could be as small as $2\lambda$; the distance between the edges of the source/drain (or Diffusion) of the two adjacent transistors could be as small as $3.5\lambda$.

In FIG. 11(*a*), the dimension of the active region (vertical line) can be as small as A, so is the gate line (horizontal line). Furthermore, in FIG. 11(*b*), for the transistor in the upper left corner which is corresponding to the Q4 transistor in FIG. 1E, in order to avoid the interference between two contact holes which will be formed later in the action region and the gate region respectively, the horizontal distance between the edge of the active region and the boundary of the SRAM cell or bit cell will be $1.5\lambda$. So is the transistor in the bottom right corner of FIG. 11(*a*) which is corresponding to another Q3 transistor in FIG. 1E. Thus, for the stick diagram in FIG. 11(*a*), the horizontal length (x-direction) of the SRAM cell or bit cell is $8.5\lambda$, and the vertical length (y-direction) of the SRAM cell or bit cell is $6\lambda$. Therefore, the total area of the SRAM cell or bit cell of the FIG. 11(*b*) is $51\lambda^2$.

In FIG. 11 (*b*), a plurality of CT_A (Opening VIA Mask layer for connecting AA (or Poly) to the Metal-1 layer) and CT_B (Opening VIA Mask layer for directly connecting AA (or Poly) to the Metal-2 layer) are formed. In FIG. 11(*c*), the Metal-1 layers (M1) (width: A or greater) are formed to connect the plurality of the source/drain contacts (CT_A mask), however, the plurality of CT_B do not connect to the Metal-1 layers (M1). In FIG. 11(*d*), a plurality of VIA1 (marked by dash ovals) for connecting the Metal-1 layer to the Metal-2 layer are formed. In FIG. 11(*e*), dielectric layer (such as hBN) is deposited on part of the VIA 1 contacts.

In FIG. 11(*f*), the Metal-2 layers (M2) are formed at least to connect the plurality of CT_B. Some of the Metal-2 layers (M2) are used as bit line (BL) and bit line bar (BLB). In the present embodiment, one Metal-2 layer (M2) layer is deposited to contact the dielectric layer (such as hBN) to form the resistive load MIMs (as marked by orange dash ovals, of which the 3D structures are depicted in FIGS. 4(*a*)-4(*b*) or FIGS. 5(*a*)5(*b*)), and one metal 2 layer is formed to directly connect the gate contact (that is, CT_B to M2 marked by green circles) to the input terminal. In FIG. 11(*g*), a plurality of VIA2 are formed, and in FIG. 11(*h*) the Metal-3 layer (M3) is formed to connect the plurality of VIA2, and the Metal-3 layer (M3) is used as the word line (WL). The meaning of those abbreviated symbols used in FIGS. 11(*a*)-11(*h*) could refer to those mentioned in FIG. 2.

The conventional SRAM cell may not allow the gate or source/drain directly connect to Metal-2 layers (M2) without bypassing the Metal-1 layers (M1). The present invention discloses a new SRAM cell structure in which the gate/source/drain of the transistors in the SRAM cell could be directly connected to the Metal-2 interconnection layer (M2) without a transitional Metal-1 layer (M1) in a self-alignment way through one vertical conductive plug, as shown green circles marked in FIG. 11(*d*) and FIG. 11(*f*).

This invention develops a compact layout style and uses the wide bandgap material (e.g.: hBN) to serve as low temperature variation with wide range tuning resistive load to replace two PMOS transistor in conventional 6T SRAM bit cell design. In some embodiment of the present disclosure, the new 4T SRAM designs can enable the SRAM bit cell area of $51\lambda^2$ which can be independent from the technology scaling in term of $\lambda$ (Lambda is the minimum feature of size of the technology node).

Figure 12:
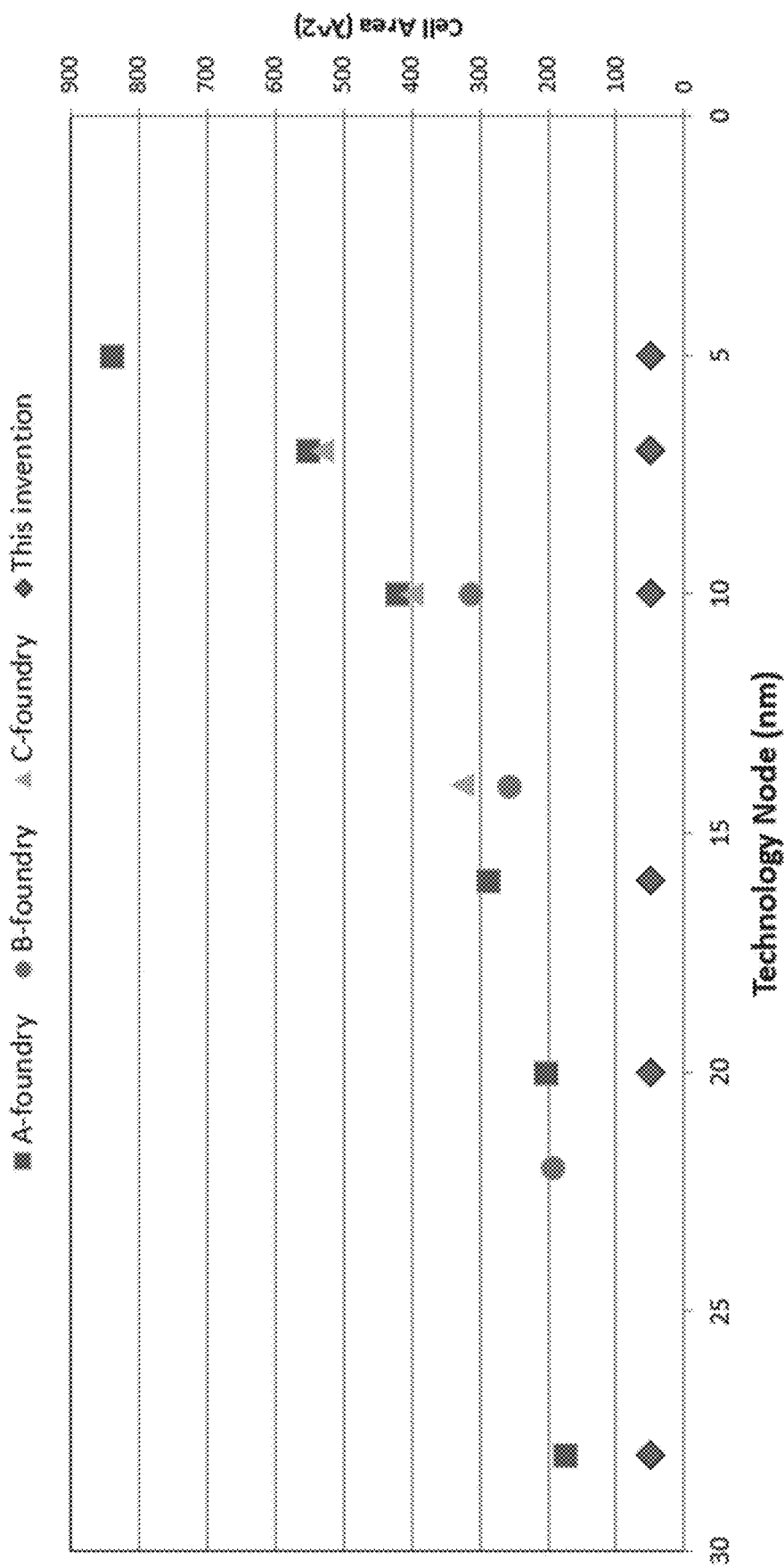
FIG. 12 is a diagram illustrating the SRAM bit cell size (in term of $\lambda^2$) can be observed across different technology nodes from three different companies and the present invention.

As shown in FIG. 12, the larger SRAM bit cell size (in term of $\lambda^2$) can be observed across different technology nodes from three different companies (data collected from published literatures), as moving toward smaller feature size technology. With the proposed SRAM cell structure of the present invention, the SRAM bit call area across different technology nodes can stay flat or less sensitive to the technology nodes.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A SRAM cell structure, comprising:
   a substrate, having an original horizontal surface;
   a plurality of transistors including n transistors formed in the substrate, wherein n is a positive integral less than 6; wherein one of the n transistors comprises a gate structure, a source region and, a drain region and a localized isolation extending under the source region or the drain region but not extending under the gate structure, and a shallow trench isolation (STI) region surrounds the one transistor; wherein a top surface of the STI region is higher than the original horizontal surface;
   a set of contacts coupled to the plurality of transistors;
   a word-line electrically coupled to the plurality of transistors;
   a bit-line and a bit line bar electrically coupled to the plurality of transistors;
   a VDD contacting line electrically coupled to the plurality of transistors;
   a tunneling structure disposed between the VDD contacting line and the plurality of transistors; and
   a VSS contacting line electrically coupled to the plurality of transistors;
   wherein as a minimum feature size of the SRAM cell structure is between 28 nm and 20 nm, an area size of the SRAM cell structure in terms of square of the minimum feature size ($\lambda$) is less than $100\lambda^2$; or as the minimum feature size of the SRAM cell structure less than 20 nm and not less than 10 nm, the area size of the SRAM cell structure in terms of square of the minimum feature size ($\lambda$) is less than $200\lambda^2$; or as the minimum feature size of the SRAM cell structure less than 10 nm and not less than 5 nm, the area size of the SRAM cell structure in terms of square of the minimum feature size ($\lambda$) is less than $300\lambda^2$.

2. The SRAM cell structure according to claim 1, wherein when A is decreased from 28 nm to 5 nm, the area size of the SRAM cell is between $51\lambda^2 \sim 102\lambda^2$.

3. The SRAM cell structure according to claim 2, wherein a length of a first transistor in the plurality of transistors is between $3\sim5\lambda^2$.

4. The SRAM cell structure according to claim 1, wherein the tunneling structure includes a first dielectric layer with a thickness of a monolayer and 10 nm.

5. The SRAM cell structure according to claim 4, wherein the first dielectric layer is between the VDD contacting line and another metal layer to form a MIM structure.

6. A SRAM cell structure, comprising:
   a substrate, having an original horizontal surface;
   a pair of cross-coupled transistors formed in the substrate, wherein one of the pair of cross-coupled transistors comprises a gate structure, a source region and, a drain region and a localized isolation extending under the source region or the drain region but not extending under the gate structure, and a shallow trench isolation (STI) region surrounds the source region and the drain region; wherein a top surface of the STI region is higher than the original horizontal surface;
   a VDD contacting line, electrically coupled to the pair of cross-coupled transistors;
   a VSS contacting line, electrically coupled to the pair of cross-coupled transistors; and
   a tunneling structure disposed between the VDD contacting line and pair of cross-coupled transistors;
   wherein the tunneling structure is a two-terminals device with bilateral current directions.

7. The SRAM cell structure according to claim 6, wherein the VDD contacting line is electrically coupled to the pair of cross-coupled transistors through the tunneling structure based on tunneling effect.

8. The SRAM cell structure according to claim 6, wherein the tunneling structure includes a first dielectric layer made of boron nitride, $CaF_2$, $SiO_2$, $HfO_2$, $Ta_2O_5$, or Perylene-3,4,9,10-tetracarboxylic dianhydride (PTCDA), and wherein a thickness of the first dielectric layer is between a thickness of a monolayer and 10 nm.

9. The SRAM cell structure according to claim 6, wherein the tunneling structure includes a superlattice structure with well layers sandwiched by barrier layers.

10. The SRAM cell structure according to claim 9, wherein the thickness of the well layers or the barrier layers are modulated or gradually changed from one side of the tunneling structure to the other side of the tunneling structure.

11. The SRAM cell structure according to claim 9, wherein the thickness of the superlattice structure is less than 20 nm.

12. The SRAM cell structure according to claim 9, the material composition of the well layers are modulated or gradually changed from one side of the tunneling structure to the other side of the tunneling structure.

13. The SRAM cell structure according to claim 9, the doping concentration of the well layers are modulated or gradually changed from one side of the tunneling structure to the other side of the tunneling structure.

14. The SRAM cell structure according to claim 6, further comprising:

a first passing transistor;
a second passing transistor;
a word-line, electrically coupled to the first passing transistor and the second passing transistor;
a bit-line; and
a bit line bar, electrically coupled to the first passing transistor and the second passing transistor, respectively.

15. A SRAM cell structure, comprising:
a substrate, having an original horizontal surface;
a plurality of transistors including n transistors within the substrate, wherein n is a positive integral less than 6; wherein one of the n transistors comprises a source region and a drain region, and a shallow trench isolation (STI) region surrounds the source region and the drain region; wherein a top surface of the STI region is higher than the original horizontal surface;
a plurality of contacts coupled to the plurality of transistors;
a set of first metal layers disposed above and electrically coupled to the plurality of transistors;
a set of second metal layers disposed above the set of first metal layers and electrically coupled to the plurality of transistors; and
a metal-insulator-metal (MIM) structure above the plurality of transistors comprising a tunneling dielectric layer covering the a surface of the a metal-1 layer:
wherein the plurality of contacts comprise a set of first contacts and a set of second contacts, the set of first contacts are connected to the set of first metal layers, and the set of second contacts are connected to the set of second metal layers but disconnected from the set of first metal layers;
wherein a bottom surface of an n+ region of a first transistor in the plurality of transistors is fully isolated by a first insulator, and the first insulator comprises a L-shaped oxide layer.

16. The SRAM cell structure according to claim 15, wherein the tunneling dielectric layer is made of hexagonal boron nitride (hBN) with a thickness between a monolayer and 10 nm.

17. A SRAM cell structure, comprising:
a substrate, having an original horizontal surface;
a plurality of transistors, including n transistors formed in the substrate, wherein n is a positive integral less than 6, wherein a first transistor of the plurality of transistors comprises:
a gate structure with a length;
a channel region;
a first conductive region, electrically coupled to the channel region; and
a first contact hole, positioned above the first conductive region;
a second conductive region, electrically coupled to the channel region; and
a shallow trench isolation (STI) region surrounding the first conductive region and the second conductive region; wherein a top surface of the STI region is higher than the original horizontal surface; and
a localized isolation located under the first conductive region or the second conductive region, wherein the localized isolation is a composite dielectric layer;
a VDD contacting line electrically coupled to the plurality of transistors; and a tunneling structure disposed between the VDD contacting line and the plurality of transistors; wherein the tunneling structure is a two-terminals device with bilateral current directions;
wherein a periphery of the first contact hole is unrelated to a photolithography process for forming the SRAM cell structure.

18. The SRAM cell structure according to claim 17, wherein a periphery of the first contact hole is surrounded by a circumference of the first conductive region.

19. A SRAM cell structure comprising a set of SRAM cells, comprising:
a substrate, having an original horizontal surface;
a first SRAM cell comprising:
a first pair of cross-coupled transistors formed in the substrate, wherein one of the first pair of cross-coupled transistors comprises a gate structure, a source region and a drain region and a localized isolation extending under the source region or the drain region but not extending under the gate structure, and a shallow trench isolation (STI) region surrounds the source region and the drain region; wherein a top surface of the STI region is higher than the original horizontal surface;
a first VDD contacting line electrically coupled to the first pair of cross-coupled transistors; and
a first VSS contacting line electrically coupled to the first pair of cross-coupled transistors;
a first tunneling structure disposed between the first VDD contacting line and the first pair of cross-coupled transistors;
a second SRAM cell comprising:
a second pair of cross-coupled transistors;
a second VDD contacting line electrically coupled to the second pair of cross-coupled transistors; and
a second VSS contacting line electrically coupled to the second pair of cross-coupled transistors; and
a second tunneling structure disposed between the second VDD contacting line and the second pair of cross-coupled transistors.

20. The SRAM cell structure according to claim 19, wherein the first tunneling structure includes a first dielectric layer and the second tunneling structure includes a second dielectric layer, the first dielectric layer and the second dielectric layer are made of boron nitride, $CaF_2$, $SiO_2$, $HfO_2$, $Ta_2O_5$, or Perylene-3,4,9,10-tetracarboxylic dianhydride (PTCDA), and a thickness of the first dielectric layer is different from that of the second dielectric layer.

21. The SRAM cell structure according to claim 19, wherein the first tunneling structure includes a first superlattice structure with well layers sandwiched by barrier layers, and the second tunneling structure includes a second superlattice structure with well layers sandwiched by barrier layers.

22. The SRAM cell structure according to claim 21, wherein the thickness of the first superlattice structure is different from the thickness of the second superlattice structure.

23. The SRAM cell structure according to claim 21, wherein the change of thickness of the well layers or the barrier layers in the first superlattice structure is different from the change of thickness of the well layers or the barrier layers in the second superlattice structure.

24. The SRAM cell structure according to claim 21, wherein, the change of material composition of the well layers in the first superlattice structure is different from the change of material composition of the well layers in the second superlattice structure.

25. The SRAM cell structure according to claim 21, the change of doping concentration of the well layers in the first superlattice structure is different from the change of doping concentration of the well layers in the second superlattice structure.

* * * * *